United States Patent
Dau et al.

(10) Patent No.: US 8,506,112 B1
(45) Date of Patent: Aug. 13, 2013

(54) ILLUMINATION DEVICES INCLUDING MULTIPLE LIGHT EMITTING ELEMENTS

(75) Inventors: Wilson Dau, Calgary (CA); Robert C. Gardner, Atherton, CA (US); George Lerman, Las Vegas, NV (US); Louis Lerman, Las Vegas, NV (US); Christopher H. Lowery, Fall River Mills, CA (US); Brian D. Ogonowsky, Mountain View, CA (US); George E. Smith, Sunnyvale, CA (US); Ingo Speier, Saanichton (CA); Robert V. Steele, Redwood City, CA (US); Jacqueline Teng, White Salmon, WA (US); Allan Brent York, Langley (CA)

(73) Assignee: Quarkstar LLC, Las Vegas, NV (US)

( * ) Notice: Subject to any disclaimer, the term of this patent is extended or adjusted under 35 U.S.C. 154(b) by 0 days.

(21) Appl. No.: 13/611,738

(22) Filed: Sep. 12, 2012

Related U.S. Application Data

(63) Continuation of application No. 13/570,243, filed on Aug. 8, 2012, and a continuation-in-part of application No. 13/205,548, filed on Aug. 8, 2011.

(60) Provisional application No. 61/594,954, filed on Feb. 3, 2012, provisional application No. 61/594,849, filed on Feb. 3, 2012, provisional application No. 61/603,205, filed on Feb. 24, 2012, provisional application No. 61/640,719, filed on Apr. 30, 2012.

(51) Int. Cl.
*F21V 1/00* (2006.01)

(52) U.S. Cl.
USPC ............. 362/217.05; 362/311.06; 362/555

(58) Field of Classification Search
USPC ............ 362/555, 558, 560, 222–225, 217.04, 362/217.05, 311.06
See application file for complete search history.

(56) References Cited

U.S. PATENT DOCUMENTS

| | | | |
|---|---|---|---|
| 2,194,841 A | 3/1940 | Welch | |
| 3,772,506 A | 11/1973 | Junginger | |
| 3,836,767 A | 9/1974 | Lasker | |
| 4,112,483 A | 9/1978 | Small et al. | |
| 4,254,456 A | 3/1981 | Grindle et al. | |
| 4,271,408 A | 6/1981 | Teshima et al. | |
| 5,075,827 A | 12/1991 | Smith | |

(Continued)

OTHER PUBLICATIONS

U.S. Appl. No. 13/205,548, filed Aug. 8, 2011, Solid-State Luminaire, Dau et al.

(Continued)

*Primary Examiner* — Julie Shallenberger
(74) *Attorney, Agent, or Firm* — Fish & Richardson P.C.

(57) ABSTRACT

A variety of illumination devices are disclosed that are configured to manipulate light provided by one or more light-emitting elements (LEEs). In general, embodiments of the illumination devices feature one or more optical couplers that redirect illumination from the LEEs to a reflector which then directs the light into a range of angles. In some embodiments, the illumination device includes a second reflector that reflects at least some of the light from the first reflector. In certain embodiments, the illumination device includes a light guide that guides light from the collector to the first reflector. The components of the illumination device can be configured to provide illumination devices that can provide a variety of intensity distributions. Such illumination devices can be configured to provide light for particular lighting applications, including office lighting, task lighting, cabinet lighting, garage lighting, wall wash, stack lighting, and downlighting.

30 Claims, 49 Drawing Sheets

(56) References Cited

U.S. PATENT DOCUMENTS

| | | | |
|---|---|---|---|
| 5,134,550 | A | 7/1992 | Young |
| 5,289,356 | A | 2/1994 | Winston |
| 5,438,485 | A | 8/1995 | Li et al. |
| 5,810,463 | A * | 9/1998 | Kawahara et al. ............ 362/601 |
| 5,988,836 | A | 11/1999 | Swarens |
| 6,058,271 | A | 5/2000 | Tenmyo |
| 6,441,943 | B1 | 8/2002 | Roberts et al. |
| 6,505,953 | B1 | 1/2003 | Dahlen |
| 6,527,420 | B1 | 3/2003 | Chuang |
| 6,543,911 | B1 | 4/2003 | Rizkin et al. |
| 6,572,246 | B1 | 6/2003 | Hopp et al. |
| 6,598,998 | B2 | 7/2003 | West et al. |
| 6,932,499 | B2 * | 8/2005 | Ogura ............................ 362/551 |
| 7,083,315 | B2 | 8/2006 | Hansler et al. |
| 7,097,337 | B2 | 8/2006 | Kim et al. |
| 7,156,540 | B2 | 1/2007 | Haines |
| 7,164,842 | B2 * | 1/2007 | Chen ............................. 385/147 |
| 7,182,480 | B2 | 2/2007 | Kan |
| 7,259,403 | B2 | 8/2007 | Shimizu et al. |
| 7,275,841 | B2 | 10/2007 | Kelly |
| 7,293,889 | B2 | 11/2007 | Kamiya |
| 7,334,932 | B2 * | 2/2008 | Klettke ......................... 362/612 |
| 7,386,214 | B1 | 6/2008 | Canciotto |
| 7,387,399 | B2 | 6/2008 | Noh et al. |
| 7,530,712 | B2 | 5/2009 | Lin et al. |
| 7,645,054 | B2 | 1/2010 | Goihl |
| 7,850,347 | B2 | 12/2010 | Speier et al. |
| 7,855,815 | B2 | 12/2010 | Hayashide et al. |
| 7,942,546 | B2 | 5/2011 | Naijo et al. |
| 7,947,915 | B2 | 5/2011 | Lee et al. |
| 7,967,477 | B2 | 6/2011 | Bloemen et al. |
| 8,002,446 | B1 | 8/2011 | Plunk et al. |
| 8,061,867 | B2 | 11/2011 | Kim et al. |
| 8,075,147 | B2 | 12/2011 | Chaves et al. |
| 8,348,489 | B2 | 1/2013 | Holman et al. |
| 2004/0012976 | A1 | 1/2004 | Amano |
| 2004/0080947 | A1 | 4/2004 | Subisak et al. |
| 2004/0105264 | A1 | 6/2004 | Spero |
| 2004/0137189 | A1 | 7/2004 | Tellini et al. |
| 2004/0228131 | A1 | 11/2004 | Minano et al. |
| 2005/0111235 | A1 * | 5/2005 | Suzuki et al. .................. 362/555 |
| 2005/0265044 | A1 * | 12/2005 | Chen et al. ..................... 362/558 |
| 2005/0270774 | A1 | 12/2005 | Pan |
| 2006/0061990 | A1 | 3/2006 | Chinniah et al. |
| 2006/0076568 | A1 | 4/2006 | Keller et al. |
| 2006/0139917 | A1 | 6/2006 | Ward |
| 2006/0187661 | A1 | 8/2006 | Holten |
| 2007/0061360 | A1 | 3/2007 | Holcombe et al. |
| 2007/0097696 | A1 | 5/2007 | Eng et al. |
| 2007/0201234 | A1 | 8/2007 | Ottermann |
| 2007/0280593 | A1 | 12/2007 | Brychell et al. |
| 2008/0074752 | A1 | 3/2008 | Chaves et al. |
| 2008/0198603 | A1 | 8/2008 | Sormani et al. |
| 2009/0103293 | A1 | 4/2009 | Harbers et al. |
| 2009/0168395 | A1 | 7/2009 | Mrakovich et al. |
| 2009/0231878 | A1 | 9/2009 | Van Duijneveldt |
| 2011/0182084 | A1 | 7/2011 | Tomlinson |
| 2011/0227487 | A1 | 9/2011 | Nichol et al. |
| 2011/0267836 | A1 | 11/2011 | Boonekamp et al. |
| 2012/0044675 | A1 | 2/2012 | Buelow et al. |
| 2012/0147624 | A1 | 6/2012 | Li et al. |
| 2012/0155116 | A1 | 6/2012 | Gardner |
| 2012/0170260 | A1 | 7/2012 | Gardner |
| 2012/0268966 | A1 | 10/2012 | McCollum et al. |
| 2012/0281432 | A1 | 11/2012 | Parker et al. |
| 2012/0294037 | A1 | 11/2012 | Holman et al. |

OTHER PUBLICATIONS

U.S. Appl. No. 13/570,243, filed Aug. 8, 2012, Illumination Devices Including Multiple Light Emitting Elements, Dau et al.

U.S. Appl. No. 13/611,871, filed Sep. 12, 2012, Illumination Devices Including Multiple Light Emitting Elements, Dau et al.

Philips Lighting Company, "Philips EnduraLED Candle LED Lamps", Downloaded from the internet at: www.lighting.philips.com/us_en/browseliterature/download/p-6027 on Jan. 27, 2012, 2 pages (2010).

Young, "International Search Report and Written Opinion" from co-pending PCT Application No. PCT/US12/50046 dated Oct. 26, 2012, 34 pages.

Authorized Officer Shane Thomas, Notification of Transmittal of the International Search Report and the Written Opinion of the International Searching Authority, International Application No. PCT/US13/24525, mailed Apr. 16, 2013, 12 pages.

* cited by examiner

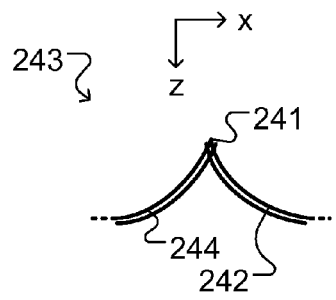
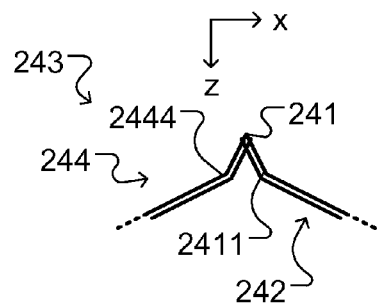
FIG. 2B  FIG. 2C
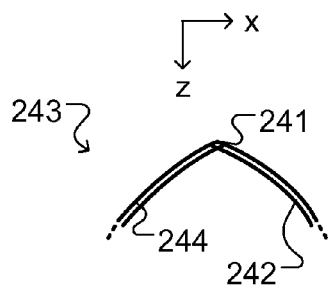
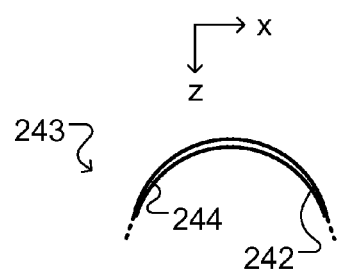
FIG. 2D  FIG. 2E
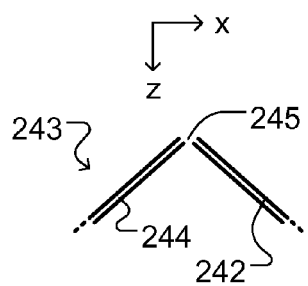
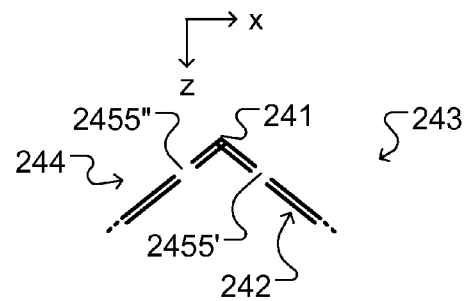
FIG. 2F  FIG. 2G

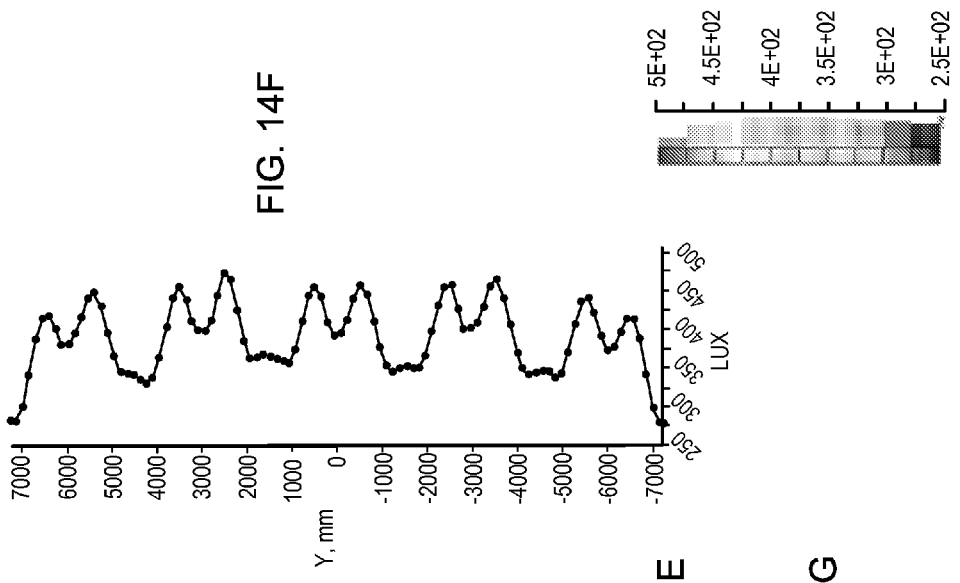
FIG. 14F
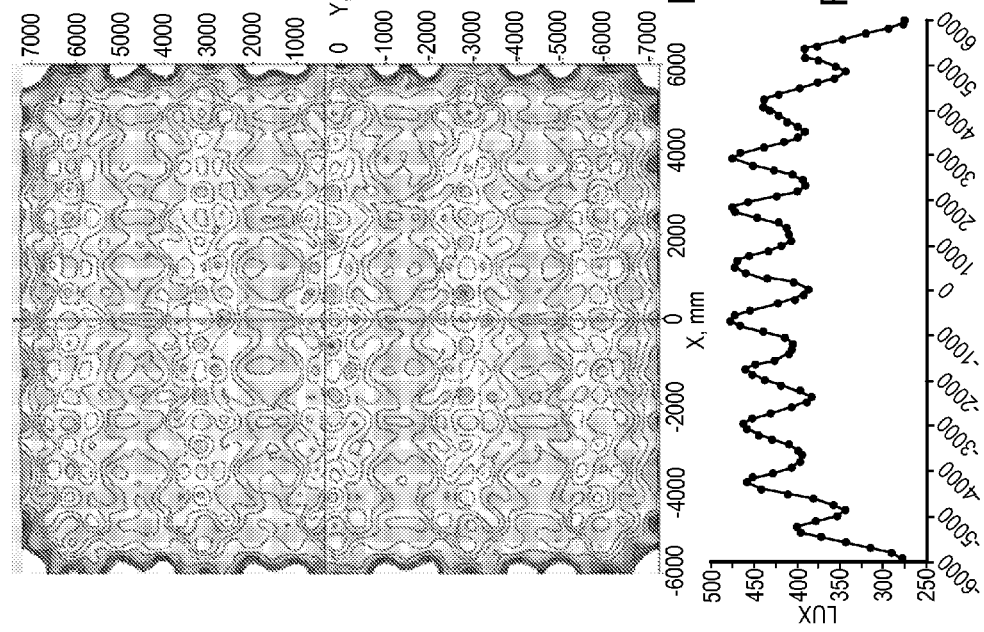
FIG. 14E
FIG. 14G

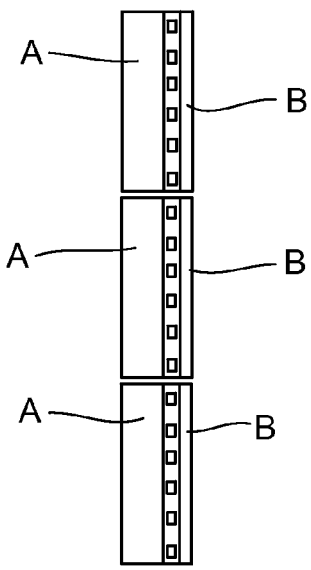 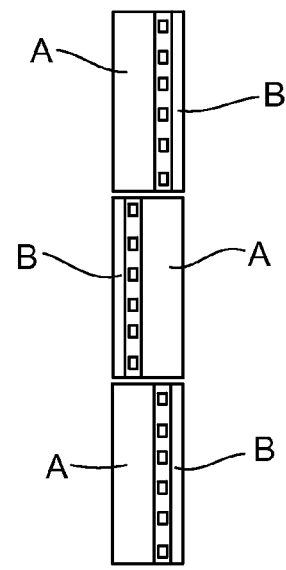
FIG. 16A  FIG. 16B
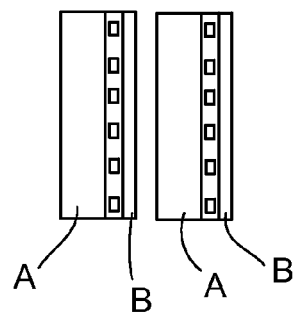 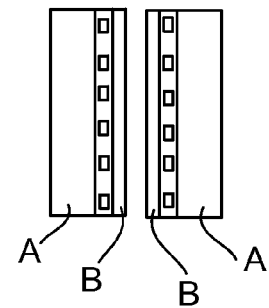
FIG. 16C  FIG. 16D
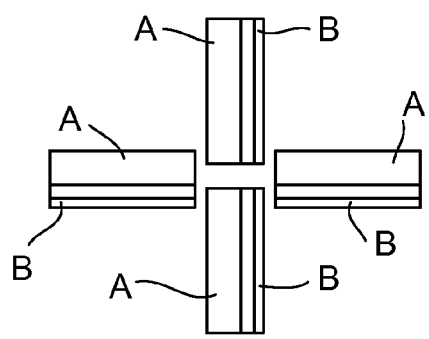 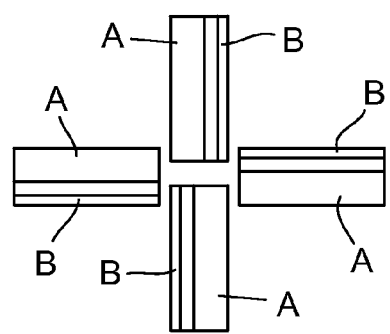
FIG. 16E  FIG. 16F

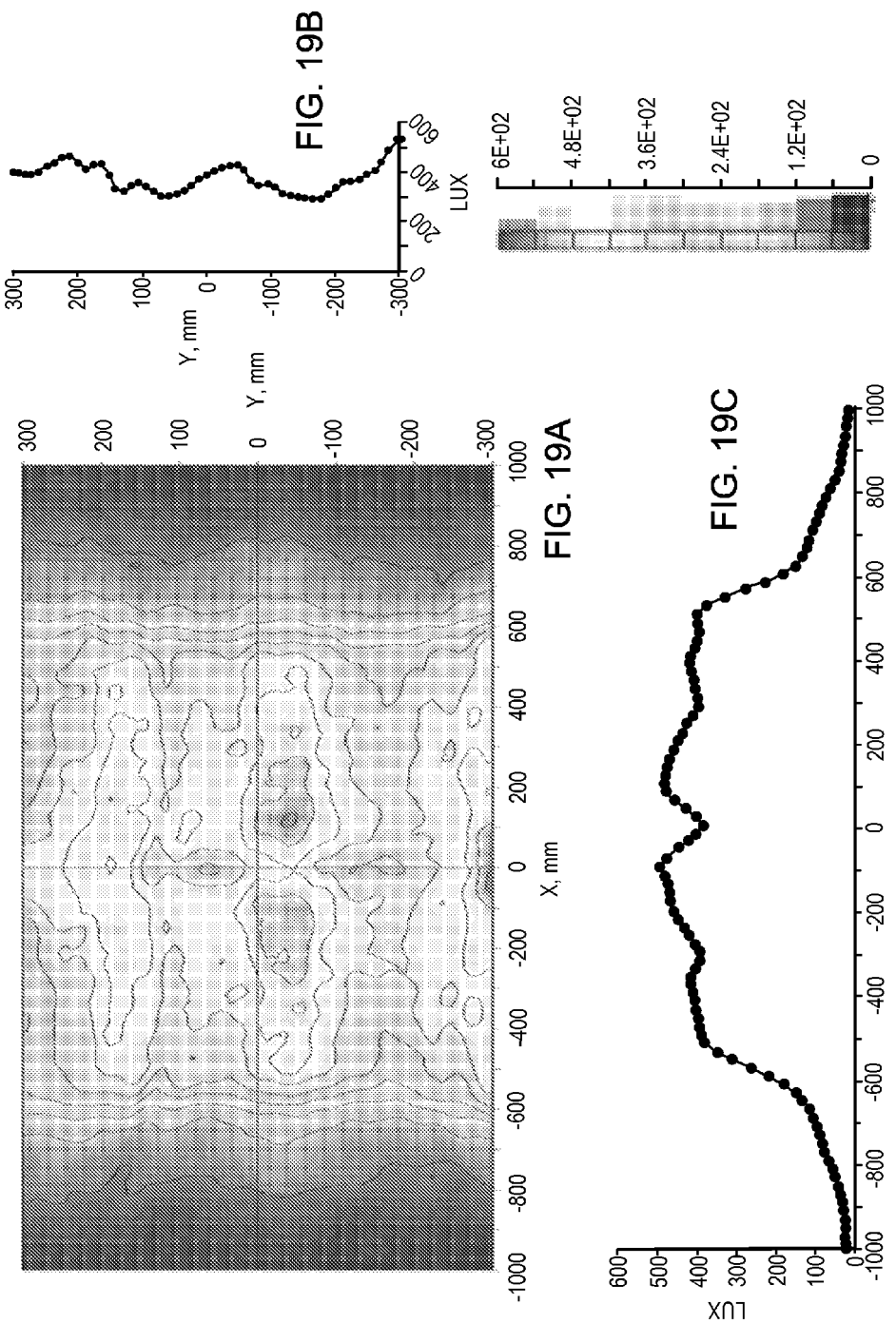

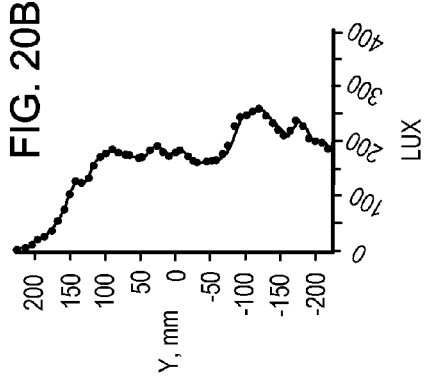
FIG. 20B
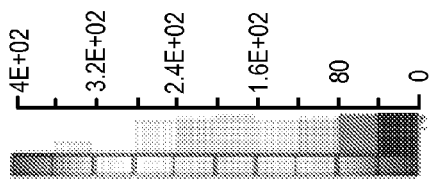
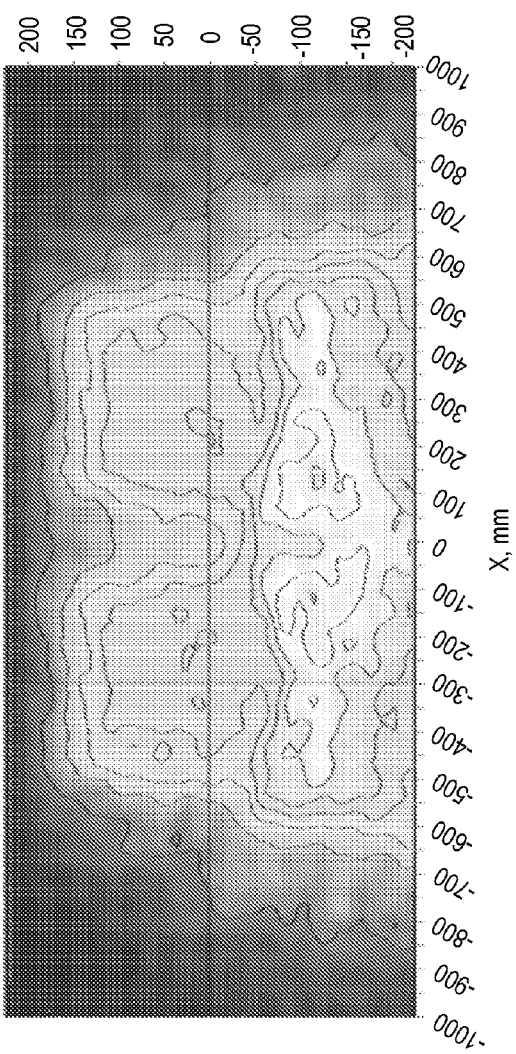
FIG. 20A
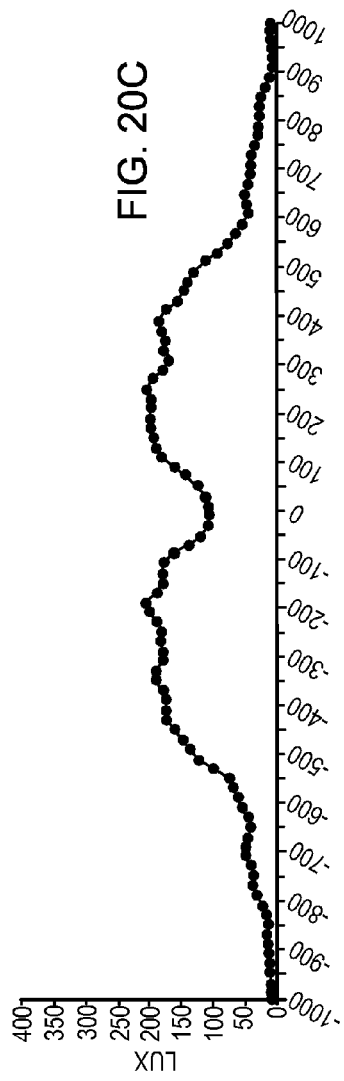
FIG. 20C

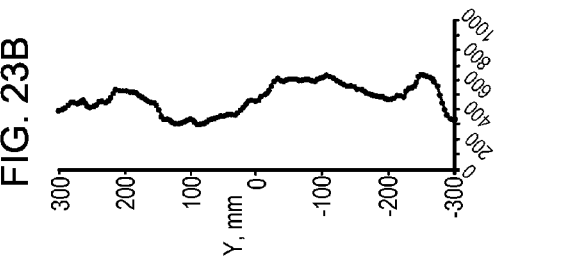
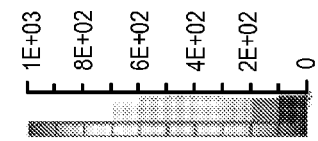
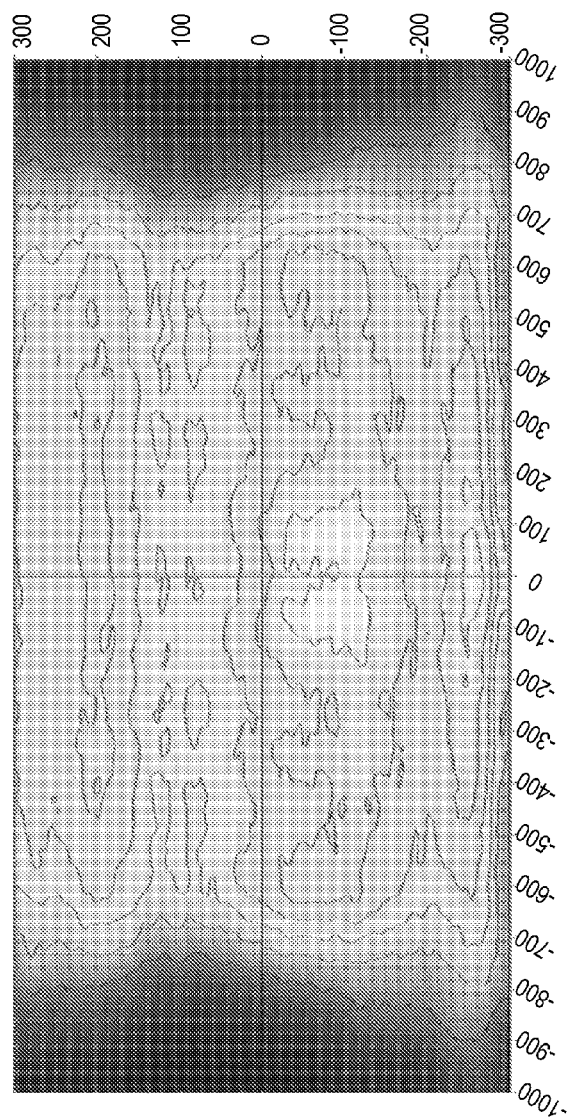
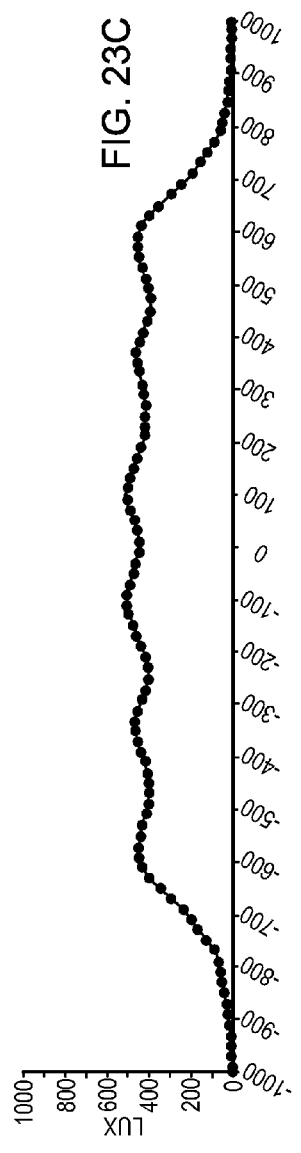
FIG. 23A
FIG. 23B
FIG. 23C

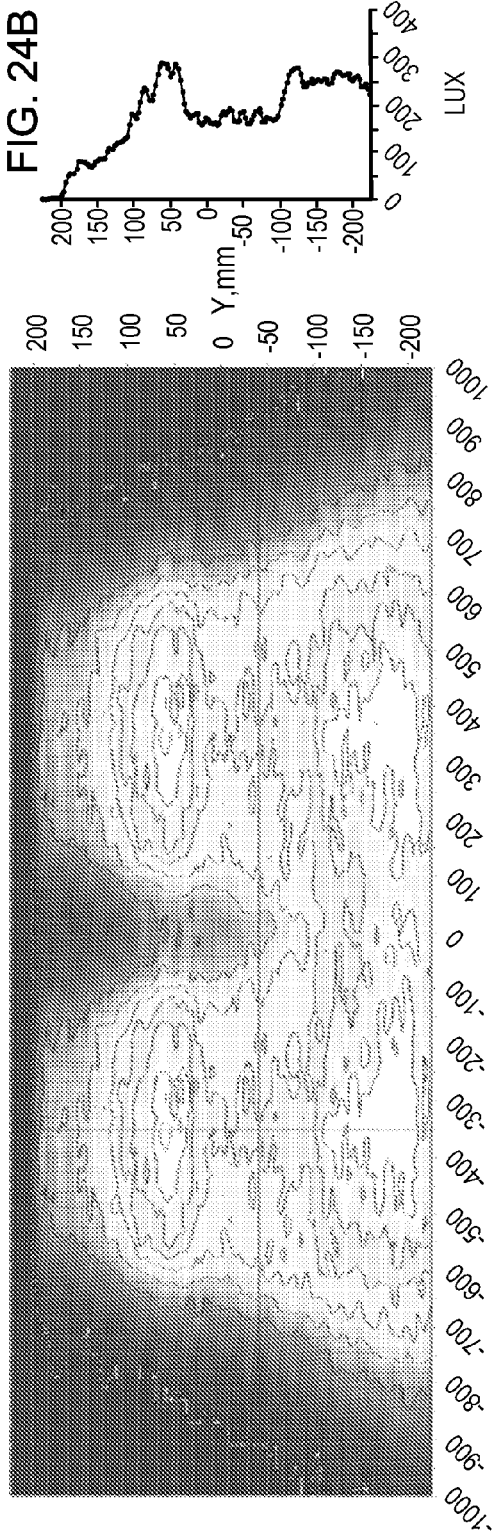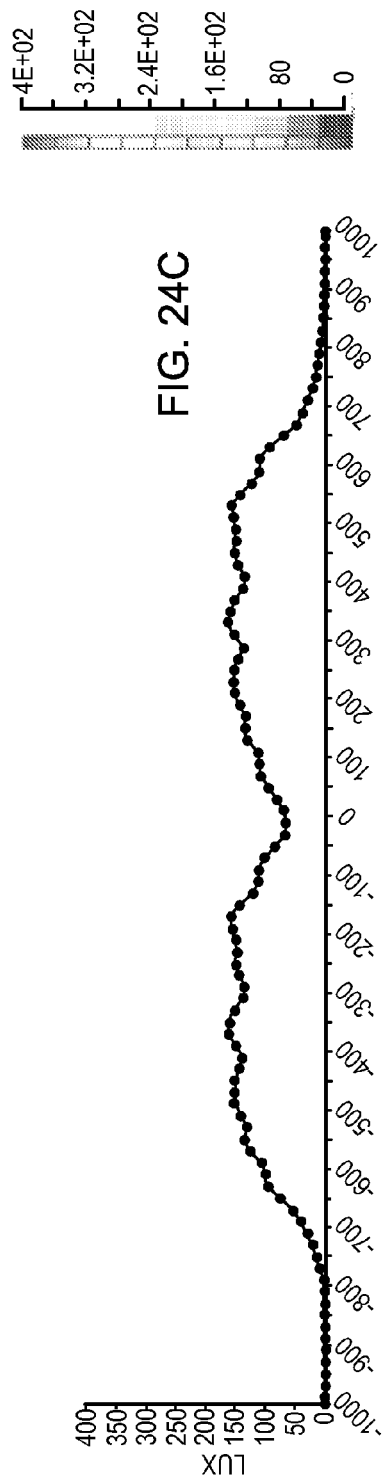
FIG. 24A
FIG. 24B
FIG. 24C

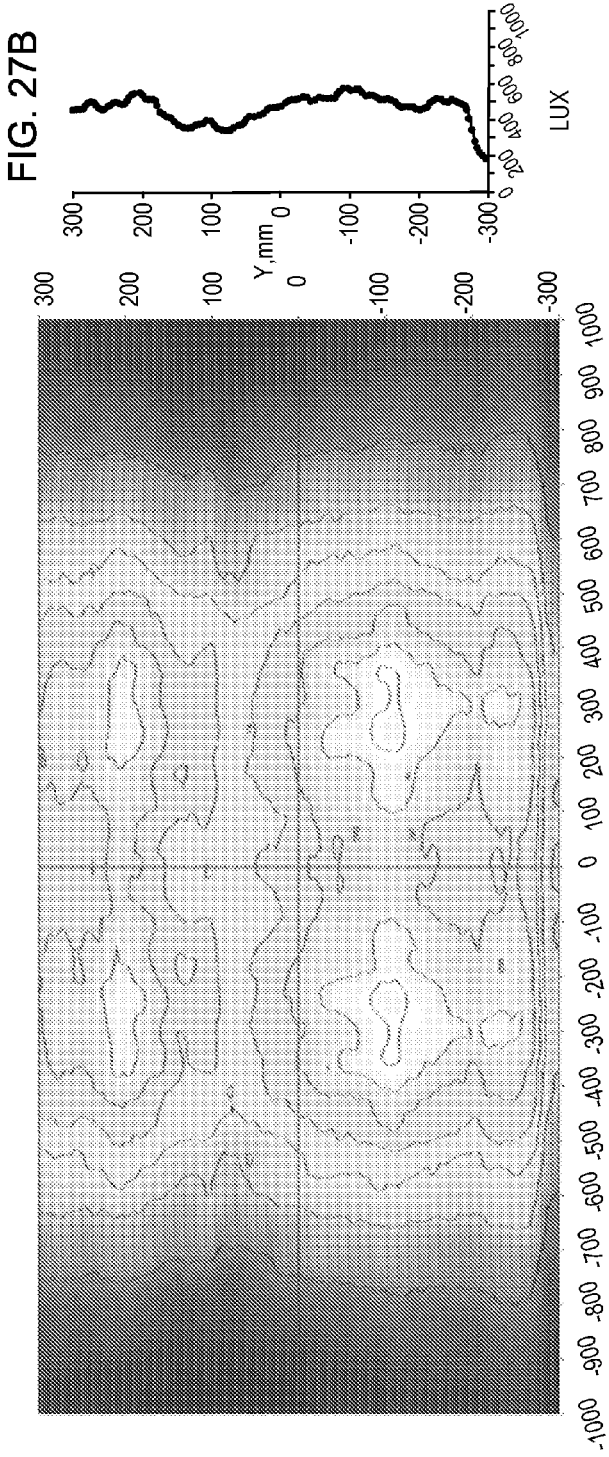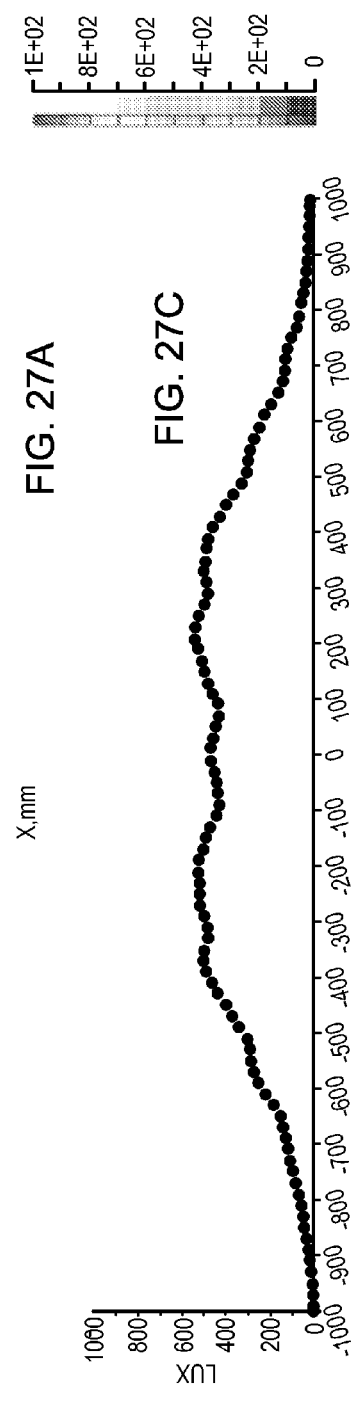
FIG. 27A
FIG. 27B
FIG. 27C

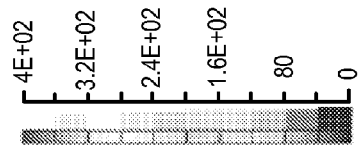
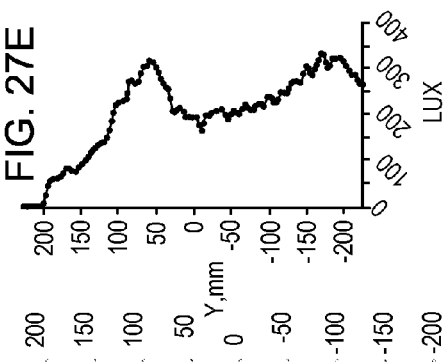
FIG. 27E
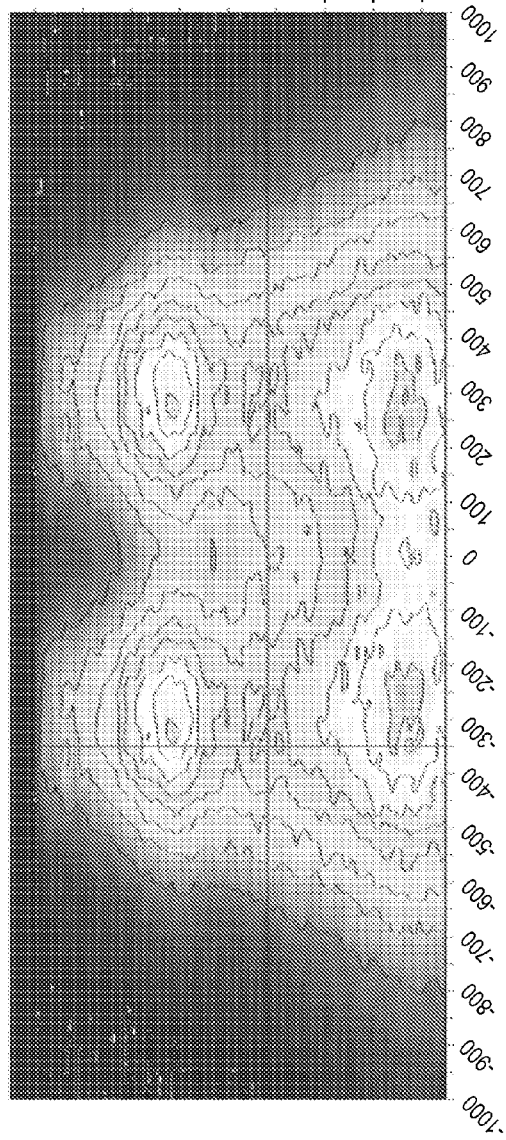
FIG. 27D
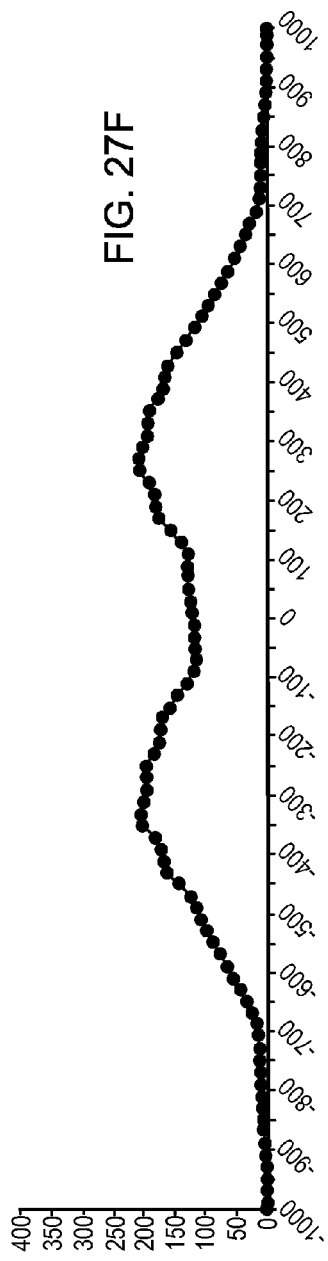
FIG. 27F

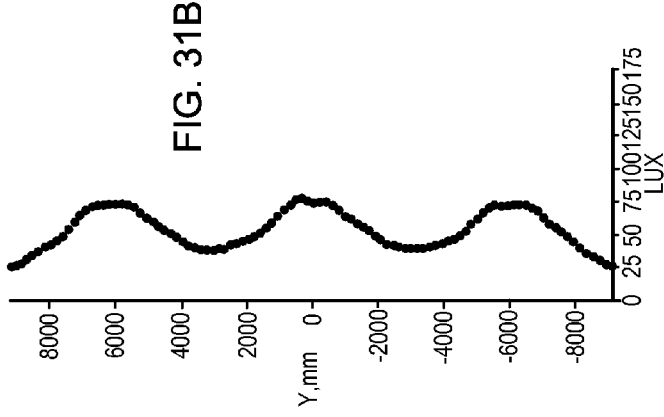
FIG. 31B
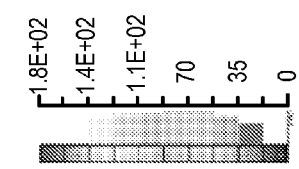
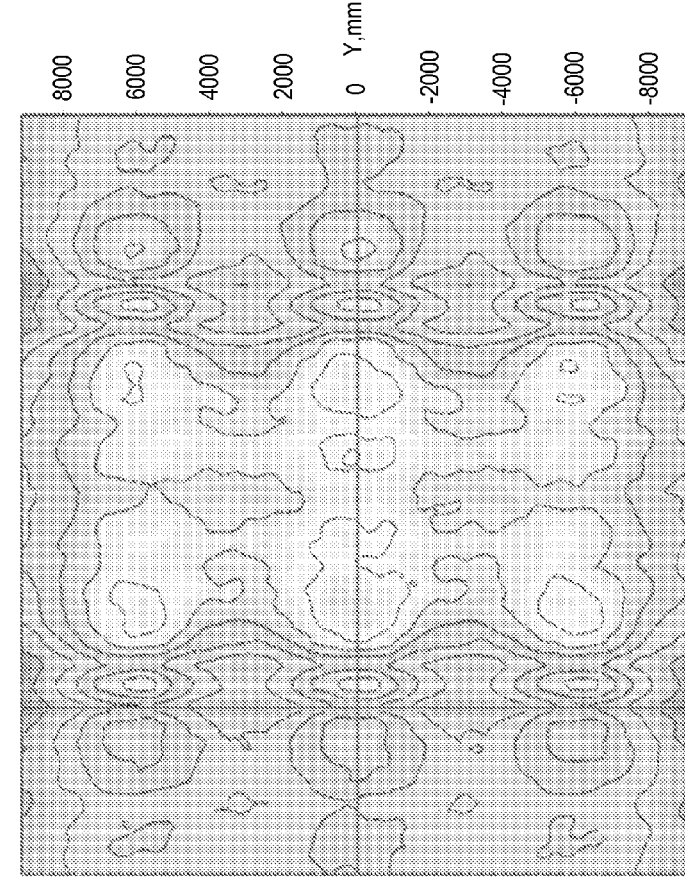
FIG. 31A
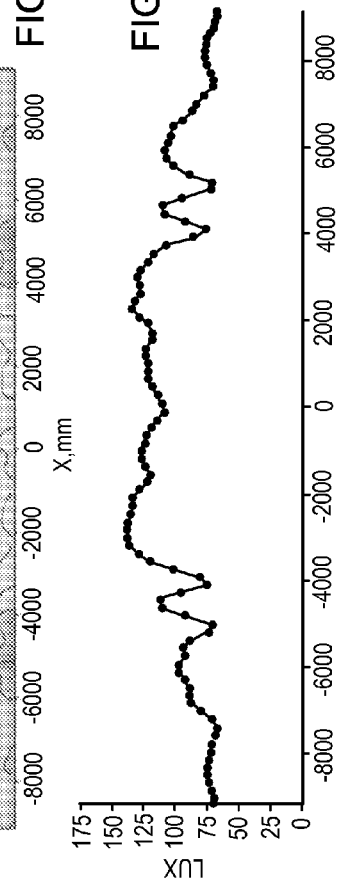
FIG. 31C

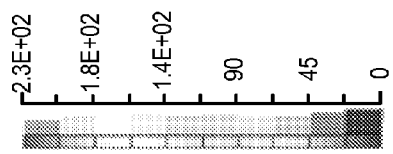
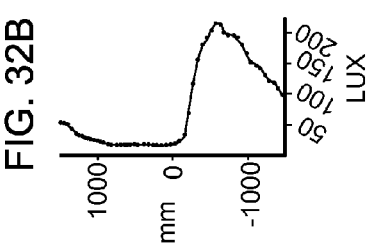
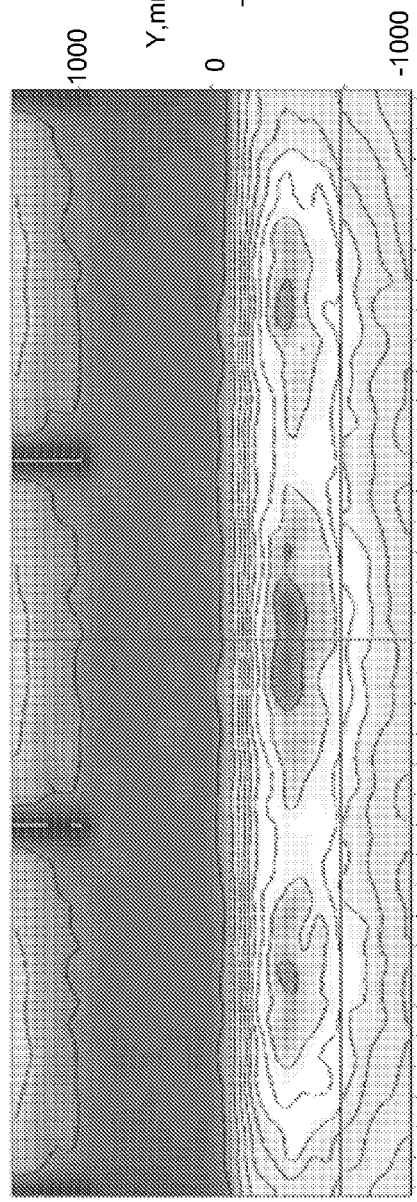
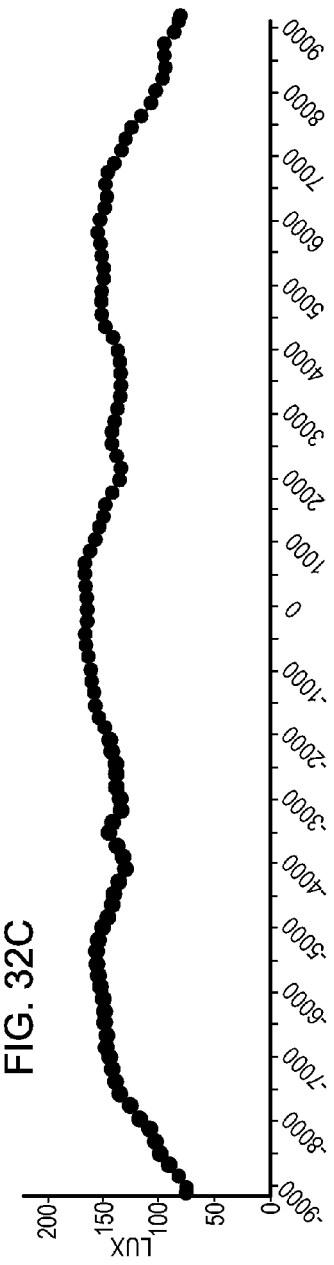

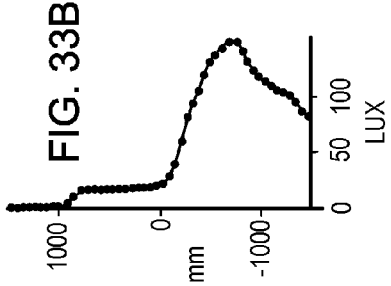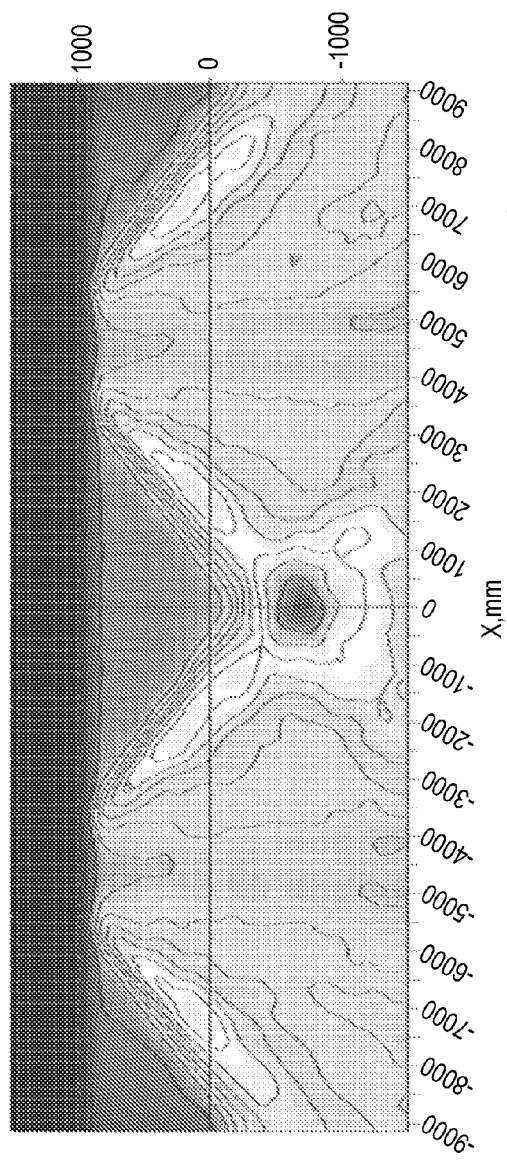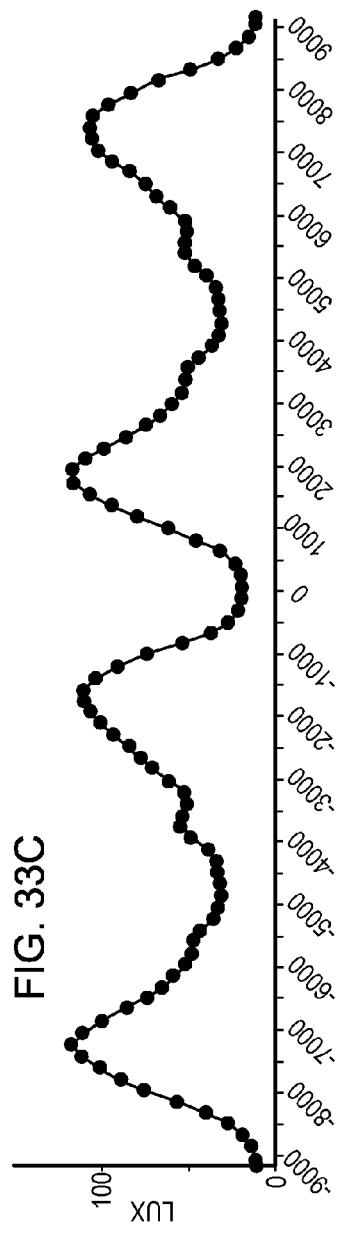

ILLUMINATION DEVICES INCLUDING MULTIPLE LIGHT EMITTING ELEMENTS

CROSS-REFERENCE TO RELATED APPLICATIONS

This application is a continuation of U.S. patent application Ser. No. 13/570,243, entitled "Illumination Devices including Multiple Light Emitting Elements," filed on Aug. 8, 2012, the entire contents of which is hereby incorporated by reference. U.S. patent application Ser. No. 13/570,243 filed on Aug. 8, 2012 is a continuation-in-part of U.S. patent application Ser. No. 13/205,548, filed on Aug. 8, 2011, and also claims benefit of the following U.S. provisional applications: 61/594,954 filed Feb. 3, 2012, 61/594,849 filed Feb. 3, 2012, 61/603,205 filed Feb. 24, 2012, & 61/640,719 filed Apr. 30, 2012. The entire contents of each of these priority applications are hereby incorporated by reference.

BACKGROUND

Light sources are used in a variety of applications, such as providing general illumination and providing light for electronic displays (e.g., LCDs). Historically, incandescent light sources have been widely used for general illumination purposes. Incandescent light sources produce light by heating a filament wire to a high temperature until it glows. The hot filament is protected from oxidation in the air with a glass enclosure that is filled with inert gas or evacuated. Incandescent light sources are gradually being replaced in many applications by other types of electric lights, such as fluorescent lamps, compact fluorescent lamps (CFL), cold cathode fluorescent lamps (CCFL), high-intensity discharge lamps, and light-emitting diodes (LEDs).

SUMMARY

A variety of luminaires (also referred to as illumination devices) are disclosed that are configured to manipulate light provided by one or more light-emitting elements (LEEs). In general, embodiments of the luminaires feature one or more optical couplers (e.g., parabolic reflectors) that redirect illumination from the LEEs to a reflector which then directs the light into a range of angles. The optical couplers can be referred to interchangeably as primary optics or optical collectors. In some embodiments, the luminaire includes a second reflector that reflects at least some of the light from the first reflector. In certain embodiments, the luminaire includes a light guide that guides light from the optical coupler to the first reflector. The components of the luminaire can be configured in a variety of ways so a variety of intensity distributions can be output by the luminaire. Such luminaires can be configured to provide light for particular lighting applications, including office lighting, task lighting, cabinet lighting, garage lighting, wall wash, stack lighting, and down-lighting.

Among other advantages, embodiments of the luminaires can provide inexpensive illumination solutions with highly uniform illumination and chromaticity, also referred to as color, in ranges of angles tailored for specific lighting applications.

In one aspect, an illumination device includes a substrate having first and second opposing surfaces, such that each of the first and second surfaces are elongated and have a longitudinal dimension and a transverse dimension shorter than the longitudinal dimension; a plurality of light-emitting elements (LEE) arranged on the first surface of the substrate and distributed along the longitudinal dimension, such that the LEEs emit, during operation, light in a first angular range with respect to a normal to the first surface of the substrate; one or more solid primary optics arranged in an elongated configuration along the longitudinal dimension of the first surface and coupled with the LEEs, the one or more solid primary optics being shaped to redirect light received from the LEEs in the first angular range, and to provide the redirected light in a second angular range, a divergence of the second angular range being smaller than a divergence of the first angular range at least in a plane perpendicular to the longitudinal dimension of the first surface of the substrate; a solid light guide comprising input and output ends, the input and output ends of the solid light guide being elongated in the longitudinal dimension and having substantially the same shape, where the input end of the solid light guide is coupled to the one or more solid primary optics to receive the light provided by the solid primary optic in the second angular range, and the solid light guide is shaped to guide the light received from the solid primary optic in the second angular range and to provide the guided light in substantially the same second angular range with respect to the first surface of the substrate at the output end of the solid light guide; and a solid secondary optic comprising an input end, a redirecting surface opposing the input end and first and second output surfaces, such that each of the input end, and redirecting, first output and second output surfaces of the solid secondary optic are elongated along the longitudinal dimension. The input end of the solid secondary optic is coupled to the output end of the solid light guide to receive the light provided by the solid light guide in the second angular range. The redirecting surface has first and second portions that reflect the light received at the input end of the solid secondary optic in the second angular range, and provide the reflected light in third and fourth angular ranges with respect to the normal to the first surface of the substrate towards the first and second output surfaces, respectively, where at least prevalent directions of propagation of light in the third and fourth angular ranges are different from each other and from a prevalent direction of propagation of light in the second angular range at least perpendicular to the longitudinal dimension of the first surface of the substrate. The first output surface is shaped to refract the light provided by the first portion of the redirecting surface in the third angular range as first refracted light, and to output the first refracted light in a fifth angular range with respect to the normal to the first surface of the substrate outside the first output surface of the solid secondary optic, and the second output surface is shaped to refract the light provided by the second portion of the redirecting surface in the fourth angular range as second refracted light, and to output the second refracted light in a sixth angular range with respect to the normal of the first surface of the substrate outside the second output surface of the solid secondary optic.

The foregoing and other embodiments can each optionally include one or more of the following features, alone or in combination. The illumination device can further include a tertiary optic including a first reflector elongated along the longitudinal dimension, the first reflector at least in part facing the first output surface of the solid secondary optic, wherein the first reflector is shaped to reflect at least some of the light output by the first output surface of the solid secondary optic in the fifth angular range as first reflected light in a seventh angular range with respect to the normal to the first surface of the substrate, wherein at least a prevalent direction of propagation of light of the seventh angular range is different from a prevalent direction of propagation of light of the fifth angular range at least in a plane perpendicular to the longitudinal dimension, such that a first portion of the intensity distribution output by the illumination device during operation includes at least some of the first reflected light. The first reflector can be coupled to an edge of the first output surface of the solid secondary optic, and at least a portion of the first reflector is an involute of at least a portion of the first output surface of the solid secondary optic. The tertiary optic can further include a second reflector elongated along the longitudinal dimension, the second reflector facing the second output surface of the solid secondary optic, wherein the second reflector is shaped to reflect at least some of the light output by the second output surface of the solid secondary optic in the sixth angular range as second reflected light in an eight angular range with respect to the normal to the first surface of the substrate, wherein at least a prevalent direction of propagation of light of the eight angular range is different from a prevalent direction of propagation of light of the sixth angular range at least in a plane perpendicular to the longitudinal dimension, such that the first portion of the intensity distribution output by the illumination device during operation includes at least some of the second reflected light.

In some implementations, the first and second reflectors at least in part transmit at least some of the light output by the first and second output surfaces of the solid secondary optic in the fifth and sixth angular ranges, respectively, wherein a second portion of the intensity distribution output by the illumination device during operation includes the transmitted light. The first and second reflectors have perforations, the perforations being positioned to transmit at least some of the light output by the first and second output surfaces of the solid secondary optic in the fifth and sixth angular ranges, respectively, wherein the second portion of the intensity distribution output by the illumination device during operation includes the transmitted light.

In some implementations, a first parameter combination can include (i) a shape of the one or more primary optics, (ii) a shape of the first portion of the redirecting surface and an orientation thereof relative to the input end of the solid secondary optic, (iii) a shape of the first output surface and an orientation thereof relative to the first portion of the redirecting surface, and (iv) a configuration of the light guide, the first parameter combination determining the fifth angular range, wherein the first parameter combination is tailored such that the fifth angular range matches a predefined fifth angular range; a second parameter combination can include (v) the shape of the one or more primary optics, (vi) a shape of the second portion of the redirecting surface and an orientation thereof relative to the input end of the solid secondary optic, (vii) a shape of the second output surface and an orientation thereof relative to the first portion of the redirecting surface, and (viii) the configuration of the light guide, the second parameter combination determining the sixth angular range, wherein the second parameter combination is tailored such that the sixth angular range matches a predefined sixth angular range, and a relative offset of the first and second portions of the redirecting surface with respect to the input end of the solid secondary optic determines a relative distribution of light between the fifth angular range and the sixth angular range, wherein the relative offset is selected such that the relative distribution matches a predefined relative distribution.

In some implementations, the first parameter combination further can include an intensity distribution of light provided by the one or more LEEs within the first angular range, the second parameter combination further comprises the intensity distribution of light provided by the one or more LEEs within the first angular range. The illumination device of claim 7, can further include a tertiary optic comprising: a reflector elongated along the longitudinal dimension, the reflector at least in part facing the first output surface of the solid secondary optic, wherein the reflector reflects at least some of the light output by the first output surface of the solid secondary optic in the predefined fifth angular range as first reflected light in a seventh angular range with respect to the normal to the first surface of the substrate, wherein at least a prevalent direction of propagation of light of the seventh angular range is different from a prevalent direction of propagation of light of the predefined fifth angular range at least in a plane perpendicular to the longitudinal dimension, such that a first portion of the intensity distribution output by the illumination device during operation includes the first reflected light, and a second portion of the intensity distribution output by the illumination device during operation includes at least some of the light output by the second output surface of the solid secondary optic within the predefined sixth angular range, wherein the intensity distribution is asymmetric with respect to the first portion and the second portion.

In some implementations, a system can include N such illumination devices, where N is an even number larger or equal to 4, the N illumination devices being connected to each other to form a polygon, such that the substrates of the connected illumination devices lie in a common plane, and any of pair-wise parallel illumination devices from among the connected illumination devices outputs the first portion of the intensity distribution towards each other, and the second portion of the intensity distribution away from each other. N can be a number larger or equal to 3, the N illumination devices arranged such that the substrates of the illumination devices are substantially coplanar, and each one of the illumination devices can output the first portion of the intensity distribution towards one or more opposite ones of the illumination devices, and emits the second portion of the intensity distribution away from each other. In some implementations, N can be odd number.

In some implementations, at least one of the input end, the redirecting surface, and the first and second output surfaces of the solid secondary optic has a uniform cross-sectional shape perpendicular to the longitudinal dimension of the first surface of the substrate. In some implementations, for a cross-sectional plane perpendicular to the longitudinal dimension of the first surface of the substrate, the redirecting surface has an apex that separates the first and second portions of the redirecting surface. In some implementations, for a cross-sectional plane perpendicular to the longitudinal dimension of the first surface of the substrate, the redirecting surface is shaped as an arc of a circle, and the first and second portions of the redirecting surface represent first and second portions of the arc of the circle. In some implementations, for a cross-sectional plane perpendicular to the longitudinal dimension of the first surface of the substrate, either of the first and second portions of the redirecting surface has one or more apexes. In some implementations, for a cross-sectional plane perpendicular to the longitudinal dimension of the first surface of the substrate, the first portion of the redirecting surface is shaped as a plurality of potentially disjoint, piecewise differentiable first curves, and the second portion of the redirecting surface is shaped as a plurality of potentially disjoint, piecewise differentiable second curves.

In some implementations, the plurality of LEEs and the one or more solid primary optics are integrally formed. In some implementations, the one or more solid primary optics, the solid light guide and the solid secondary optic are integrally formed of one or more transparent materials, and the one or more transparent materials have substantially matching refractive indices.

An angular range includes (i) a divergence of the angular range and (ii) a prevalent direction of propagation of light in the angular range, wherein the prevalent direction of propagation corresponds to a direction along which a portion of an intensity distribution has a maximum, and the divergence corresponds to a solid angle outside of which the intensity distribution drops below a predefined fraction of the maximum of the intensity distribution.

In another aspect, an illumination device includes one or more light-emitting elements (LEEs) operatively disposed on one or more substrates and configured to emit light in a first angular range; one or more primary optics optically coupled with the one or more LEEs and configured to direct light received from the one or more LEEs in the first angular range at one or more input ends of the one or more primary optics, and provide directed light in a second angular range at one or more output ends of the one or more primary optics, a divergence of the second angular range being smaller than a divergence of the first angular range; a light guide optically coupled at an input end of the light guide with the one or more output ends of the one or more primary optics, the light guide shaped to guide light received from the one or more primary optics in the second angular range to an output end of the light guide and provide guided light in substantially the same second angular range at the output end of the light guide; and a solid secondary optic optically coupled with the second end of the light guide at an input end of the solid secondary optic to receive light from the light guide, the solid secondary optic having a redirecting surface spaced from the input end of the solid secondary optic and an output surface, the redirecting surface configured to reflect light received at the input end of the solid secondary optic in the second angular range and provide the reflected light in a third angular range towards the output surface, the output surface extending between the input end and the redirecting surface, the output surface being shaped to refract the light provided by the redirecting surface in the third angular range as refracted light and to output the refracted light in a fourth angular range outside the output surface of the solid secondary optic, the solid secondary optic having an elongated configuration to provide the fourth angular range with a longitudinal extension and a shorter, transverse extension.

The foregoing and other embodiments can each optionally include one or more of the following features, alone or in combination. In some implementations, the illumination device can further comprise a second redirecting surface and a second output surface, the second redirecting surface spaced from the input end of the solid secondary optic and configured to reflect light received at the input end of the solid secondary optic in the second angular range and provide the reflected light in a fifth angular range towards the second output surface, the second output surface extending between the input end and the second redirecting surface, the second output surface being shaped to refract the light provided by the second redirecting surface in the fifth angular range as refracted light in a sixth angular range outside the second output surface of the solid secondary optic, the elongated configuration of the solid secondary optic configured to provide the sixth angular range with a longitudinal dimension. In some implementations, the illumination device can further comprise an elongated first reflector optic facing the output surface and arranged along the longitudinal extension of the fourth angular range, wherein the first reflector optic is shaped to reflect at least some of the light output by the output surface of the solid secondary optic in the fourth angular range as first reflected light, and to provide the first reflected light in a seventh angular range, wherein the seventh angular range is different than the fourth angular range.

In some implementations, the elongated first reflector optic is spaced apart from the output surface. In some implementations, the illumination device can further comprise an elongated second reflector optic facing the second output surface and arranged along the longitudinal extension of the sixth angular range, wherein the second reflector optic is shaped to reflect at least some of the light output by the second output surface of the solid secondary optic in the sixth angular range as second reflected light, and to provide the second reflected light in an eight angular range, wherein the eighth angular range is different than the sixth angular range. The elongated second reflector optic can be spaced apart from the second output surface.

In some implementations, the one or more substrates include one integrally formed, elongated substrate. In some implementations, the one or more substrates include a plurality of substrates, the plurality of substrates having an elongated configuration. In some implementations, one or more of the LEEs and one or more of the primary optics are integrally formed. In some implementations, the one or more primary optics include one integrally formed, elongated primary optic. In some implementations, the one or more primary optics include a plurality of primary optics, the plurality of primary optics having an elongated configuration. In some implementations, the one or more primary optics are configured as one or more solid primary optics and the light guide is configured as a solid light guide. In some implementations, the one or more solid primary optics, the solid light guide and the solid secondary optic are integrally formed of one or more transparent materials, and the one or more transparent materials have substantially matching refractive indices.

In some implementations, the illumination device can further comprise a reflective layer disposed on the redirecting surface of the solid secondary optic. In some implementations, the redirecting surface of the solid secondary optic is configured to reflect at least some of the light received at the input end of the solid secondary optic in the second angular range via total internal reflection. The longitudinal extension of the fourth angular range is perpendicular to a prevalent direction of propagation of light emitted by the one or more LEEs in the first angular range. In some implementations, a shape of the input end of the light guide matches a shape of the output end of the one or more primary optics. In some implementations, a shape of the input end of the solid secondary optic matches a shape of the output end of the light guide.

In one aspect, an illumination device includes a substrate having first and second opposing surfaces, such that each of the first and second surfaces are elongated and have a longitudinal dimension and a transverse dimension shorter than the longitudinal dimension; a plurality of light-emitting elements (LEE) arranged on the first surface of the substrate and distributed along the longitudinal dimension, such that the LEEs emit, during operation, light in a first angular range with respect to a normal to the first surface of the substrate; one or more primary optics arranged in an elongated configuration along the longitudinal dimension of the first surface and coupled with the LEEs, the one or more primary optics being shaped to redirect light received from the LEEs in the first angular range, and to provide the redirected light in a second angular range, a divergence of the second angular range being smaller than a divergence of the first angular range at least in a plane perpendicular to the longitudinal dimension of the first surface of the substrate; a secondary optic comprising a redirecting surface elongated along the longitudinal dimension, the redirecting surface of the secondary optic being spaced apart from and facing the one or more of the primary optics, wherein the first and second portions of the redirecting surface reflect light received from the one or more primary optics in the second angular range, and provide the reflected light in third and fourth angular ranges with respect to the normal to the first surface of the substrate, respectively, wherein at least prevalent directions of the third and fourth angular ranges are different from each other and from a prevalent direction of propagation of light of the second angular range at least perpendicular to the longitudinal dimension of the first surface of the substrate; and a tertiary optic comprising a first reflector elongated along the longitudinal dimension, the first reflector optic being spaced apart from and facing the first portion of the redirecting surface of the secondary optic, wherein the first reflector is shaped to reflect at least some of the light provided by the first portion of the redirecting surface of the secondary optic in the third angular range with respect to the normal of the first surface of the substrate as first reflected light in a fifth angular range with respect to the normal to the first surface of the substrate, wherein the fifth angular range is different than the third angular range, such that a first portion of an intensity distribution output by the illumination device during operation includes at least some of the first reflected light.

The foregoing and other embodiments can each optionally include one or more of the following features, alone or in combination. A second portion of the intensity distribution output by the illumination device during operation includes at least some of the light provided by the second portion of the redirecting surface of the secondary optic within the fourth angular range. In some implementations, the tertiary optic can further include a second reflector elongated along the longitudinal dimension, the second reflector being spaced apart from and facing the second portion of the redirecting surface of the secondary optic, wherein the second reflector optic is shaped to reflect at least some of the light provided by the second portion of the redirecting surface of the secondary optic in the fourth angular range as second reflected light, and to provide the second reflected light in a sixth angular range with respect to the normal to the first surface of the substrate, wherein the sixth angular range is different than the fourth angular range, such that the first portion of the intensity distribution output by the illumination device during operation includes at least some of the second reflected light. In some implementations, at least one of the first and second reflectors is thermally coupled with the substrate. In some implementations, the one or more primary optics are configured as one or more solid primary optics. In some implementations, the first and second reflectors at least in part transmit at least some of the light received from the redirecting surface, wherein a second portion of the intensity distribution output by the illumination device during operation includes the transmitted light. In some implementations, the first and second reflectors have perforations configured to provide the transmitted light. In some implementations, the first and second reflectors are arranged to have partial overlap with the fourth and sixth angular ranges, such that a second portion of the intensity distribution output by the illumination device during operation includes at least some of the light provided by the first and second redirecting surfaces that passes the first and second reflectors without being reflected.

A first parameter combination can include (i) an intensity distribution of light provided by the one or more LEEs within the first angular range, (ii) a shape of the one or more primary optics, and (iii) a shape of the first portion of the redirecting surface and an orientation thereof, the first parameter combination determining the fifth angular range, wherein the first parameter combination is tailored such that the fifth angular range matches a predefined fifth angular range; a second parameter combination comprises (iv) an intensity distribution of light provided by the one or more LEEs within the first angular range, (v) a shape of the one or more primary optics, and (vi) a shape of the second portion of the redirecting surface and an orientation thereof, the second parameter combination determining the sixth angular range, wherein the second parameter combination is tailored such that the sixth angular range matches a predefined sixth angular range, and a relative offset of the first and second portions of the redirecting surface with respect to the second angular range determines a relative distribution of light between the fifth angular range and the sixth angular range, wherein the relative offset is selected such that the relative distribution matches a predefined relative distribution.

In some implementations, a first portion of the intensity distribution output by the illumination device during operation includes the first reflected light, and a second portion of the intensity distribution output by the illumination device during operation includes at least some of the light reflected from the second redirecting surface, wherein the intensity distribution is asymmetric with respect to the first portion and the second portion. In some implementations, at least one of the first and second reflector comprises a curved portion and a substantially planar portion. In some implementations, a system can include N such illumination devices, where N is a number larger or equal to 3, the N illumination devices arranged such that the substrates of the illumination devices are substantially coplanar, and each one of the illumination devices outputs the first portion of the intensity distribution towards one or more opposite ones of the illumination devices, and emits the second portion of the intensity distribution away from each other. In some implementations, N can be an odd number. E.g., N equals 4.

In some implementations, the tertiary optics of the illumination devices comprise a common reflector. In some implementations, the redirecting surface comprises a reflective material, where the reflective material includes one or more of Ag or Al. In some implementations, the secondary optic has a uniform cross-sectional shape along the longitudinal dimension of the first surface of the substrate. In some implementations, at least one of the first and second portions of the redirecting surface has a uniform cross-sectional shape perpendicular to the longitudinal dimension of the first surface of the substrate.

In some implementations, for a cross-sectional plane perpendicular to the longitudinal dimension of the first surface of the substrate, the redirecting surface has an apex that separates the first and second portions of the redirecting surface. In some implementations, the apex of the redirecting surface is a rounded vertex with a non-zero radius of curvature. In some implementations, the first and second portions of the redirecting surface have first and second arcuate shapes in the cross-sectional plane perpendicular to the longitudinal dimension of the first surface of the substrate. In some implementations, the first and second portions of the redirecting surface have one or more first and second linear shapes in the cross-sectional plane perpendicular to the longitudinal dimension of the first surface of the substrate, such that the apex has a v-shape in the cross-sectional plane. In some implementations, for a cross-sectional plane perpendicular to the longitudinal dimension of the first surface of the substrate, the redirecting surface is shaped as an arc of a circle, and the first and second portions of the redirecting surface represent first and second portions of the arc of the circle. In some implementations, the first and second portions of the redirecting surface are separated, at least in part, by a slot, and for a cross-sectional plane perpendicular to the longitudinal dimension of the first surface of the substrate that intersects the slot, first and second curves corresponding to the first and second portions of the redirecting surface are separated by a discontinuity.

In some implementations, at least portions of the first and second portions of the redirecting surface partially transmit light. In some implementations, either of the first and second portions of the redirecting surface comprise one or more slots, and for a cross-sectional plane perpendicular to the longitudinal dimension of the first surface of the substrate that intersects the one or more slots, first and second curves corresponding to the first and second portions of the redirecting surface comprise one or more discontinuities associated with the one or more slots. In some implementations, for a cross-sectional plane perpendicular to the longitudinal dimension of the first surface of the substrate, either of the first and second portions of the redirecting surface has one or more apexes. In some implementations, for a cross-sectional plane perpendicular to the longitudinal dimension of the first surface of the substrate, the first portion of the redirecting surface is shaped as a plurality of potentially disjoint, piecewise differentiable first curves, and the second portion of the redirecting surface is shaped as a plurality of potentially disjoint, piecewise differentiable second curves.

In some implementations, the substrate is integrally formed. In some implementations, the substrate comprises a plurality of substrate tiles distributed in an elongated configuration, each of the substrate tiles corresponding to one or more of the plurality of LEEs. In some implementations, the one or more solid primary optics comprise one integrally formed, elongated primary optic. In some implementations, the one or more primary optics comprise a plurality of primary optics, the plurality of primary optics distributed in an elongated configuration. In some implementations, the plurality of LEEs and the one or more primary optics are integrally formed.

An angular range comprises (i) a divergence of the angular range and (ii) a prevalent direction of propagation of light in the angular range, wherein the prevalent direction of propagation corresponds to a direction along which a portion of an intensity distribution has a maximum, and the divergence corresponds to a solid angle outside of which the intensity distribution drops below a predefined fraction of the maximum of the intensity distribution. In some implementations, the predefined fraction is 5%.

In one aspect, an illumination device includes one or more light-emitting elements (LEEs) operatively disposed on one or more substrates and configured to emit light in a first angular range; one or more primary optics optically coupled with the one or more LEEs and configured to direct light received from the one or more LEEs in the first angular range and provide directed light in a second angular range, the second angular range being smaller than the first angular range; and a secondary optic spaced apart from the one or more primary optics and arranged to receive light from the one or more primary optics in the second angular range, the secondary optic having a redirecting surface configured to reflect light received from the one or more primary optics in the second angular range and provide the reflected light in a third angular range, the third angular range being different from the second angular range, the secondary optic having an elongated configuration to provide the third angular range with a longitudinal extension and a shorter, transverse extension.

The foregoing and other embodiments can each optionally include one or more of the following features, alone or in combination. In some implementations, the illumination device can further include a second redirecting surface, the second redirecting surface configured to reflect light received from the one or more primary optics in the second angular range and provide the reflected light in a fourth angular range, the fourth angular range being different from the second angular range and the third angular range, the elongated configuration of the secondary optic configured to provide the fourth angular range with a longitudinal extension. In some implementations, the illumination device can further include an elongated first reflector optic being spaced apart from and facing the redirecting surface and arranged along the longitudinal extension of the third angular range, wherein the first reflector optic is shaped to reflect at least some of the light received from the redirecting surface in the third angular range as first reflected light, and to provide the first reflected light in a fifth angular range, wherein the fifth angular range is different than the third angular range at least perpendicular to the longitudinal extension of the third angular range. In some implementations, the illumination device can further include an elongated second reflector optic being spaced apart from and facing the redirecting surface and arranged along the longitudinal extension of the fourth angular range, wherein the second reflector optic is shaped to reflect at least some of the light received from the second redirecting surface in the fourth angular range as second reflected light, and to provide the second reflected light in a sixth angular range, wherein the sixth angular range is different than the fourth angular range at least perpendicular to the longitudinal extension of the fourth angular range.

In some implementations, the one or more substrates include one integrally formed, elongated substrate. In some implementations, the one or more substrates include a plurality of substrates, the plurality of substrates having an elongated configuration. In some implementations, one or more of the LEEs and one or more of the primary optics are integrally formed. In some implementations, the one or more primary optics include one integrally formed, elongated primary optic. In some implementations, the one or more primary optics include a plurality of primary optics, the plurality of primary optics having an elongated configuration. In some implementations, the one or more primary optics are configured as one or more solid primary optics. In some implementations, the longitudinal extension of the third angular range is perpendicular to a prevalent direction of propagation of light emitted by the one or more LEEs in the first angular range.

In one aspect, an illumination device includes one or more light-emitting elements (LEEs) operatively disposed on a first surface of a substrate and configured to emit light in a first angular range; one or more primary optics optically coupled with the one or more LEEs and configured to direct light received from the one or more LEEs in the first angular range and provide directed light in a second angular range with respect to the first surface of the substrate, the second angular range being smaller than the first angular range; a secondary optic spaced apart from the one or more primary optics and arranged to receive light from the one or more primary optics in the second angular range, the secondary optic having a redirecting surface having and apex facing the one or more primary optics and configured to reflect light received from the one or more primary optics in the second angular range and provide the reflected light in a third angular range with respect to the first surface of the substrate, the third angular range being different from the second angular range, the secondary optic defining an optical axis through the apex; and a reflector optic spaced apart from and facing the redirecting surface, the reflector optic shaped to reflect at least some of the light received from the redirecting surface in the third angular range as first reflected light, and to provide the first reflected light in a fifth angular range with respect to the first surface of the substrate, wherein the fifth angular range is different than the third angular range at least within a sectional plane through the optical axis.

The foregoing and other embodiments can each optionally include one or more of the following features, alone or in combination. In some implementations, the secondary optic has rotational symmetry about the optical axis through the apex. In some implementations, one or more cross sections of at least a portion of at least one of the primary optics, the secondary optic and the reflector optic comprise a plurality of at least one of a straight and an arcuate portion. In some implementations, the one or more cross sections form an N-sided polygon. E.g., N is an odd number. In some implementations, the polygon is a regular polygon. In some implementations, the one or more cross sections refer to planes perpendicular to the optical axis of the secondary optic. In some implementations, the one or more cross sections refer to planes parallel to the optical axis of the secondary optic. In some implementations, one or more of the LEEs, one or more of the primary optics, and the reflector optic have rotational symmetry about the optical axis of the secondary optic. In some implementations, the rotational symmetry is a discrete rotational symmetry. In some implementations, the rotational symmetry of the secondary optic is a discrete rotational symmetry. In some implementations, one or more of the LEEs, one or more of the primary optics, the secondary optic and the reflector optic are asymmetric with respect to the optical axis of the secondary optic.

In some implementations, a parameter combination comprises (i) a shape of the one or more primary optics, (ii) a shape of the redirecting surface and an orientation thereof relative to the one or more primary optics, and (iii) an intensity distribution of light provided by the one or more LEEs within the first angular range; the parameter combination determining the third angular range, wherein the parameter combination is tailored such that the third angular range matches a predefined third angular range. In some implementations, a relative offset of one or more of the LEEs, one or more of the primary optics, and the secondary optic with respect to one or more of one or more of the LEEs, one or more of the primary optics, and the secondary optic determines an asymmetry of the third angular range, wherein the relative offset is selected such that the asymmetry of the third angular range matches a predefined asymmetry. In some implementations, the one or more LEEs provide an asymmetric first angular range and the parameter combination is tailored to provide a substantially asymmetric predefined third angular range. In some implementations, the one or more LEEs provide a substantially symmetric first angular range and the parameter combination is tailored to provide a substantially asymmetric predefined third angular range.

In some implementations, a first portion of the intensity distribution output by the illumination device during operation includes at least some of the first reflected light. In some implementations, the reflector optic at least in part transmits at least some of the light received from the redirecting surface, wherein a second portion of the intensity distribution output by the illumination device during operation includes the transmitted light. In some implementations, the first and second reflectors have perforations configured to provide the transmitted light. In some implementations, the reflector optic is arranged to have partial overlap with the third angular range, such that a second portion of the intensity distribution output by the illumination device during operation includes at least some of the light provided by the redirecting surfaces that passes the reflector optic without being reflected. In some implementations, the redirecting surface comprises a reflective material, where the reflective material includes one or more of Ag or Al.

In some implementations, the apex of the redirecting surface is a rounded vertex with a non-zero radius of curvature. In some implementations, the redirecting surface has one or more linear shapes in one or more cross-sectional planes through the optical axis of the secondary optic. In some implementations, the redirecting surface is shaped as arcs of a circle. In some implementations, the redirecting surface includes an opening. In some implementations, at least portions the redirecting surface partially transmit light. In some implementations, for a cross-sectional plane the redirecting surface is shaped as a plurality of potentially disjoint, piecewise differentiable curves. In some implementations, the substrate is integrally formed. in some implementations, the substrate comprises a plurality of substrate tiles distributed in an elongated configuration, each of the substrate tiles corresponding to one or more of the LEEs. In some implementations, the one or more primary optics are integrally formed. In some implementations, the one or more LEEs and the one or more primary optics are integrally formed.

An angular range comprises (i) a divergence of the angular range and (ii) a prevalent direction of propagation of light in the angular range, wherein the prevalent direction of propagation corresponds to a direction along which a portion of an intensity distribution has a maximum, and the divergence corresponds to a solid angle outside of which the intensity distribution drops below a predefined fraction of the maximum of the intensity distribution. E.g., the predefined fraction is 5%.

In one aspect, an illumination device includes one or more light-emitting elements (LEEs) operatively disposed on a substrate 3476 and configured to emit light in a first angular range with respect to a normal to a first surface of the substrate; one or more primary optics optically coupled with the one or more LEEs and configured to direct light received from the one or more LEEs in the first angular range at one or more input ends of the one or more primary optics, and provide directed light in a second angular range at one or more output ends of the one or more primary optics, a divergence of the second angular range being smaller than a divergence of the first angular range; a light guide optically coupled at an input end of the light guide with the one or more output ends of the one or more primary optics, the light guide shaped to guide light received from the one or more primary optics in the second angular range to an output end of the light guide and provide guided light in substantially the same second angular range with respect to the first surface of the substrate at the output end of the light guide; and a secondary optic optically coupled with the second end of the light guide at an input end of the secondary optic to receive light from the light guide, the secondary optic having a redirecting surface spaced from the input end of the secondary optic and an output surface, the redirecting surface having an apex facing the input end of the secondary optic and configured to reflect light received at the input end of the secondary optic in the second angular range and provide the reflected light in a third angular range with respect to the normal to the first surface of the substrate towards the output surface, the output surface shaped to refract the light provided by the redirecting surface in the third angular range as refracted light and to output the refracted light in a fourth angular range with respect to the normal to the first surface of the substrate outside the output surface of the secondary optic, the secondary optic defining an optical axis through the apex; wherein the one or more primary optics, the light guide and the secondary optic are integrally formed of a transparent material.

The foregoing and other embodiments can each optionally include one or more of the following features, alone or in combination. In some implementations, the secondary optic has rotational symmetry about the optical axis through the apex. In some implementations, the illumination device can further include a reflector optic facing the output surface, the reflector optic shaped to reflect at least some of the light output by the output surface of the secondary optic in the fourth angular range as first reflected light, and to provide the first reflected light in a fifth angular range with respect to the normal to the first surface of the substrate, wherein the fifth angular range is different than the fourth angular range.

In some implementations, one or more cross sections of at least a portion of at least one of the primary optics, the light guide, the secondary optic and the reflector optic comprise a plurality of at least one of a straight and an arcuate portion. In some implementations, the one or more cross sections form an N-sided polygon. E.g., N is an odd number. In some implementations, the polygon is a regular polygon. In some implementations, the one or more cross sections refer to planes perpendicular to the optical axis of the secondary optic. In some implementations, the one or more cross sections refer to planes parallel to the optical axis of the secondary optic. In some implementations, one or more of the LEEs, one or more of the primary optics, the light guide and the reflector optic have rotational symmetry about the optical axis of the secondary optic. In some implementations, the rotational symmetry is a discrete rotational symmetry. In some implementations, the rotational symmetry of the secondary optic is a discrete rotational symmetry. In some implementations, one or more of the LEEs, one or more of the primary optics, the secondary optic and the reflector optic are asymmetric with respect to the optical axis of the secondary optic. In some implementations, at least a portion of at least one of the primary optics, the light guide, the secondary optic and the reflector optic has a uniform cross section along an extension of the corresponding portion.

A parameter combination comprises (i) a shape of the one or more primary optics, (ii) a shape of the redirecting surface and an orientation thereof relative to the input end of the secondary optic, (iii) a shape of the output surface and an orientation thereof relative to the redirecting surface, (iv) a configuration of the light guide, and (v) an intensity distribution of light provided by the one or more LEEs within the first angular range; the parameter combination determining the fourth angular range, wherein the parameter combination is tailored such that the fourth angular range matches a predefined fourth angular range. In some implementations, a relative offset of one or more of the LEEs, one or more of the primary optics, the light guide, and the secondary optic with respect to one or more of one or more of the LEEs, one or more of the primary optics, the light guide and the secondary optic determines an asymmetry of the fourth angular range, wherein the relative offset is selected such that the asymmetry of the fourth angular range matches a predefined asymmetry.

In some implementations, the one or more LEEs provide an asymmetric first angular range and the parameter combination is tailored to provide a substantially asymmetric predefined fourth angular range. In some implementations, the one or more LEEs provide a substantially symmetric first angular range and the parameter combination is tailored to provide a substantially asymmetric predefined fourth angular range. In some implementations, the reflector optic is spaced apart from the output surface of the secondary optic. In some implementations, the reflector optic is coupled to an edge of the output surface of the secondary optic, and at least a portion of the reflector optic is an involute of at least a portion of the output surface of the solid secondary optic with respect to at least one cross section of the illumination device through the optical axis. In some implementations, a first portion of the intensity distribution output by the illumination device during operation includes at least some of the first reflected light. In some implementations, the reflector optic at least in part transmits at least some of the light output by the output surface of the solid secondary optic in the fourth angular range, wherein a second portion of the intensity distribution output by the illumination device during operation includes the transmitted light. In some implementations, the reflector optic has perforations, the perforations being positioned to transmit at least some of the light output by the output surface of the solid secondary optic in the fourth angular range, wherein the second portion of the intensity distribution output by the illumination device during operation includes the transmitted light. In some implementations, the reflector optic includes one or more transparent portions, the one or more transparent portions being positioned to transmit at least some of the light output by the output surface of the solid secondary optic in the fourth angular range, wherein the second portion of the intensity distribution output by the illumination device during operation includes the transmitted light. In some implementations, the reflector optic is arranged to have partial overlap with the fourth angular range, such that a second portion of the intensity distribution output by the illumination device during operation includes at least some of the light output by the output surface of the solid secondary optic within the fourth angular range that passes the reflector optic without being reflected.

In some implementations, the reflector optic is thermally coupled with the substrate. In some implementations, the redirecting surface comprises a reflective material, where the reflective material includes one or more of Ag or Al. In some implementations, apex of the redirecting surface is a rounded vertex with a non-zero radius of curvature. In some implementations, the redirecting surface has arcuate shapes in a cross-sectional plane parallel to the optical axis of the secondary optic. In some implementations, the redirecting surface has linear shapes in a cross-sectional plane parallel to the optical axis, such that the apex has a v-shape in the cross-sectional plane. In some implementations, for a cross-sectional plane parallel to the optical axis of the secondary optic, the redirecting surface is shaped as an arc of a circle. In some implementations, the redirecting surface has an opening. In some implementations, at least portions of the redirecting surface partially transmit light. In some implementations, In some implementations, for a cross-sectional plane through the optical axis of the secondary optic, the first portion of the redirecting surface is shaped as a plurality of potentially disjoint, piecewise differentiable first curves.

In some implementations, the substrate is integrally formed. In some implementations, the substrate comprises a plurality of substrate tiles. In some implementations, one or more primary optics are integrally formed. In some implementations, the one or more LEEs and the one or more primary optics are integrally formed.

An angular range comprises (i) a divergence of the angular range and (ii) a prevalent direction of propagation of light in the angular range, wherein the prevalent direction of propagation corresponds to a direction along which a portion of an intensity distribution has a maximum, and the divergence corresponds to a solid angle outside of which the intensity distribution drops below a predefined fraction of the maximum of the intensity distribution. The predefined fraction can be 5%.

In one aspect, an illumination device includes a substrate having first and second opposing surfaces, such that each of the first and second surfaces are elongated and have a longitudinal dimension and a transverse dimension shorter than the longitudinal dimension; a plurality of light-emitting elements (LEE) arranged on the first surface of the substrate and distributed along the longitudinal dimension, such that the LEEs emit, during operation, light in a first angular range with respect to a normal to the first surface of the substrate; one or more primary optics arranged in an elongated configuration along the longitudinal dimension of the first surface and coupled with the LEEs, the one or more primary optics being shaped to redirect light received from the LEEs in the first angular range, and to provide the redirected light in a second angular range, a divergence of the second angular range being smaller than a divergence of the first angular range at least in a plane perpendicular to the longitudinal dimension of the first surface of the substrate; and a secondary optic comprising a reflector optic elongated along the longitudinal dimension, the reflector optic being spaced apart from and facing the one or more primary optics, wherein the reflector optic is shaped to reflect at least some of the light provided by the one or more primary optics in the second angular range as reflected light in a third angular range with respect to the normal to the first surface of the substrate, wherein the third angular range is different than the second angular range, such that at least some of the reflected light represents a first portion of the intensity distribution output by the illumination device during operation.

The foregoing and other embodiments can each optionally include one or more of the following features, alone or in combination. In some implementations, the one or more primary optics comprises one integrally formed primary optic.

In one aspect, a luminaire includes at least one light-emitting diode (LED); a light guide including two opposing planar surfaces both extending from a first end to a second end, the light guide being positioned to receive at the first end light emitted by the light-emitting diode and guide it between the planar surfaces to the second end; and an optical extractor optically coupled to the light guide at the second end, the optical extractor including a first optical interface and a second optical interface, the first optical interface being positioned to reflect light exiting the light guide and the second optical interface being configured to transmit light reflected by the first optical interface.

The foregoing and other embodiments can each optionally include one or more of the following features, alone or in combination. In some implementations, the at least one LED includes a plurality of LEDs arranged in a row. In some implementations, each of the at least one LED can have substantially the same emission spectrum. In some implementations, each of the at least one LED can emit white light during operation. In some implementations, at least some of the at least one LED can be colored LEDs. In some implementations, at least some of the at least one LED can be blue, violet, or ultra-violet LEDs.

In some implementations, the luminaire can include a wavelength conversion material positioned remote from the at least one LED in a path of light emitted by the at least one LED, the wavelength conversion material being arranged to convert at least some of the light from the at least one LED into light of a longer wavelength. In some implementations, at least one LED can have a nominal power in a range from 0.1 W to 2 W.

In some implementations, the luminaire can include an optical element positioned to receive light emitted from the at least one LED and redirect the light to the first end of the light guide. In some implementations, the optical element can include at least one optical interface shaped to collimate the light in at least one dimension. For example, the at least one optical interface of the optical element is shaped to collimate the light in two dimensions. As another example, the at least one optical interface of the optical element has a parabolic cross-sectional profile. As another example, the optical element is optically coupled to the first end of the light guide. As another example, the optical element is integrally-formed with the light guide.

In some implementations, the opposing planar surfaces of the light guide can be parallel. In some implementations, the light guide can be formed from a dielectric material. In some implementations, the light guide can be a rectangular piece of dielectric material having a length, a width, and a thickness, where the width corresponds to the dimension of the rectangle between the first and second ends, the thickness corresponds to the dimension between the opposing planar surfaces, and the length corresponds to the dimension orthogonal to the width and the thickness, the length being larger than the width and the thickness. For example, the width is larger than the thickness. The thickness can be 1 cm or less, for instance. As another example, the dielectric material is an organic polymer. As another example, the organic polymer is acrylic. As another example, the dielectric material is an inorganic glass.

In some implementations, for a cross-sectional plane, the first optical interface can have a shape that includes a vertex. For example, the optical extractor has a uniform cross-sectional shape along an axis extending orthogonal to the cross-sectional plane. As another example, the first optical interface includes a first planar portion and a second planar portion that meet at an edge corresponding to the vertex in the cross-sectional plane. Further, planar light guide surfaces can be arranged symmetrically about a notional plane extending between the first and second ends and the edge of the first optical interface lies in the notional plane. Furthermore, the first and second planar portions can be arranged symmetrically with respect to notional plane. Also, the first and second planar portions can be arranged asymmetrically with respect to the notional plane.

In some implementations, the first optical interface of the optical extractor can have a v-shape in the cross-sectional plane. In some implementations, the second interface has a portion having an arcuate shape in the cross-sectional plane. The arcuate portion can have a constant radius of curvature.

In some implementations, the optical extractor can include a portion formed from a dielectric material, where a first surface of the portion corresponds to the first optical interface and a second surface of the portion corresponds to the second optical interface. In some implementations, the optical extractor can include a portion formed from a second material adjacent to the first surface, the first optical interface being the interface between the portion of the second material and the portion of the dielectric material. For example, the second material is a reflective material. As another example, the second material is a metal. For instance, the metal can be aluminum.

In some implementations, the optical extractor can include a cylindrical element having a cylinder axis and a wedge-shaped groove extending along a cylinder axis. For example, the cylindrical element is formed from a dielectric material and the optical extractor further includes a second material disposed on the surfaces of the wedge-shaped groove to for the first optical interface. As another example, the surface of the wedge-shaped groove is the first optical interface and the cylindrical surface of the cylindrical element is the second optical interface.

In some implementations, the light guide can be optically coupled to the optical extractor. In some implementations, the light guide can be integrally-formed with the optical extractor. In some implementations, for a cross-sectional plane, the first optical interface has a first arcuate shape and the second optical interface has a second arcuate shape. In some implementations, the optical extractor can have a uniform cross-sectional shape along an axis extending orthogonal to the cross-sectional plane. In some implementations, the optical extractor can extend beyond a first of the planar surfaces in the cross-sectional plane in the direction normal to the first planar surface, but does not extend beyond the second planar surface in the direction normal to the second planar surface.

In some implementations, the optical element and optical extractor can be shaped so that, in a first plane, the luminaire directs substantially all of the light into a range of solid angles from −45 degrees to 45 degrees, where 0 degrees corresponds to a normal of a planar surface of the light guide. In some implementations, the optical element and optical extractor can be shaped so that the luminaire asymmetrically distributes the light about 0 degrees in the first plane. In some implementations, the optical element and optical extractor can be shaped so that, in a second plane orthogonal to the first plane, the luminaire directs substantially all of the light into a range of solid angles from −45 degrees to 45 degrees, where 0 degrees corresponds to the normal of the planar surface of the light guide. In some implementations, for a cross-sectional plane, the second optical interface can have a shape that is an arc of constant radius, R, and the first optical interface is disposed within a notional circle of radius R/n concentric with the arc, where n is a refractive index of a material from which the optical extractor is formed.

In some implementations, the luminaire can include a reflector positioned remote from the optical extractor and positioned to receive at least some of the light transmitted by the second optical interface. The reflector can include a first portion and a second portion, the first and second portions extending on opposing sides of the light guide. Further, the first and second portions each can include a curved surface positioned to receive light transmitted by the second optical interface. Furthermore, in a cross-sectional plane, the curved surfaces can be concave in shape. Also, the curved surfaces can be specularly reflecting surfaces. Further, the first and second portions can be perforated, the perforations being positioned to transmit at least some of the light transmitted by the second optical interface.

In some implementations, the optical element, optical extractor, and reflector can be shaped so that, in a first plane, the luminaire directs the light into a range of solid angles substantially symmetrically about 0 degrees, where 0 degrees corresponds to the direction extending from the first end of the light guide to the second end. In some implementations, the optical element, optical extractor, and reflector can be shaped so that, in a first plane, the luminaire directs the light into a range of angles substantially asymmetrically about 0 degrees, where 0 degrees corresponds to the direction extending from the first end of the light guide to the second end. In some implementations, the optical element, optical extractor, and reflector can shaped so that, in a first plane, the luminaire directs at least some of the light into a range of angles from −45 degrees to 45 degrees, where 0 degrees corresponds to the direction extending from the first end of the light guide to the second end. In some implementations, the optical element, optical extractor, and reflector can be shaped so that, in the first plane, the luminaire directs substantially all of the light into the range of angles from −45 degrees to 45 degrees. In some implementations, the optical element, optical extractor, and reflector can be shaped so that, in the first plane, the luminaire directs none of the light into any angle from −90 degrees to −45 degrees and from 45 degrees to 90 degrees. In some implementations, the optical element, optical extractor, and reflector can be shaped so that, in the first plane, the luminaire directs at least some of the light into a range of angles from −110 degrees to −90 degrees and from 90 degrees to 110 degrees. In some implementations, the optical element, optical extractor, and reflector are shaped so that, in a first plane, the luminaire directs at least some of the light into a range of angles from −90 degrees to −45 degrees and from 45 degrees to 90 degrees, where 0 degrees corresponds to the direction extending from the first end of the light guide to the second end.

In some implementations, the optical element, optical extractor, and reflector can be shaped so that, in the first plane, the luminaire directs substantially all of the light into the range of angles from −90 degrees to −45 degrees and from 45 degrees to 90 degrees. In some implementations, the optical element, optical extractor, and reflector are shaped so that, in the first plane, the luminaire is brightest in a range of angles from −75 degrees to −60 degrees and from 60 degrees to 75 degrees.

In another aspect a method includes attaching the luminaire of claim 1 to a ceiling and electrically connecting a power source to the luminaire. In some implementations, the ceiling is a ceiling of a room in a building. In some implementations, the ceiling is a ceiling of a garage.

In another aspect a luminaire includes at least one light-emitting diode (LED); a light guide including two opposing surfaces both extending from a first end to a second end, the light guide being positioned to receive at the first end light emitted by the light-emitting diode and guide it between the surfaces to the second end; a reflector; and an optical extractor extending along a longitudinal axis orthogonal to a first direction between the first and second ends of the light guide, the optical extractor being remote from the reflector and being optically coupled to the light guide at the second end, the optical extractor being arranged to redirect light exiting the light guide towards the reflector, where the optical extractor and reflector are shaped so that, in a first plane, the luminaire directs at least some of the light into a first range of angles from −90 degrees to 90 degrees and directs substantially none of the light into a second range of angles from −90 degrees to 90 degrees, where 0 degrees corresponds to the first direction.

In another aspect, an illumination system includes a plurality of luminaires, each luminaire including a plurality of light-emitting diodes (LEDs) arranged along a corresponding first axis; an optical extractor extending along a corresponding longitudinal axis parallel to the first axis; and a light guide positioned to receive at a first end of the light guide light emitted by the light-emitting diodes and guide it to a second end of the light guide, where the optical extractor is optically coupled to the light guide at the second end, the optical extractor being shaped to redirect the light guided by the light guide into a range of angles on either side of the light guide, and where the luminaires are connected to each other to form a polygon such that the longitudinal axes of the connected modules lie in a common plane.

In some implementations, the polygon has a maximum dimension less than 2 feet. In some implementations, the polygon is a quadrilateral. In some implementations, the polygon includes four or more modules. In some implementations, the optical extractor is shaped to redirect light into different ranges of angles on opposing sides of the light guide. In some implementations, the optical extractor includes a first optical interface positioned to receive the light from the light guide and reflect the light either side of the light guide. For example, for a cross-sectional plane, the first optical interface has a shape that includes a vertex.

In some implementations, the optical extractor can further include a second optical interface positioned in the path of the light reflected by the first optical interface and configured to transmit the light into the range of angles. For a cross-sectional plane, the second interface can have a portion having an arcuate shape. The arcuate portion can have a constant radius of curvature.

In another aspect, a luminaire includes a plurality of light-emitting diodes (LEDs) extending along a first axis; at least one collector arranged to receive light emitted by the LEDs and redirect the light in a range of directions orthogonal to the first axis, at least partially collimating the light; a first reflective surface extending along a longitudinal axis parallel to the first axis, wherein the first axis and longitudinal axis lie in a common plane and at least a portion of the reflective surface is positioned to receive the light from the at least one collector and reflect the light into a range of angles on only one side of the common plane.

In some implementations, the at least one collector includes a plurality of collectors, each arranged to receive light emitted by a corresponding one of the plurality of LEDs. In some implementations, the at least one collector includes at least one optical interface shaped to collimate the light in at least one dimension. The at least one optical interface of the optical element can be shaped to collimate the light in two dimensions. In some implementations, for a cross-section, the at least one optical interface of the optical element can have a parabolic shape. In some implementations, the at least one collector can include an element formed from a solid dielectric material, the element being arranged to transmit light from the LEDs towards the first reflective surface. For example, the at least one collector includes a reflective surface arranged to reflect light from the LEDs towards the first reflective surface. As another example, the first reflective surface is a curved surface. The curved surface can be a concave surface. In some implementations, the at least one collector and first reflective surface can be shaped so that the luminaire illuminates only the one side of the common plane.

In another aspect, an article includes a cabinet; and a luminaire as described for the foregoing implementation mounted to a surface of the cabinet.

In another aspect, an article includes a piece of furniture having a work surface; the luminaire described above; and a mounting fixture arranged to position the luminaire to illuminate the work surface.

In another aspect, a luminaire includes at least one light-emitting diode (LED) positioned at a first plane; a light guide including two opposing surfaces both extending from a first end to a second end, where the first and second ends define a direction orthogonal to the first plane and the light guide is positioned to receive at the first end light emitted by the light-emitting diode and guide it between the surfaces to the second end; a first surface positioned to reflect light exiting the light guide into a range of angles towards the first plane; and a second surface arranged to extend through the range of angles and reflect at least some of the light reflected by the first surface away from the first plane.

The term "optical axis" is used herein to refer to an imaginary line that defines a path along or proximate which light propagates. An optical axis may correlate with one or more axes or planes of symmetry of components of an optical system or apparatus. A plurality of optical axes that refer to a planar or non-planar notional surface may be referred to herein as an optical plane.

The term "rotational symmetry" is used herein, as the case may be, to refer to invariance under discrete or continuous rotation.

The terms "collimation" and "collimate" are used herein to refer to the degree of alignment of rays of light or the act of increasing such alignment including the reduction of divergence of the propagation directions of a plurality of light rays, also referred to as a beam of light, or simply light.

The term "light-emitting element" (LEE), also referred to as a light emitter, is used to define any device that emits radiation in one or more regions of the electromagnetic spectrum from among the visible region, the infrared region and/or the ultraviolet region, when activated.

Activation of an LEE can be achieved by applying a potential difference across components of the LEE or passing a current through components of the LEE, for example. A light-emitting element can have monochromatic, quasi-monochromatic, polychromatic or broadband spectral emission characteristics. Examples of light-emitting elements include semiconductor, organic, polymer/polymeric light-emitting diodes, other monochromatic, quasi-monochromatic or other light-emitting elements. Furthermore, the term light-emitting element is used to refer to the specific device that emits the radiation, for example a LED die, and can equally be used to refer to a combination of the specific device that emits the radiation (e.g., a LED die) together with a housing or package within which the specific device or devices are placed. Examples of light emitting elements include also lasers and more specifically semiconductor lasers, such as vertical cavity surface emitting lasers (VCSELs) and edge emitting lasers. Further examples include superluminescent diodes and other superluminescent devices.

The term "light-converting material" (LCM), also referred to as "wavelength-conversion material" or phosphor is used herein to define a material that absorbs photons according to a first spectral distribution and emits photons according to a second spectral distribution. The terms light conversion, wavelength conversion and/or color conversion are used accordingly. Light-converting material may be referred to as photoluminescent or color-converting material, for example. Light-converting materials may include photoluminescent substances, fluorescent substances, phosphors, quantum dots, semiconductor-based optical converters, or the like. Light-converting materials may include rare earth or other materials including, for example, Ce, Yt, Te, Eu and other rare earth elements, Ce:YAG, TAG, nitride, oxynitride, silicate, CdSe quantum dot material, AlInGaP quantum dot material. As used herein, an LCM is typically configured to generate longer wavelength light from pump light such as visible light or ultraviolet pump light, for example. Different LCM may have different first and/or second spectral distributions.

As used herein, the term "optical interface" refers to the interface between two materials having different optical properties. Examples of optical interfaces include a surface of an optical element (i.e., the interface between the material forming the optical element and the ambient atmosphere), the interface between adjacent optical elements, and the interface between an optical element and a coating disposed on the elements surface.

As used herein, providing light in an "angular range" refers to providing light that propagates in a prevalent direction and has a divergence with respect to the propagation direction. In this context, the term "prevalent direction of propagation" refers to a direction along which a portion of an intensity distribution of the propagating light has a maximum. For example, the prevalent direction of propagation associated with the angular range can be an orientation of a lobe of the intensity distribution. Also in this context, the term "divergence" refers to a solid angle outside of which the intensity distribution of the propagating light drops below a predefined fraction of a maximum of the intensity distribution. For example, the divergence associated with the angular range can be the width of the lobe of the intensity distribution. The predefined fraction can be 10%, 5%, 1%, or other values, depending on the lighting application.

As used herein, the term "about" refers to a +/−10% variation from the nominal value. Unless defined otherwise, all technical and scientific terms used herein have the same meaning as commonly understood by one of ordinary skill in the art to which this technology belongs.

BRIEF DESCRIPTION OF THE DRAWINGS

FIGS. 2A-2G show different aspects of a luminaire.

FIGS. 14A-14G show different aspects of a troffer luminaire.

FIGS. 16A-16F show different arrangements of asymmetric luminaires.

FIGS. 19A-19C show aspects of an intensity distribution associated with a task luminaire.

FIGS. 20A-20C show other aspects of the intensity distribution associated with a task luminaire.

FIGS. 23A-23C show aspects of an intensity distribution associated with the other embodiment of the task luminaire.

FIGS. 24A-24C show other aspects of an intensity distribution associated with the other embodiment of the task luminaire.

FIGS. 27A-27F show aspects of an intensity distribution associated with the hollow embodiment of the task luminaire.

FIGS. 31A-31C show aspects of an intensity distribution associated with the other hollow embodiment of the luminaire.

FIGS. 32A-32C show aspects of an intensity distribution associated with the other hollow embodiment of the luminaire.

FIGS. 33A-33C show aspects of an intensity distribution associated with the other hollow embodiment of the luminaire.

Like elements in different figures are identified with the same reference numeral.

DETAILED DESCRIPTION

Figure 1:
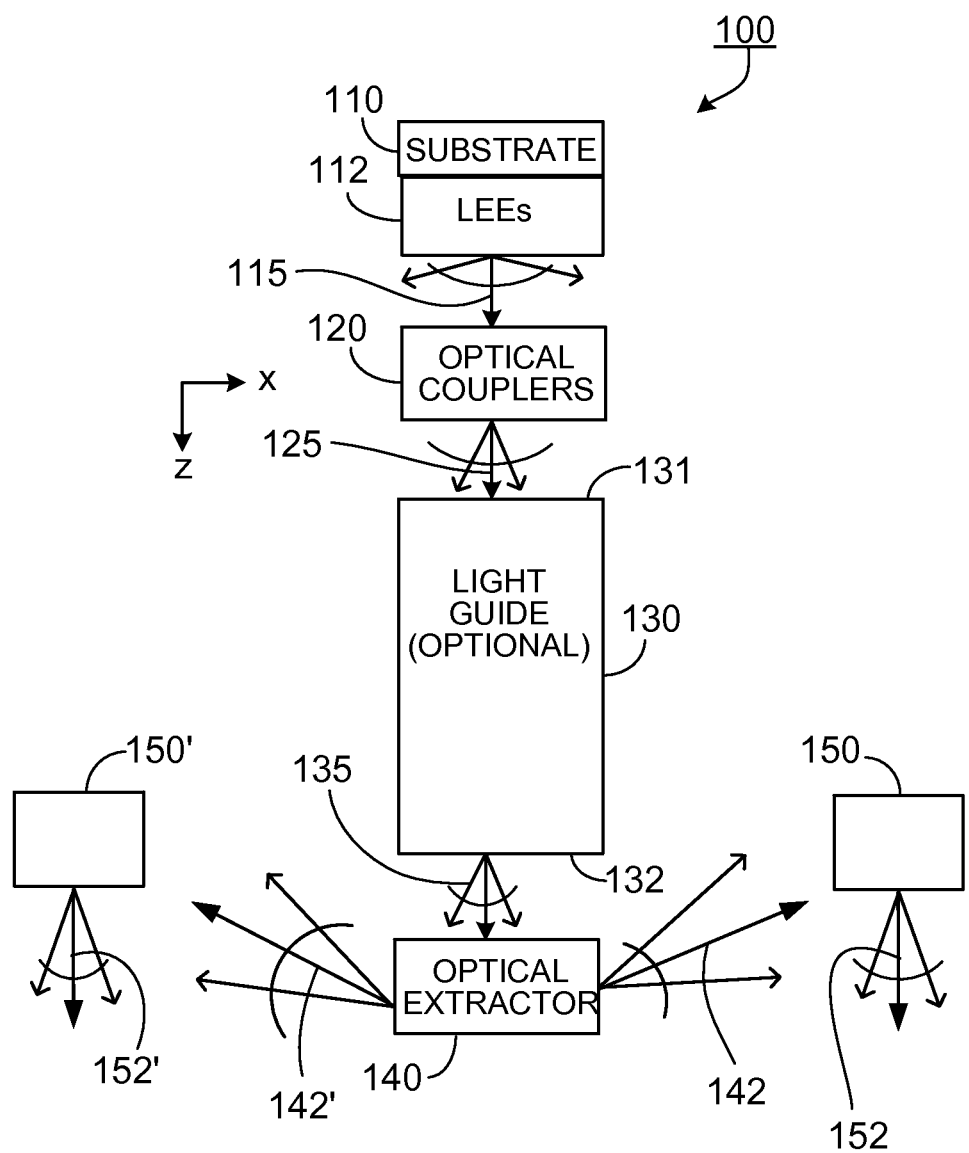
FIG. 1 is a schematic diagram of an embodiment of a luminaire.

Referring to FIG. 1, in which a Cartesian coordinate system is shown for reference, a luminaire 100 for illuminating a target surface can include at least a substrate 110, one or more LEEs 112 disposed on the substrate 110, one or more optical couplers 120, an optional light guide 130, and an optical extractor 140. The LEEs 112 emit light, during operation, light in a first angular range 115 with respect to a normal to the substrate 110 (e.g., the direction of the z-axis). For example, a divergence of the first angular range 115 of the light emitted by the LEEs 112 can be 150-180 sr around the normal. Optical couplers 120 receive light in the first angular range 115 from LEEs 112. Each optical coupler 120 is configured to redirect the light received in the first angular range 115 into a light with a second angular range 125 and redirect it into a first end 131 of light guide 130. For example, a divergence of the second angular range 125 of the light provided by the optical couplers 120 can be 90 sr around the normal (+/−45 sr). When the light guide 130 is not part of the luminaire 100, the optical couplers 120 redirect the light with the second angular range 125 into the optical extractor 140. The light guide 130 can guide the light to a distal end 132 of the light guide 130 away from LEEs 112. The light guide 130 provides the guided light at the distal end 132 in an angular range 135. In some implementations, the light guide 130 can be shaped to guide the light received from the optical couplers 120 in the second angular range 125 and to provide the guided light in substantially the same second angular range (135≈125) at the output end of the solid light guide 132. Optical extractor 140 receives light with angular range 135 that exits end 132 of the light guide 130 or, when the light guide 130 is not part of the luminaire 100, the optical extractor 140 receives the light with angular range 125 provided by the optical couplers 120. Optical extractor 140 includes a reflective interface that reflects the light, which exits luminaire 100 (indicated by arrows) with first and second output angular ranges 142, 142'. As discussed in detail below, the output angular ranges 142, 142' at which light exits luminaire 100 depend, among other things, on the properties of optical extractor 140 (e.g., geometry of the optical interfaces and optical properties of the materials forming the extractor). These properties can be tailored to provide extraction profiles desirable for specific lighting applications.

In some embodiments, luminaire 100 includes one or more secondary reflectors 150, 150' positioned to receive at least some of light output by the optical extractor 140 in angular ranges 142, 142'. Secondary reflectors 150, 150' redirect light received from the optical extractor 140 in angular ranges 142, 142', and to provide the redirected light into desired angular ranges 152, 152' to illuminate the target surface.

In general, the components of luminaire 100 are arranged to redirect light emitted from LEEs 112 away from the LEEs before the light is emitted into the ambient environment. The spatial separation of the place of generation of the light, also referred to as the physical (light) source, from the place of extraction of the light, also referred to as the virtual light source or virtual filament, can facilitate design of the luminaire. For example, in some embodiments, the virtual light source/filament can be configured to provide substantially non-isotropic light emission with respect to planes parallel to an optical axis of the luminaire. In contrast, a typical incandescent filament generally emits substantially isotropically distributed amounts of light. The virtual light source as embodied in luminaire 100 may be viewed as one or more portions of space from which substantial amounts of light appear to emanate. Furthermore, separating the LEEs, with their predetermined optical, thermal, electrical and mechanical constraints, from the place of light extraction, may facilitate a greater degree of design freedom of the optical system of the luminaire and allows for an extended optical path, which can permit a predetermined level of light mixing before light is emitted from the luminaire. Thus, luminaire 100 may be configured to provide predetermined illumination with good aesthetics that may be useful for a wide range of lighting applications.

In general, luminaire 100 is configured to generate light of a desired chromaticity. In many applications, luminaire 100 is configured to provide broadband light. Broadband light can be generated using nominally white or off-white LEEs or colored LEEs whose emissions are mixed to provide white light. Alternatively, or additionally, white light can be generated using an LEE configured to emit pump light (e.g., blue, violet or ultra-violet light) in conjunction with a wavelength conversion material. For example, in certain embodiments, LEEs 112 include GaN-based pump LEDs with an overlying phosphor layer (e.g., YAG) that creates yellow, red and/or green components to produce white light.

In some embodiments, luminaire 100 may be configured to provide colored light (e.g., yellow, red, green, blue light). Different LEEs in luminaire 100 can be configured to emit nominally different light under operating conditions, for example yellow, red, green, blue, white or other color light.

In general, relatively energy efficient LEEs can be used. For example, LEEs 112 can have an output efficiency of about 50 lm/W or more (e.g., about 75 lm/W or more, about 100 lm/W, about 125 lm/W or more, about 150 lm/W or more). In certain embodiments, LEEs 112 conduct current greater than about 350 mA (e.g., 400 mA or more, 450 mA or more, 500 mA or more). LEEs may be surface mount devices.

The number of LEEs in a luminaire can vary. In some embodiments, luminaire 100 can include relatively few LEEs (e.g., 10 or fewer). In some cases, luminaire 100 can include a large number of LEEs (e.g., 100 or more). In many applications, however, luminaire 100 includes between 4 and 100 LEEs.

Optical coupler(s) 120 are configured to receive light from one or more of the LEEs that are suitably disposed at an entrance aperture of the optical coupler. In embodiments that feature multiple optical couplers, they may be integrally formed. Each optical coupler can be configured to provide a predetermined amount of light at an exit aperture of the optical coupler. For this purpose, each optical coupler is optically coupled with the corresponding LEEs and the light guide. Adjacent optical couplers may be optically isolated or optically coupled to control cross talk and/or collimation of light or other functions in one or more planes parallel to the optical axes of the optical couplers or in other directions.

The optical couplers are configured to allow coupling of a predetermined amount of light from one or more of the LEEs into the optical couplers and a predetermined amount of that light is provided at the exit apertures of the optical couplers. Each optical coupler is configured to transform light as it interacts with the optical coupler between the entrance aperture and the exit aperture. Such transformations, also referred to as conditioning, may be regarded as transformations of the phase space of light including collimation of light (e.g. causing a reduction of the divergence of the coupled light) or other transformations, and/or preservation of etendue, light flux and/or other parameters, for example. In some embodiments, the optical couplers are configured to provide light with predetermined properties to control light losses in other components of the luminaire, including one or more of the light guide 130, extractor 140, secondary reflector 150, 150' or other components of the luminaire. For example, the optical couplers may be configured so that substantially all light provided thereby can propagate through the light guide 130 to the optical extractor 140, has less than a predetermined divergence, is injected into the light guide at suitable angles relative to the optical interfaces of the light guide 130 or has other properties.

Optical couplers can include one or more optical elements including non-imaging dielectric TIR concentrators, such as CPC (compound parabolic concentrators), CECs (compound elliptical concentrators), CHC (compound hyperbolic concentrators), tapered or untapered portions, light pipes, segmented concentrators, other geometry concentrators, one or more lenses or other optical elements, for example. In some embodiments, optical couplers and LEEs are integrally formed as a single component.

A luminaire may include a number of optical couplers that are the same as each other or different. Optical couplers may have equal or different profiles or cross sections in different directions. In some embodiments, optical couplers may have varying configurations depending on their location within a cluster or group of optical couplers. For example, optical couplers proximate the ends of an elongate luminaire may be configured with properties different from those of optical couplers near the center of the luminaire. Like considerations may apply in embodiments in which the optical couplers are disposed in clusters proximate an optical axis. For example, optical couplers proximate the periphery of a cluster may be configured with properties different from those proximate the optical axis. An optical coupler may have rotationally symmetric and/or asymmetric cross sections, for example it may have parabolic, elliptical, circular, hyperbolic, triangular, square, rectangular, hexagonal or other regular or irregular polygonal or other cross sections.

A portion or all of the optical coupler 120 may be made of a solid transparent body configured to propagate light internally and solely, partially or not at all, depending on whether a specular reflective coating is employed on the outside of the solid transparent body, rely on TIR, or may be configured to provide a through hole that is partially or fully reflectively coated on one or more optical surfaces. Like consideration may apply to the light guide 130, the optical extractors 140 or other components of the luminaire, for example. Depending on the embodiment, one or more optical couplers 120 may be configured as hollow, reflectively coated non-imaging optical couplers. One or more of the optical couplers 120 may include a dielectric collimating optic configured to provide a predetermined collimation angle. The collimation angle may be determined by the length and/or shape of respective surfaces of the optical coupler 120, for example. An optical coupler 120 may be configured to provide substantially equal collimation about an optical axis in rotationally symmetrical configurations or may provide different collimation in different directions with respect to an optical plane of the optical coupler 120 and/or other component of the luminaire, for example.

In general, light guide 130 can have a generally regular or irregular prismatic, cylindrical, cuboid or other shape and include one or more light guide elements. Light-guide elements may be arranged in a line or a cluster that may or may not allow light to transmit between light-guide elements. Light-guide elements may be arranged in parallel with one light-guide element for each coupler. Such configurations may be integrally formed. Multiple light-guide elements may be arranged in a cluster, the light-guide elements of the cluster coupling light into one or more extractors 140. Multiple light-guide elements may be disposed abutting one another or placed apart at predetermined distances. The light guide 130 and/or one or more light-guide elements may be integrally formed, modularly configured, arranged and/or durably disposed via a suitably configured interconnect system during manufacture, installation, servicing or other event.

The light guide 130 and/or one or more light-guide elements may be configured to have one or more substantially reflective surfaces defining one or more mantles that extend from a first end 131 to a second end 132 of the light guide 130 for enclosing and enabling optical confinement proximate an optical axis or optical plane along which the light guide 130 can guide light with below predetermined light losses. One or more surfaces of the mantle may be substantially parallel, tapered or otherwise arranged. Such surfaces may be substantially flat or curved. Generally, the light guide 130 can have elongate or non-elongate cross section with respect to an axes or planes of the luminaire. Non-elongate light-guides may be rotationally or otherwise symmetric about an optical axis.

The light guide 130 is configured to guide light from the one or more optical couplers 120 via its optical surfaces, by total internal reflection (TIR) and/or specular reflection. Mixing of the light in the light-guide elements may be achieved in part by the shape of the optical surfaces. The light guide may be configured to intermix light from different LEEs 112. In some embodiments, the light guide 130 is configured to mix light and to provide light with a predetermined uniformity in color and/or illuminance to the optical extractor 140.

In some embodiments, the light guide 130 has a hollow configuration having reflective optical surfaces on its inside that transmit light along the length of the hollow with predetermined light-loss properties. The reflectivity of the reflective optical surfaces may originate from or be enhanced by reflective coatings, films, layers or other reflective aids. The composition of and manner in which such reflective coatings may be disposed and/or manufactured would be readily known by a person skilled in the art.

Optical extractor 140 is disposed at an end of the light guide 132 opposite the optical coupler 120 and includes one or more reflective interfaces that are configured to redirect light from the light guide 130 outward away from the optical axis of the light guide 130 towards and through one or more light-exit surfaces of the optical extractor 140 into the ambient. Depending on the embodiment, the directions of propagation of the emitted light may be parallel, antiparallel and/or oblique, that is backward and/or forward, with respect to the optical axis of the light guide 130. For example, different portions of light emitted from the optical extractor 140 may propagate upwards towards a ceiling or downwards towards the surface of a table, for example, depending on the configuration, orientation and/or application of the luminaire 100. The intensity distribution is determined at least in part by the configuration of the optical extractor 140 and/or the configuration of other components of the luminaire including the optical couplers 120, or other components, for example.

The optical extractor 140 may be configured to emit one or more beams of light with predetermined intensity distributions (i.e., into specific ranges of solid angles). For example, different intensity distributions may be provided via different light-exit surfaces, for example on either side of an elongate optical extractor 140. The optical extractor 140 and/or one or more portions thereof from which light appears to emanate under operating conditions may be referred to as a virtual light source. Depending on the embodiments, the virtual light source can have an elongate or non-elongate configuration. A non-elongate configuration may have rotational symmetry about an optical axis. The intensity distributions or one or more portions thereof may be configured to limit glare by limiting direct downward lighting to predetermined levels, for example.

In some embodiments, the intensity distribution of the optical extractor 140, at least in part, may be determined by the configuration and disposition of the reflective interfaces relative to the light-exit surfaces of the optical extractor 140. The optical extractor 140 may include one or more reflective interfaces having one or more flat or curved shapes including parabolic, hyperbolic, circular, elliptical or other shapes. In certain embodiments, the optical extractor 140 includes one or more reflective coatings to redirect light and provide a desired emission pattern. The reflective interface may have a linear, convex, concave, hyperbolic, linear segmented or other cross section shaped as a plurality of potentially disjoint, piecewise differentiable curves, in order to achieve a predetermined emission pattern. In general, the optical extractor 140 may provide symmetrical or asymmetrical beam distributions with respect to an optical axis or optical plane thereof. In elongate embodiments of an optical extractor 140, the cross sections of reflective interfaces and/or light-exit surfaces may change along an elongate extension thereof. Such variations may be stepwise or continuous. For instance, the reflective interface of the optical extractor 140 may have a first cross section shaped as a plurality of potentially disjoint, piecewise differentiable first curves, and a second cross section at a different location along the elongate extension of the reflective interface, such that the second cross section is shaped as a different plurality of potentially disjoint, piecewise differentiable second curves.

In certain embodiments, the reflective optical interfaces may have a symmetrical or asymmetrical v-shaped or other cross section. A v-shaped cross section may also be referred to as a v-groove in elongate embodiments or a conical cavity in non-elongate embodiments. As used herein, the term "v-groove" refers to the v-shaped cross-section through the reflective optical interfaces, but does not require that the optical extractor include an actual groove. For example, in some embodiments, the optical extractor includes two portions of solid material that meet at a v-shaped interface. Such an interface is also referred to as a v-groove, even though the optical extractor does not include groove. Depending on the embodiment, a v-groove may have substantially equal cross section along a length of the optical extractor or it may vary depending on the position along the elongate extension. The apex formed by such v-shaped reflective interfaces may be generally directed towards the light guide. In addition, the sides forming the v-groove may have linear cross-sections, or may be non-linear (e.g., curved or faceted). Moreover, the apex of the reflective optical interfaces can be a rounded vertex with a non-zero radius of curvature.

Generally, the optical extractor 140 can be integrally or modularly formed with the light guide 130. The optical extractor may be formed of one or more materials equal, similar or dissimilar to that of the light guide and include one or more different materials. Depending on the embodiment, the optical extractor 140 may be configured to redirect light via TIR, specular and/or diffuse reflection, for example, via a dielectric or metallic mirror surface, refraction and/or otherwise. The optical extractor 140 may include one or more coatings including one or more films of suitable dielectric, metallic, wavelength conversion material or other material. Depending on the embodiment, a modularly formed optical extractor and light guide may include or be interconnected with suitable connectors for durable interconnection and optional registration during manufacture, assembly, service or other event. Different modular optical extractors may have different configurations to provide different lighting properties. To improve optical and/or mechanical performance, a coupling between the optical extractor 140 and the light guide 130 may be established by employing one or more suitably transparent compounds with predetermined refractive indices. Such compounds may include at least initially fluid substances such as silicone or other curable or non-curable substances. Such substances may provide an adhesive function.

Each of the light-exit surfaces and/or the reflective interfaces of the optical extractor 140 may include one or more segments, each having a predetermined shape including convex, concave, planar or other shape. Shapes of the light-exit surface and/or the reflective interfaces can be determined to provide predetermined levels of light extraction via the optical extractor and to limit light losses due to back reflection and/or absorption of light within the optical extractor.

In general, secondary reflectors 150, 150' may be configured to redirect light via specular and/or diffuse reflection, or in other ways (e.g., diffraction). The secondary reflector 150 can have an elongate or non-elongate configuration. The secondary reflector 150 can be considered as a modular component of the luminaire 100 that can be used to facilitate selection of a variety of intensity distributions and therefore generation of lighting conditions, for example, during installation of the luminaire 100.

In some embodiments, the secondary reflector 150 may be disposed and configured to substantially extend the full length, L, of the light guide 130 and surround at least portions of the width, which is along the optical path, of the light guide 130. Depending on the embodiment, the secondary reflector 150 can include one or more specular or diffusely reflecting surfaces provided by a sheet of metal, such as aluminum or other metal, or reflective plastic, paint or other coating, for example.

The secondary reflector 150 can include partially or wholly transparent portions, as a whole be partially transparent in addition to being reflective, or include openings that are suitably shaped to enable light to pass and achieve a predetermined lighting effect, for example. Depending on the embodiment, the secondary reflector 150 and/or openings in the secondary reflector 150 may be configured to provide an illumination effect, support heat dissipation or achieve both illumination and heat dissipation effects. Openings may be configured to facilitate airflow and thereby support convective cooling of the luminaire.

The shape of the secondary reflector 150, such as the angle with respect to the target surface, its curvature, and the width of the reflector, can be adapted to generate a predetermined emission pattern for general illumination or particular illumination applications. The secondary reflector 150 can include multiple reflective surfaces.

The secondary reflector 150 may be angularly and/or vertically adjustable to allow calibration and assist in achieving a desired intensity distribution. For this purpose, a luminaire 100 may include one or more hinge or locking mechanisms and/or interconnectors.

Corresponding luminaires may provide predetermined functionality and/or modularity to adjustably accommodate different lighting requirements of different sized rooms including hallway, closed and open plan offices, or other spaces, for example.

The secondary reflector 150 may include an areal light source, for example a light-emitting sheet based on a plurality of discrete light sources or organic light emitting diode material. The areal light source may be arranged to emit light on one side and reflect light on an opposite side. The reflective side may be arranged to manipulate light as described herein and the light-emitting side may be configured to provide auxiliary illumination. Depending on the embodiment, the luminaire 100 may be configured to provide independent control of the areal light source and the LEEs 112 that are coupled with the optical couplers 120.

Elongate Luminaires

Figure 2A:
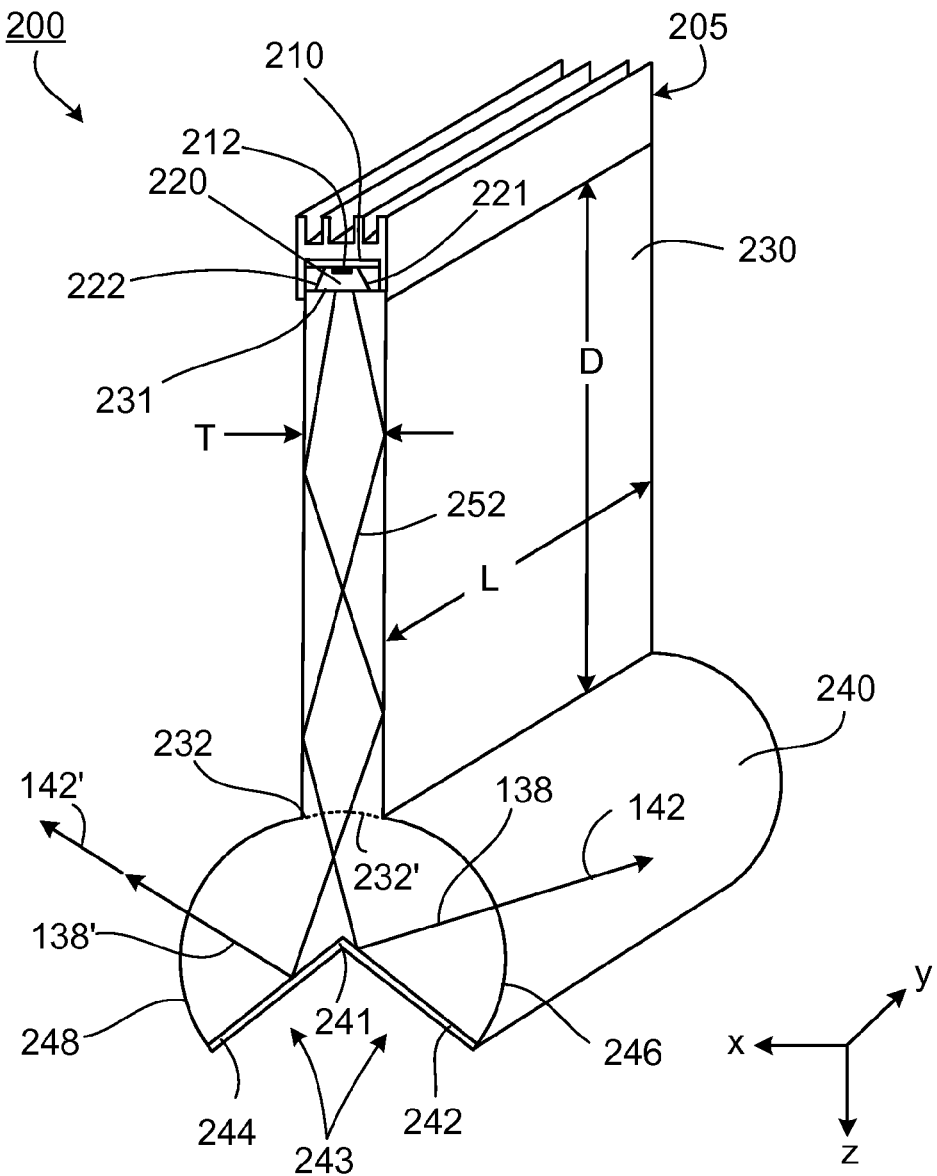

Referring to FIG. 2A, in which a Cartesian coordinate system is shown for reference, an embodiment of a luminaire module 200 includes a substrate 210 having a plurality of LEEs 212 distributed along the substrate 210. The LEEs 212 are disposed at an upper edge 231 of a light guide 230. As shorthand, the positive z-direction is referred to herein as the "forward" direction and the negative z-direction is the "backward" direction. Sections through the luminaire parallel to the x-z plane are referred to as the "cross-section" or "cross-sectional plane" of the luminaire module. Also, luminaire module 200 extends along the y-direction, so this direction is referred to as the "longitudinal" direction of the luminaire module. Lastly, embodiments of luminaire modules can have a plane of symmetry parallel to the y-z plane. This is referred to as the "symmetry plane" of the luminaire module.

Multiple LEEs 212 are disposed on the substrate 210, although only one of the multiple LEEs 212 is shown in FIG. 2A. For example, the plurality of LEEs 212 can include multiple white LEDs. An optical extractor 240 is disposed at lower edge of light guide 232. The LEEs 212 are coupled with one or more optical couplers 220 (only one of which is shown in FIG. 2A).

Substrate 210, light guide 230, and optical extractor 240 extend a length L along the y-direction. Generally, L can vary as desired. Typically, L is in a range from about 1 cm to about 200 cm (e.g., 20 cm or more, 30 cm or more, 40 cm or more, 50 cm or more, 60 cm or more, 70 cm or more, 80 cm or more, 100 cm or more, 125 cm or more, 150 cm or more). The number of LEEs 212 on the substrate 210 will generally depend, inter alia, on the length L, where more LEEs are used for longer luminaires. In some embodiments, the plurality of LEEs 212 can include between 10 and 1,000 LEEs (e.g., about 50 LEEs, about 100 LEEs, about 200 LEEs, about 500 LEEs). Generally, the density of luminaires (e.g., number of LEEs per unit length) will also depend on the nominal power of the LEEs and illuminance desired from the luminaire module. For example, a relatively high density of LEEs can be used in applications where high illuminance is desired or where low power LEEs are used. In some embodiments, the luminaire module 200 has an LEE density along its length of 0.1 LEE per centimeter or more (e.g., 0.2 per centimeter or more, 0.5 per centimeter or more, 1 per centimeter or more, 2 per centimeter or more). In embodiments, LEEs can be evenly spaced along the length, L, of the luminaire. In some implementations, a heat-sink 205 can be attached to the substrate 210 to extract heat emitted by the plurality of LEEs 212. The heat-sink 205 can be disposed on a surface of the substrate 210 opposing the side of the substrate 210 on which the LEEs 212 are disposed.

Optical coupler 220 includes one or more solid pieces of transparent material (e.g., glass or a transparent organic plastic, such as polycarbonate or acrylic) having surfaces 221 and 222 positioned to reflect light from the LEEs 212 towards light guide 230. In general, surfaces 221 and 222 are shaped to collect and collimate light emitted from the LEEs. In the x-z cross-sectional plane, surfaces 221 and 222 can be straight or curved. Examples of curved surfaces include surfaces having a constant radius of curvature, parabolic or hyperbolic shapes. In some embodiments, surfaces 221 and 222 are coated with a highly reflective material (e.g., a reflective metal, such as aluminum), to provide a highly reflective optical interface. The cross-sectional profile of optical coupler 220 can be uniform along the length L of luminaire module 200. Alternatively, the cross-sectional profile can vary. For example, surfaces 221 and/or 222 can be curved out of the x-z plane. Examples of such optical couplers are discussed below in connection with FIGS. 34-36.

The surface of optical coupler 220 adjacent upper edge of light guide 231 is optically coupled to edge 231. In other words, the surfaces of the interface are attached using a material that substantially matches the refractive index of the material forming the optical coupler 220 or light guide 230 or both. For example, optical coupler 220 can be affixed to light guide 230 using an index matching fluid, grease, or adhesive. In some embodiments, optical coupler 220 is fused to light guide 230 or they are integrally formed from a single piece of material.

Light guide 230 is formed from a piece of transparent material (e.g., glass or a transparent organic plastic, such as polycarbonate or acrylic) that can be the same or different from the material forming optical couplers 220. Light guide 230 extends length L in the y-direction, has a thickness uniform T in the x-direction, and a uniform depth D in the z-direction. The dimensions D and T are generally selected based on the desired optical properties of the light guide. During operation, light coupled into the light guide from optical coupler 220 (depicted by rays 252) reflects off the planar surfaces of the light guide by TIR and mixes within the light guide. The mixing can help achieve illuminance and/or color uniformity at the distal portion of the light guide 232 at optical extractor 240. The depth, D, of light guide 230 can be selected to achieve adequate uniformity at the exit aperture (i.e., at end 232) of the light guide. In some embodiments, D is in a range from about 1 cm to about 20 cm (e.g., 2 cm or more, 4 cm or more, 6 cm or more, 8 cm or more, 10 cm or more, 12 cm or more).

In general, optical couplers 220 are designed to restrict the angular range of light entering the light guide 230 (e.g., to within +/−40 degrees) so that at least a substantial amount of the light is coupled into spatial modes in the light guide 230 that undergoes TIR at the planar surfaces. Light guide 230 has a uniform thickness T, which is the distance separating two planar opposing surfaces of the light guide. Generally, T is sufficiently large so the light guide has an aperture at upper surface 231 sufficiently large to approximately match (or exceed) the aperture of optical coupler 222. In some embodiments, T is in a range from about 0.05 cm to about 2 cm (e.g., about 0.1 cm or more, about 0.2 cm or more, about 0.5 cm or more, about 0.8 cm or more, about 1 cm or more, about 1.5 cm or more). Depending on the embodiment, the narrower the light guide the better it may mix light. A narrow light guide also provides a narrow exit aperture. As such light emitted from the light guide can be considered to resemble the light emitted from a one-dimensional linear light source, also referred to as an elongate virtual filament.

As discussed previously, length L corresponds to the length of the luminaire and can vary as desired.

While optical coupler 220 and light guide 230 are formed from solid pieces of transparent material, hollow structures are also possible. For example, the optical coupler 220 or the light guide 230 or both may be hollow with reflective inner surfaces rather than being solid. As such material cost can be reduced and absorption in the light guide avoided. A number of specular reflective materials may be suitable for this purpose including materials such as 3M Vikuiti™ or Miro IV™ sheet from Alanod Corporation where greater than 90% of the incident light would be efficiently guided to the optical extractor. Optical extractor 240 is also composed of a solid piece of transparent material (e.g., glass or a transparent organic plastic, such as polycarbonate or acrylic) that can be the same as or different from the material forming light guide 230. In the example implementation shown in FIG. 2A, the piece of dielectric material includes flat surfaces 242 and 244 and curved surfaces 246 and 248. The flat surfaces 242 and 244 represent first and second portions of a redirecting surface 243, while the curved surfaces 246 and 248 represent first and second output surfaces of the luminaire module 200.

Flat surfaces 242 and 244 are coated with a highly reflective material (e.g., a highly reflective metal, such as aluminum or silver) over which a protective coating may be disposed. Thus, surfaces 242 and 244 provide a highly reflective optical interface for light entering an input end of the optical extractor 232' from light guide 230. In the x-z cross-sectional plane, the lines corresponding to surfaces 242 and 244 have the same length and form a v-shape that meets at a vertex 241. In general, the included angle of the v-shape can vary as desired. For example, in some embodiments, the included angle can be relatively small (e.g., from 30° to 60°). In certain embodiments, the included angle is in a range from 60° to 120° (e.g., about 90°). The included angle can also be relatively large (e.g., in a range from 120° to 150° or more). In the example implementation shown in FIG. 2A, the output surfaces of the optical extractor 246 and 248 are curved with a constant radius of curvature that is the same for both. Accordingly, luminaire module 200 has a plane of symmetry intersecting vertex 241 parallel to the y-z plane.

The surface of optical extractor 240 adjacent to the lower edge 232 of light guide 230 is optically coupled to edge 232. For example, optical extractor 240 can be affixed to light guide 230 using an index matching fluid, grease, or adhesive. In some embodiments, optical extractor 240 is fused to light guide 230 or they are integrally formed from a single piece of material.

During operation, light exiting light guide 230 through end 232 impinges on the reflective interfaces at portions of the redirecting surface 242 and 244 and is reflected outwardly towards output surfaces 246 and 248, respectively, away from the symmetry plane of the luminaire. The first portion of the redirecting surface 242 provides light having an angular distribution 138 towards the output surface 246, the second portion of the redirecting surface 244 provides light having an angular distribution 138' towards the output surface 246. The light exits optical extractor through output surfaces 246 and 248. In general, the output surfaces 246 and 248 have optical power, to redirect the light exiting the optical extractor 240 in angular ranges 142 and 142', respectively. For example, optical extractor 240 may be configured to emit light upwards (i.e., towards the plane intersecting the LEEs and parallel to the x-y plane), downwards (i.e., away from that plane) or both upwards and downwards. In general, the direction of light exiting the luminaire through surfaces 246 and 248 depends on the divergence of the light exiting light guide 230 and the orientation of surfaces 242 and 244.

Surfaces 242 and 244 may be oriented so that little or none of the light from light guide 230 is transmitted by optical extractor 240 in a forward direction (i.e., in certain angular ranges relative to the positive z-direction). In embodiments where the luminaire module 200 is attached to a ceiling so that the forward direction is towards the floor, such configurations can help avoid glare and an appearance of non-uniform illuminance.

Figure 3:
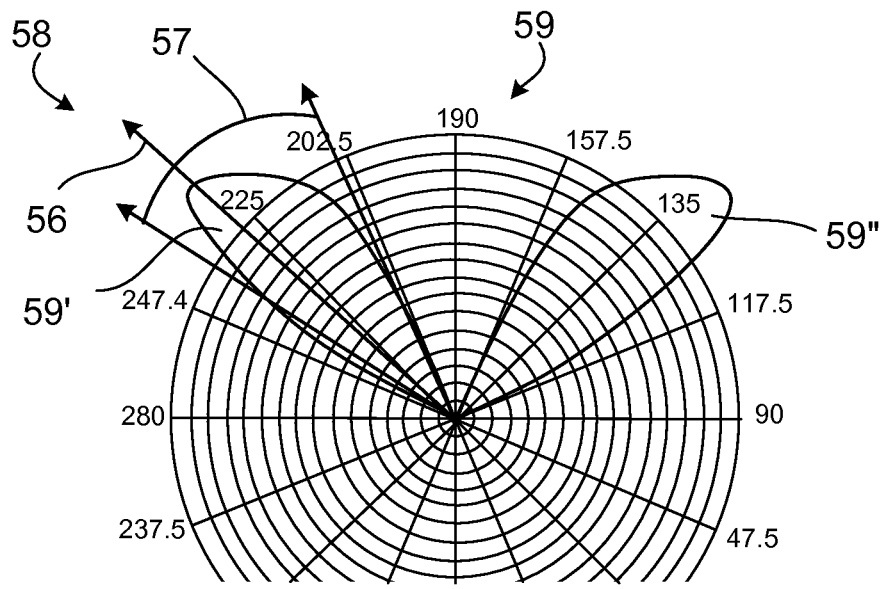
FIG. 3 is an intensity profile of an embodiment of a luminaire.

In general, the intensity distribution provided by luminaire module 200 reflects the symmetry of the luminaire's structure about the y-z plane. For example, referring to FIG. 3, an exemplary intensity distribution 59 includes symmetric lobes 59' and 59" with peak intensity at approximately 135° and 225°, respectively, corresponding to the light provided by the luminaire module 200. FIG. 3 shows a plot where 0° corresponds to the forward z-direction of the Cartesian coordinate system shown in FIG. 2A, 180° corresponds to the negative z-direction, and 90° and 270° correspond to the positive and negative x-directions, respectively. The intensity distribution output by luminaire module 200 in lux is given by the radius of the plot in a particular direction. In addition, FIG. 3 depicts an angular range 58 that corresponds to the angular range 142' of the light output by the luminaire module 200 through the output surface 248. The light having angular range 58 propagates along a prevalent direction 56 (given by the maximum intensity of the lobe 59' of the intensity distribution 59 associated with the light provided by the luminaire module 200.) Also, the light with angular range 58 has a divergence 57 (given by the width of the lobe 59' of the intensity distribution 59 associated with the light provided by the luminaire module 200.)

In the example shown in FIG. 3, luminaire module 200 provides no illumination in the range from 90° to 270°. All the illumination is directed into a first lobe 59" between 112.5° and 157.5° and a second lobe 59' between 202.5° and 247.5°.

In general, the intensity profile of luminaire module 200 will depend on the configuration of the optical coupler 220, the light guide 230 and the optical extractor 240. For instance, the interplay between the shape of the optical coupler 220, the shape of the redirecting surface 243 of the optical extractor 240 and the shapes of the output surfaces 246, 248 of the optical extractor 240 can be used to control the angular width and prevalent direction (orientation) of the lobes in the intensity profile 59.

In some implementations, the orientation of the lobes 56 can be adjusted based on the included angle of the v-shaped groove 241 formed by the portions of the redirecting surface 242 and 244. For example, a first included angle results in an intensity distribution 59 with lobes 59', 59" located at relatively smaller angles compared to lobes 59', 59" of the intensity distribution 59 that results for a second included angle larger than the first angle. In this manner, light can be extracted from the luminaire module 200 in a more forward direction for the smaller of two included angles formed by the portions of the redirecting surface 242, 244.

Furthermore, while surfaces 242 and 244 are depicted as planar surfaces, other shapes are also possible. For example, these surfaces can be curved or faceted. Curved redirecting surfaces 242 and 244 can be used to narrow or widen the beam. Depending of the divergence of the angular range of the light that is received at the input end of the optical extractor 232', concave reflective surfaces 242, 244 can narrow the lobes 98', 98" output by the optical extractor 240 (and illustrated in FIG. 3), while convex reflective surfaces 242, 244 can widen the lobes 98', 98" output by the optical extractor 240. As such, suitably configured redirecting surfaces 242, 244 may introduce convergence or divergence into the light. Such surfaces can have a constant radius of curvature, can be parabolic, hyperbolic, or have some other curvature.

FIGS. 2B and 2D show that, for a cross-sectional plane perpendicular to the longitudinal dimension of the luminaire module 200, the redirecting surface 243 can have an apex 241 that separates the first and second portions of the redirecting surface 242, 244. It should be noted that the apex of the redirecting surface 241 can be a rounded vertex with a non-zero radius of curvature. In the example implementations shown in FIGS. 2B and 2D, the first and second portions of the redirecting surface 242, 244 can have first and second arcuate shapes in the cross-sectional plane perpendicular to the longitudinal dimension of the luminaire module 200. For example, the first and second portions of the redirecting surface 242, 244 can be parabolic, hyperbolic, or can have constant curvatures different from each other. Moreover, curvatures of the first and second portions of the redirecting surface 242, 244 can be both negative (e.g., convex with respect to a direction of propagation of light from the input end of the extractor 232' to the redirecting surface 243), can be both positive (e.g., concave with respect to the propagation direction), or one can be positive (convex) and the other one can be negative (concave).

FIG. 2E shows that, for a cross-sectional plane perpendicular to the longitudinal dimension of the luminaire module 200, the redirecting surface 243 can be shaped as an arc of a circle. In this case, the first and second portions of the redirecting surface 242, 244 represent first and second portions of the arc of the circle. In the example implementation illustrated in FIG. 2E, a curvature of the redirecting surface 243 is negative (e.g., convex with respect to a direction of propagation of light from the input end of the extractor 232' to the redirecting surface 243).

FIG. 2C shows that, for a cross-sectional plane perpendicular to the longitudinal dimension of the luminaire module 200, either of the first and second portions of the redirecting surface 242, 244 can have one or more apexes, in addition to the apex 241 that separates the redirecting surface 242, 244. For example, the first portion of the redirecting surface 242 can have an apex 2411 that separates the first portion of the redirecting surface 242 in at least two regions thereof. The regions of the first portion of the redirecting surface 242 separated by the apex 2411 can have linear or arcuate shapes. The two regions of the first portion of the redirecting surface 242 can reflect the light received from the input end of the extractor 232' in two different angular sub-ranges, different from each other. In this manner, light provided by the first portion of the redirecting surface 242 be output at the output surface 246 as to intensity lobes that can be manipulated differently, e.g., to illuminate different targets. Such application is described below in this specification in connection with FIG. 12A. As another example, the second portion of the redirecting surface 244 can have an apex 2444 that separates the second portion of the redirecting surface 244 in at least two regions thereof.

FIG. 2F shows that, in some implementations, the first and second portions of the redirecting surface 242, 244 can be separated, at least in part, by a slot 245. FIG. 2G shows that, in some implementations, either the first and second portions of the redirecting surface 242, 244 can include one or more slots 2455', 2455". Each of the slots 245, 2455', 2455" may but does not need to extend along the entire longitudinal direction of the luminaire module 200. Such a slot can represent on opening in the coating reflecting layer of the redirecting surface 243, and is configured to allow a portion of light received from the input end of the extractor 232' to transmit through the slot 245 of the redirecting surface 243. FIG. 2F shows that, for a cross-sectional plane perpendicular to the longitudinal dimension of the luminaire module 200 which intersects the slot 245, first and second curves corresponding to the first and second portions of the redirecting surface 242, 244 are separated by a discontinuity. Moreover, FIG. 2G shows that, for a cross-sectional plane perpendicular to the longitudinal dimension the luminaire module 200 which intersects the slots 2455', 2455", first and second curves corresponding to the first and second portions of the redirecting surface 242, 244 include one or more discontinuities associated with the slots 2455', 2455".

In addition, the curves corresponding to each of the cross-sectional planes illustrated in FIGS. 2B-2G can have different shapes and different discontinuities in other cross-sectional planes along the longitudinal dimension of the luminaire module 200. In general, different cross-sections of a redirecting surface 243 can have different combinations of disjoint or joined piecewise differentiable curves.

Moreover, the shape of output surfaces of the optical extractor 246 and 248 can vary too, and thus, the surfaces 246 and 248 can steer and shape the beam of light. For example, the radius of curvature of these surfaces can be selected so that the surfaces introduce a desired amount of convergence into the light. Aspheric surfaces can also be used. Similar properties noted above in connection with FIGS. 2B-2G regarding contours of the redirecting surface of the extractor 243 in cross-sectional planes perpendicular to the longitudinal dimension of the luminaire module 200 apply to contours of the output surfaces of the extractor 246, 248 in such cross-sectional planes.

In general, the geometry of the elements can be established using a variety of methods. For example, the geometry can be established empirically. Alternatively, or additionally, the geometry can be established using optical simulation software, such as Lighttools™, Tracepro™, FRED™ or Zemax™, for example.

In general, luminaire module 200 can be designed to emit light into different angular ranges from those shown in FIG. 3. In some embodiments, luminaires can emit light into lobes have a different divergence or angular width that those shown in FIG. 3. For example, in general, the lobes can have a width of up to 90° (e.g., 80° or less, 70° or less, 60° or less, 50° or less, 40° or less, 30° or less, 20° or less). In general, the direction in which the lobes are oriented can also differ from the directions shown in FIG. 3. The "direction" refers to the direction at which a lobe is brightest. In FIG. 3, for example, the lobes are oriented at approx. 130 and approx. 230. In general, lobes can be directed more towards the horizontal (e.g., at an angle in the ranges from 90° to 135°, such as at approx. 90°, approx. 100°, approx. 110°, approx. 120°, approx. 130°, and from 225° to 270°, such as at approx. 230°, approx. 240°, approx. 250°, approx. 260°, approx. 270°).

In general, luminaires can include other features useful for tailoring the intensity profile. For example, in some embodiments, luminaires can include an optically diffuse material that scatters light, thereby homogenizing the luminaire's intensity profile. For example, surfaces 242 and 244 can be roughed or a diffusely reflecting material, rather than a specular reflective material, can be coated on these surfaces. Accordingly, the optical interfaces at surfaces 242 and 244 can diffusely reflect light, scattering light into broader lobes that would be provided by similar structures utilizing specular reflection at these interfaces. In some embodiments these surfaces can include structure that facilitates light distribution. For example, surfaces 242 and 244 can each have multiple planar facets at differing orientations. Accordingly, each facet will reflect light into different directions. In some embodiments, surfaces 242 and 244 can have structure thereon (e.g., structural features that scatter or diffract light).

In certain embodiments, a light scattering material can be disposed on surfaces 246 and 248 of optical extractor 240. Alternatively, or additionally, surfaces 246 and 248 need not be surfaces having a constant radius of curvature. For example, surfaces 246 and 248 can include portions having differing curvature and/or can have structure thereon (e.g., structural features that scatter or diffract light).

Figure 4:
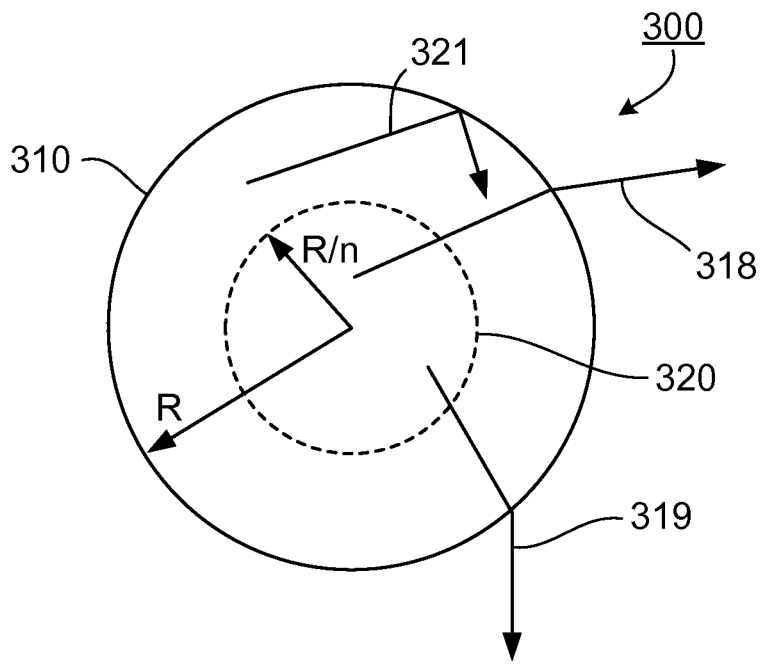
FIG. 4 is a schematic diagram showing aspects of a Weierstrass configuration.

In some embodiments, optical extractor 240 is structured so that a negligible amount of the light propagating within at least one plane (e.g., the x-z cross-sectional plane) that is reflected by surface 242 or 244 experiences TIR at light-exit surface 246 or 248. Such a relationship is referred to as a Weierstrass configuration and can occur for a spherical or cylindrical structure with a surface having radius of curvature R for light rays emanating from within a concentric spherical or cylindrical region having radius R/n, where n is the refractive index of the structure. Referring to FIG. 4, this effect is illustrated for a circular structure 300 (i.e., a cross section through a cylinder or sphere) having a surface 310 of radius R. Within structure 300 there exists a concentric notional spherical or cylindrical surface 320 having a radius R/n. Any light ray emanating from within notional surface 320 propagating within the cross-sectional plane that is incident on surface 310 of structure 300 will have an angle of incidence less than the critical angle, so will exit structure 300 without experiencing TIR. This is illustrated in FIG. 4 by light rays 318 and 319. Light rays, such as ray 321, propagating within structure 300 in the plane but not emanating from within notional surface 320 can impinge on surface 310 at the critical angle or greater angles of incidence. Accordingly, such light may be subject to TIR and won't exit structure 300. Furthermore, rays of p-polarized light that pass through a notional space circumscribed by an area with a radius of curvature that is smaller than $R/(1+n^2)^{(-1/2)}$, which is smaller than R/n, will not be subject to Fresnel reflection at surface 310 when exiting structure 300. This condition may be referred to as Brewster geometry. Embodiments may be configured accordingly.

Referring again to FIG. 2A, in some embodiments, all or part of surfaces 242 and 244 may be located within a notional Weierstrass surface defined by surfaces 246 and 248. For example, the portions of surfaces 242 and 244 that receive light exiting light guide 230 through end 232 can reside within this surface so that light within the x-z plane reflected from surfaces 244 and 246 exits through surfaces 246 and 248, respectively, without experiencing TIR.

Figure 5:
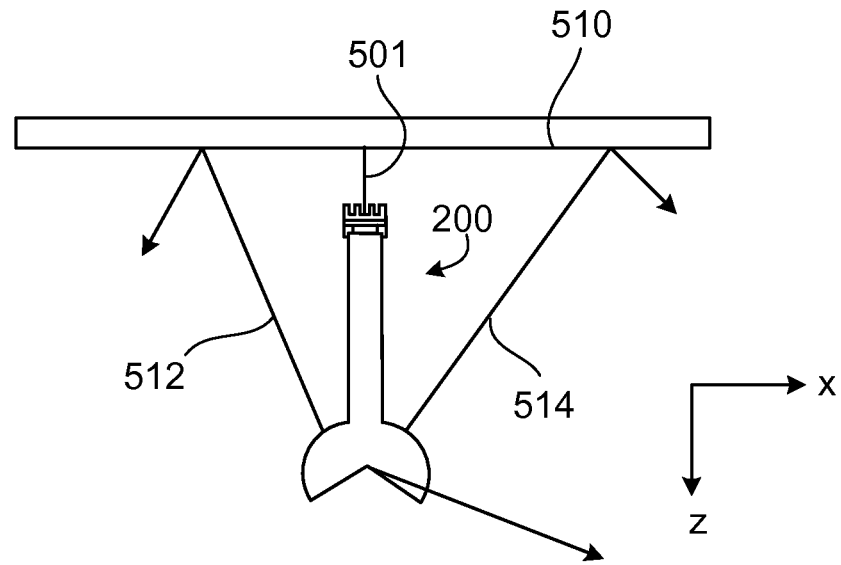
FIG. 5 is a view of an embodiment of a luminaire.

As discussed previously, light is emitted from luminaire module 200 into two symmetric lobes between 270° and 90° degrees (i.e., in backward directions). Referring to FIG. 5, in some embodiments, luminaire module 200 is suspended from a ceiling 510 such that the emitted light strikes the ceiling. For example, luminaire module 200 can be attached to ceiling 510 via a cable 501 that include an electrical connection connecting the LEEs in luminaire module 200 to the electrical mains of the room in which it is installed. In some embodiments, cable 501 may include multiple wires (e.g., intertwined), such as a wire sufficient strong to support the luminaire's weight, electrical wire, and, in certain embodiments, a data connection. Due to the backwards intensity profile, the ceiling acts to scatter and reflect the light into the ambient space, as depicted by rays 512 and 514, including towards the floor or other surface to be illuminated. Such illumination is referred to as "indirect" illumination because it does not propagate directly from the luminaire to the target surface. As an indirect pendant fixture, for example, such embodiments can be configured to provide low glare with high efficiency light coupling to the ceiling to create ambient illumination.

In some implementations, a luminaire module can be a circular or elliptical torus or any other 3D sweep of a planar design, e.g., of luminaire module 200.

Figure 6:
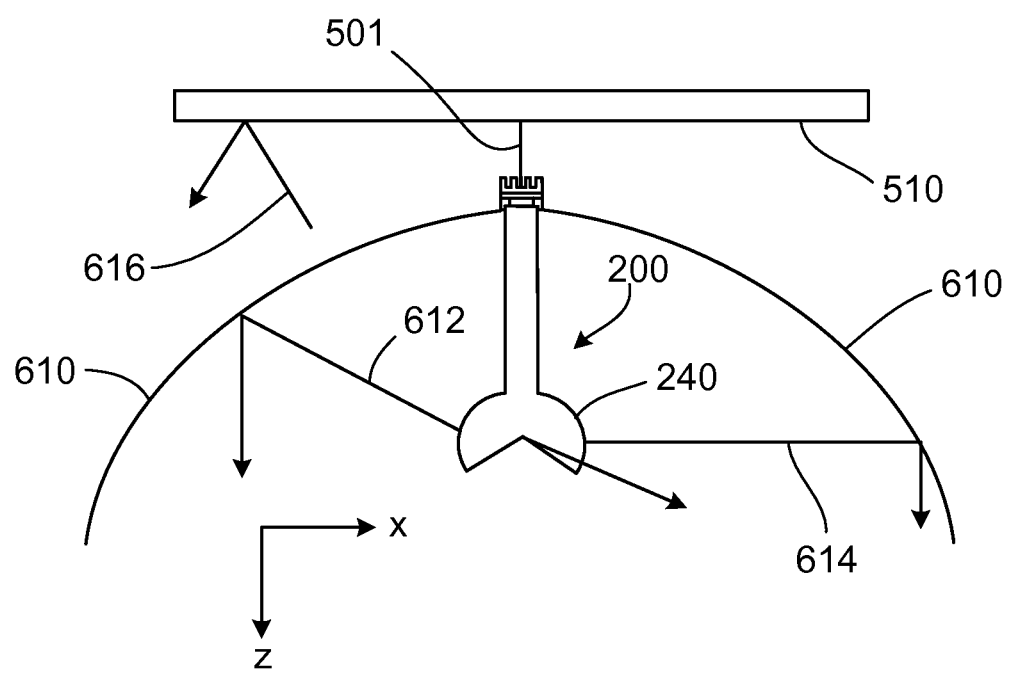
FIG. 6 is a view of another embodiment of a luminaire.

In some embodiments, luminaire module 200 includes one or more secondary reflectors to further tailor the intensity profile of the luminaire. For example, referring to FIG. 6, luminaire module 200 can include curved secondary reflectors 610 that attach to luminaire module 200 near the LEEs and extend outward into the path of the light exiting optical extractor 240. Secondary reflectors 610 are shaped to redirect the light from the optical extractor towards to the target surface, as illustrated by rays 612 and 614. In general, the surfaces of reflectors 610 can be specular reflecting surfaces or diffusely reflecting surfaces. Furthermore, the shape of the surfaces (in this instance, concave) provides an additional degree of freedom for a designer to tailor the light distribution profile from luminaire module 200.

In certain embodiments, secondary reflectors 610 can be partially transmissive. For example, reflectors 610 can include apertures that allow some of the light from optical extractor 240 to pass through the reflectors and reflect from ceiling 510 (e.g., ray 616). Alternatively, or additionally, reflectors 610 can be formed from a reflective material that only partially reflects light. For example, reflectors 610 can be formed from a transparent material and a partially reflective coating (e.g., a partially silvered mirror). In this manner, luminaire module 200 can provide both direct illumination (i.e., light that propagates directly from the luminaire to the target surface) and indirect illumination (i.e., light that propagates via the ceiling).

The substrate 210 on which the LEEs 212 are arranged may be disposed external to the secondary reflectors 610 so that the secondary reflectors do not obstruct airflow along the back surface of substrate 210 on which the LEEs 212 are disposed. Secondary reflectors 610 may be configured to provide thermal contact with substrate 210 to aid in the dissipation of heat generated by the LEEs. Luminaire module 200 may be configured to provide such thermal coupling also for modularly replaceable secondary reflectors. Secondary reflectors 610 may form part of the heat sink for the LEEs.

While secondary reflectors 610 are depicted as having a constant radius of curvature, in general, the shape of secondary reflectors may vary as desired. For example, surfaces of secondary reflectors can include one or more segments having straight, angled, segmented, curved, involute or other shape in one or two dimensions to provide a predetermined broad or narrow emission pattern. In some embodiments, secondary reflectors have planar reflective surfaces. The shape of the secondary reflectors may be determined by tailoring algorithms to provide a desired optical function, for example.

Figure 7:
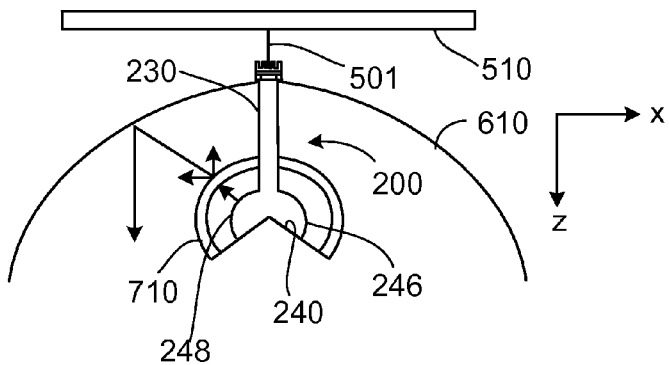
FIG. 7 is a view of yet another embodiment of a luminaire.

In luminaire module 200, the emission spectrum of the luminaire corresponds to the emission spectrum of the LEEs. However, in some embodiments, a wavelength-conversion material may be positioned in the luminaire, for example remote from the LEEs, so that the wavelength spectrum of the luminaire is dependent both on the emission spectrum of the LEEs and the composition of the wavelength-conversion material. In general, a wavelength-conversion material can be placed in a variety of different locations in luminaire module 200. For example, a wavelength-conversion material may be disposed proximate the LEEs 212, adjacent surfaces 242 and 244 of optical extractor 240, on the exit surfaces 246 and 248 of optical extractor 240, placed at a distance from the exit surfaces 246 and 248 and/or at other locations. Referring to FIG. 7, in some embodiments, a layer 710 of a wavelength-conversion material is disposed in the path of light exiting optical extractor 240 a distance (e.g., a few millimeters to a few centimeters) from surfaces 246 and 248. Such a configuration may facilitate creation of a reduced intensity source which may be reflected from secondary reflectors 610, thereby providing softer lighting. The layer 710 of wavelength-conversion material may be attached to light guide 230, held in place via a suitable support structure (not illustrated), disposed within the extractor (also not illustrated) or otherwise arranged, for example. Wavelength-conversion material that is disposed within the extractor may be configured as a shell or other object and disposed within a notional area that is circumscribed by R/n or even smaller $R*(1+n^2)^{(-1/2)}$, wherein R is the radius of curvature of the light-exit surfaces (246 and 248 in FIG. 2) of the extractor and n is the index of refraction of the portion of the extractor that is opposite of the wavelength-conversion material as viewed from the reflective surfaces (242 and 244 in FIG. 2). The support structure may be transparent self-supporting structure. The light-converting material diffuses light as it converts the wavelengths, provides mixing of the light and can help uniformly illuminate secondary reflectors 610.

Alternatively, or additionally, secondary reflectors 610 may contain a layer of wavelength-conversion material. This may also provide or contribute soft, diffuse illumination. For example, the secondary reflector includes a layer of phosphor on or below one or more suitably reflective surfaces of the secondary reflector. Alternatively, or additionally, the secondary reflector may include a translucent material with a wavelength-conversion material in close proximity that may be configured to allow transmission of a portion of light through the secondary reflector to a ceiling or into the ambient behind the secondary reflector. As such the secondary reflector may be configured for direct as well as mixed direct and indirect ambient illumination.

Figure 8:
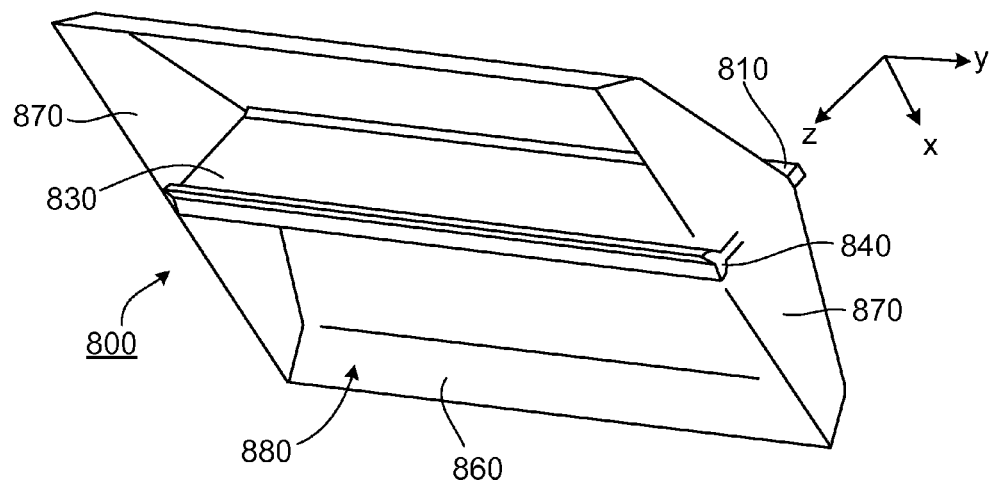
FIG. 8 is a view of an embodiment of a troffer luminaire.

In general, luminaire module 200 can be configured in a variety of form factors. For example, with reference to FIG. 8, in some embodiments, luminaire module 200 can be integrated into a luminaire 800 designed to be installed in or suspended from a ceiling with ceiling panels. For example, luminaire 800 can have a 2'×2' or 2'×4' footprint (i.e., in the x-y plane), corresponding to the size of conventional modules that support fluorescent luminaires. Luminaire 800 includes a carrier 810, light guide 830, an optical extractor 840, and a secondary reflector 860. Luminaire 800 further includes optical couplers and a plurality of LEEs (not illustrated) housed within carrier 810. Carrier 810 can be formed of extruded aluminum and may be attached to the secondary reflectors 860 and the light guide 830. Secondary reflectors 860 are closed off at two ends by walls 870 and are configured to reflect all incident light. In other words, luminaire 800 is designed for direct illumination only. In FIG. 8, one of walls 870 is illustrated in cut away to better show a portion of light guide 830 and optical extractor 840. Luminaire 800 can be used alone or in multiples to form a suitably sized troffer, for example. In some embodiments, luminaire 800 includes a diffusor plate positioned, for example, to cover the opening 880 of the luminaire and protect the optical system from dust or other environmental effects.

Figure 9:
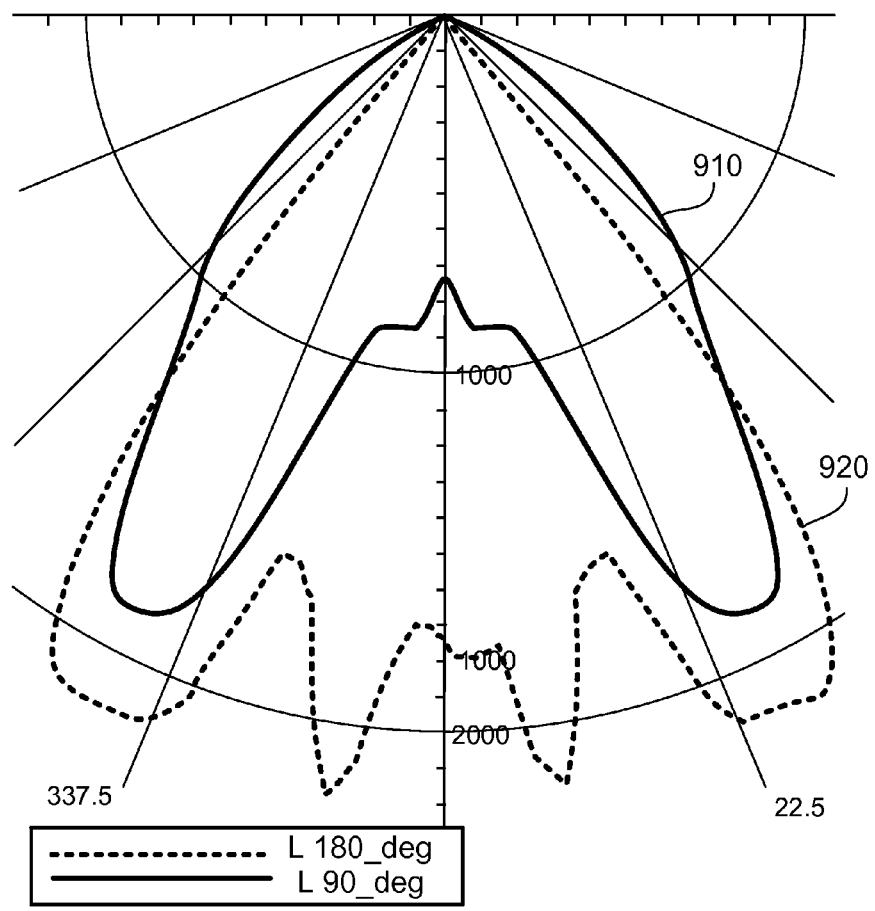
FIG. 9 is an intensity profile of an embodiment of a troffer luminaire.

As explained herein, composition and geometry of components of the luminaire can affect the intensity distribution provided by the luminaire. For example, referring to FIG. 9, in some embodiments, luminaire modules can be configured to direct substantially all of the light into a range of angles between 315° and 45° in a cross-sectional plane of the luminaire 800, where 0° corresponds to the forward direction. The forward direction corresponds to a normal to the substrate 810 and parallel to the light guide 830, and can be toward the floor for a luminaire mounted on a ceiling. In FIG. 9, the intensity profile in the cross-sectional plane is given by trace 910 and the intensity profile in the symmetry plane is given by trace 920. The intensity profile in the cross-sectional plane has maximum illuminance at about 330° and 30°. The intensity profile in the symmetry plane also includes lobes having maxima at about 330° and 30°, and also includes maxima at about 350° and 10°. Luminaire modules may be configured to direct little or no illumination into certain angular ranges close to the plane of the ceiling to avoid glare. For example, in the present example, the luminaire directs almost no illumination in ranges from 55° to 90° relative to the forward direction. This may be advantageous because illumination propagating from a luminaire at such directions can be perceived as glare in certain applications (e.g., in office lighting), which is undesirable.

The simulated intensity profile in FIG. 9, and in other simulations described below, was generated using Lighttools.

Figure 10B:
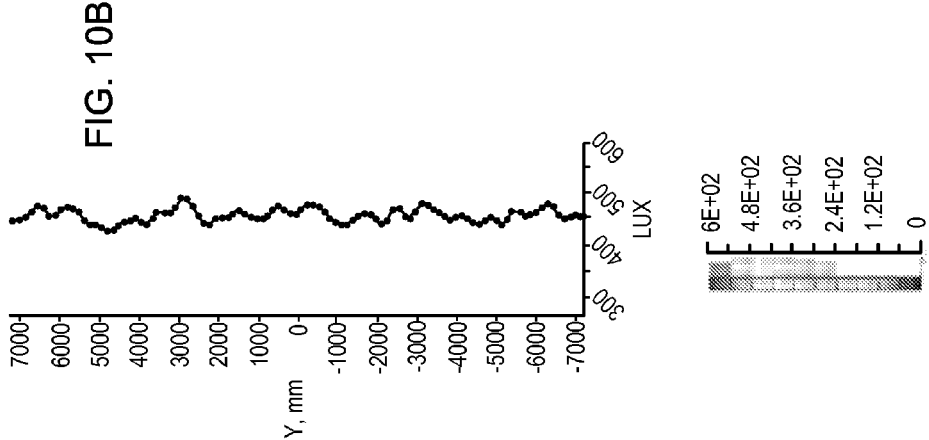
FIGS. 10A-10C show aspects of an intensity distribution from an array of troffer luminaires at a target surface.
Figure 10A:
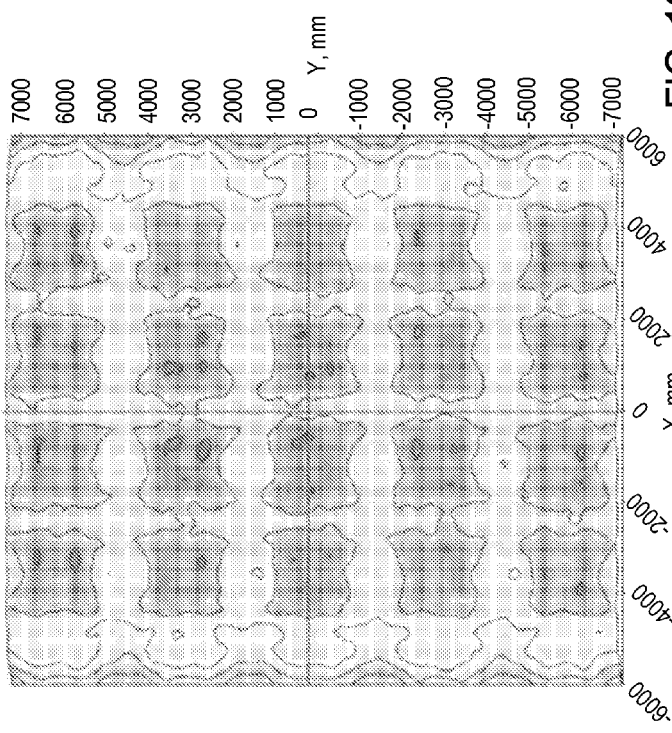
Figure 10C:
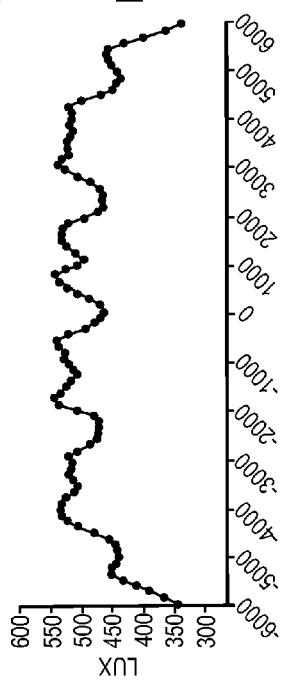

Multiple direct-illumination luminaire modules can be installed in a space to provide desired illumination for a target surface. In general, the number, density, and orientation of the modules in the space can vary as desired to provide an overall intensity profile suitable of the target surface. In some embodiments, arrays of similarly oriented modules can be arranged in a ceiling. For example, referring to FIGS. 10A-C, twenty five 2'×2' modules are arranged in a 5×5 array in a 40'×50' space (8'×10' spacing) with 9' ceiling height to illuminate a target surface 2.5' off the floor. Each module has the intensity distribution shown in FIG. 9. FIG. 10A shows a contour plot of a simulated intensity distribution on the target surface. FIG. 10B shows a simulated intensity profile through the long dimension of the target surface at X=0 mm. The illuminance varies between about 400 lux and about 500 lux across this section. FIG. 10C shows a simulated intensity profile through the short dimension of the target surfaces at Y=0 mm. The illumination drops below 450 lux within about 500 mm from the edges of the target surface in this section, but stays within a range from about 450 lux to about 550 lux across the majority of the section. The intensity profile illustrated in FIGS. 10A-10C may be suitable for office space, for example.

Figure 11A:
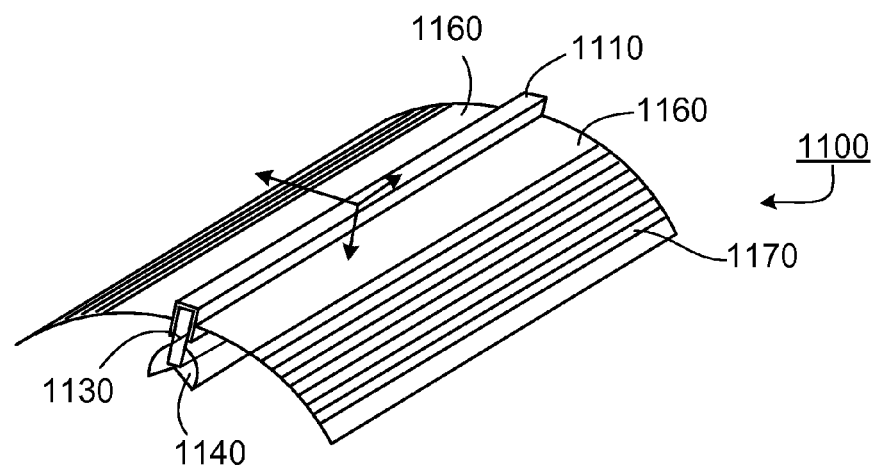
FIGS. 11A and 11B are views of an embodiment of a pendant luminaire.
Figure 11B:
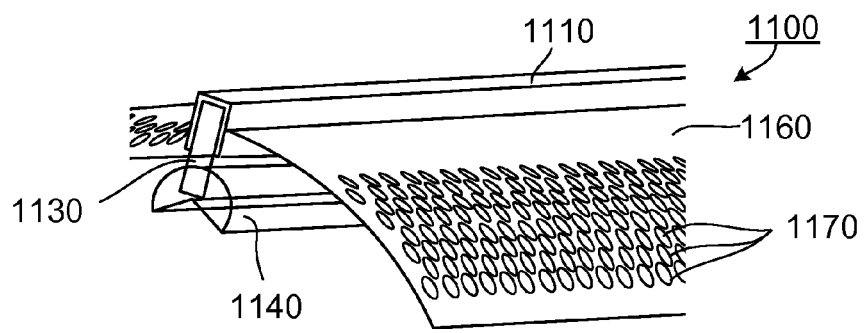

Referring to FIGS. 11A and 11B, in certain embodiments, a luminaire is configured as a suspended luminaire 1100, which includes a carrier 1110, a light guide 1130, an optical extractor 1140, and secondary reflectors 1160. Carrier 1110 houses the LEEs and the one or more optical couplers (not shown in FIGS. 11A and 11B).

Figure 11C:
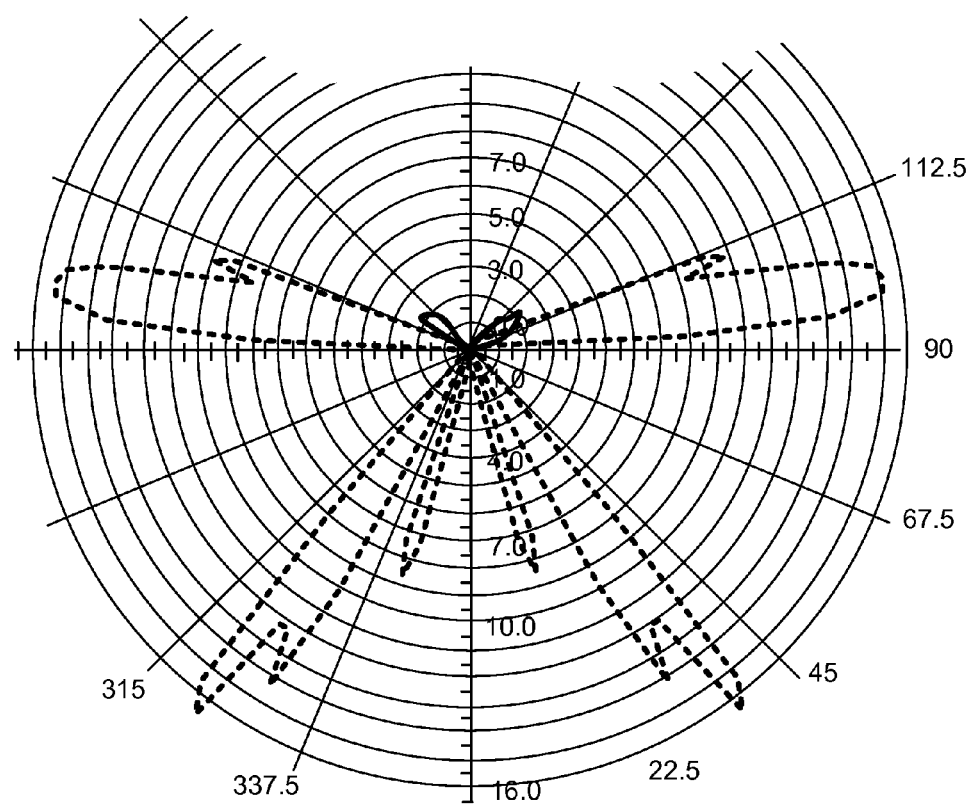
FIG. 11C is a polar plot of a simulated intensity profile of an embodiment of a pendant luminaire.

Secondary reflectors 1160 include apertures 1170. Suspended luminaire 1100 is designed to provide both direct and indirect illumination. Indirect illumination results from light from optical extractor 1140 that is transmitted through apertures 1170 and scatters from the ceiling. FIG. 11C shows an exemplary simulated intensity profile in the cross-sectional plane of an embodiment of suspended luminaire 1100. Here, 0° corresponds to the forward direction. Direct illumination corresponds to the lobes between 315° and 337.5° and between 22.5° and 45°. Indirect illumination corresponds to the lobes between 90° and 112.5° and between 157.5° and 180°. In this embodiment, suspended luminaire 1100 emits negligible amounts of light into polar angles between 45° and 90°, between 112.5° and 157.5°, and between 180° and 315°. A suspended luminaire may be fabricated in 4 ft or 8 ft lengths and installed in a linear arrangement for example in an office environment. Such luminaires may emit about 1250 lm/linear foot and provide a peak intensity of above 1500 cd in the indirect beam component and 800 cd in the direct beam component.

Figure 12A:
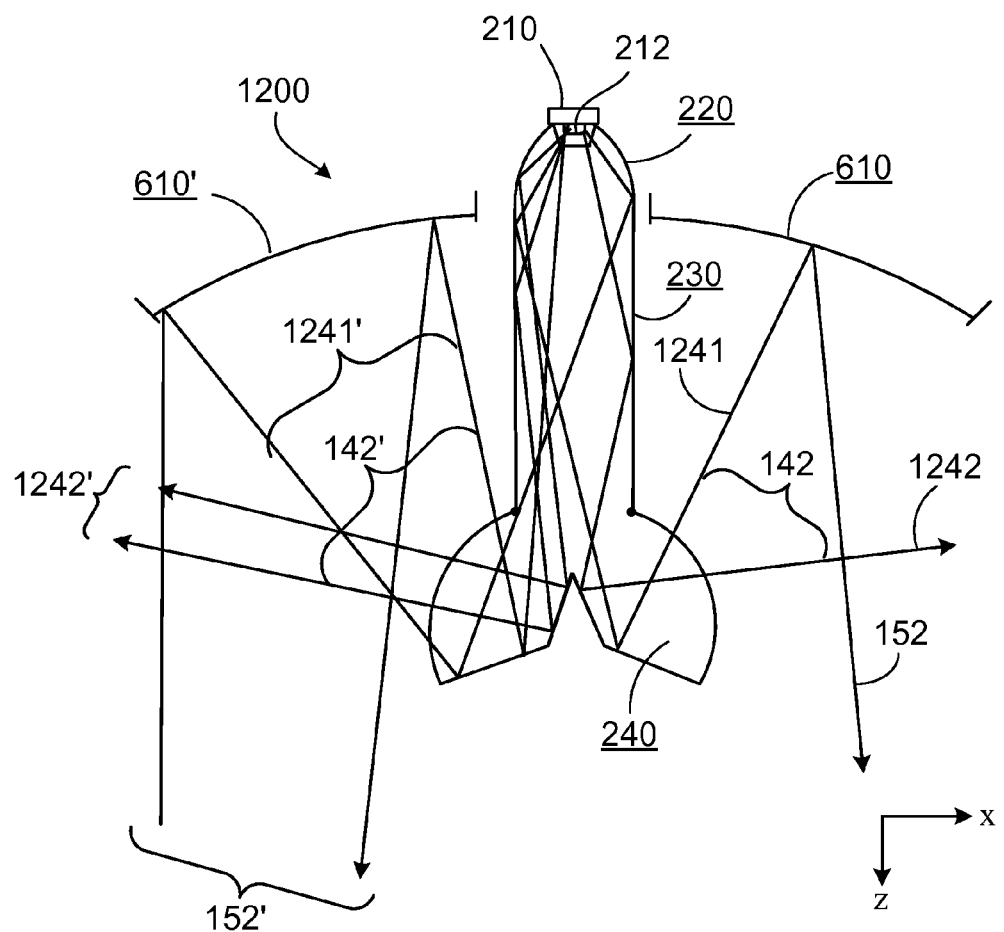
FIG. 12A is a view of an embodiment of a luminaire used to provide direct and indirect components of a light intensity distribution.

Referring to FIG. 12A, a luminaire 1200 can be configured to provide both direct and indirect illumination on an illumination target. An indirect portion of an intensity distribution output by the luminaire 1200 can include angular ranges 1242 and 1242'. If the luminaire 1200 is suspended from a ceiling, the indirect portion of an intensity distribution can be designed to achieve maximum illuminance uniformity on the ceiling, for example in a typical spacing arrangement of luminaires of 8'×10'. In order to achieve good illuminance uniformity on the ceiling at very low penetration of the luminaire 1200 into the room, the indirect portions of the intensity distribution need to exit the luminaire at oblique angles, typically with a peak intensity between 90 and 110 degrees with respect to the positive z-direction and a divergence less than 20 degrees, for instance. Furthermore, it may be desirable to minimize light emission below 90 degrees to minimize glare and to meet RP 1 criteria. A direct portion of the intensity distribution output by the luminaire 1200 can include angular ranges 152 and 152'. The direct portion of the intensity distribution can be designed to maximize illuminance uniformity at a desirable work surface for a given luminaire layout of the space. The direct portion of the intensity distribution may take the shape of a batwing distribution with peak intensity below 45 deg. The direct portion of the intensity distribution may also be designed to minimize light emission above 55 degrees and minimize glare and to meet RP1 criteria.

The luminaire 1200 includes a substrate 210 that is elongated along a y-axis (perpendicular to the figure). A plurality of LEEs (e.g., LEDs) 212 are distributed along a longitudinal dimension of the substrate 210. A normal to a surface of the substrate 210 is oriented along the z-axis. The LEEs 212 emit, during operation, light in a first angular range with respect to the z-axis.

The luminaire 1200 includes one or more primary optics 220, a light guide 230, a secondary optic 240, and first and second tertiary optics 610, 610'. In the example illustrated in FIG. 12A, the primary optics 220, the light guide 230 and the secondary optic 240 are fabricated from transparent materials such as glass, plastics, and the like, and have a full cross-section. Such optical components are referred to as solid optics, e.g., solid primary optics, solid secondary optic, etc. In other implementations, one or more of the primary optics 220 or the light guide 230 can be fabricated from or have coatings of reflective materials such as Al, Ag, certain reflective dielectrics, and the like, and have hollow cross-section. The latter optical components can be referred to as hollow optics. Examples of such primary optics 220 (optical couplers) are discussed below in connection with FIGS. 34-36.

Referring again to FIG. 12A, the one or more solid primary optics 220 are arranged in an elongated configuration along the longitudinal dimension and coupled with the LEEs 212. Moreover, the one or more solid primary optics 220 are shaped to redirect light received from the LEEs 212 in the first angular range, and to provide the redirected light in a second angular range. A divergence of the second angular range is smaller than a divergence of the first angular range at least in a plane x-z perpendicular to the longitudinal dimension of the luminaire 1200.

The solid light guide 230 also is elongated in the longitudinal dimension. The solid light guide 230 is coupled to the one or more solid primary optics 220 to receive the light provided by the solid primary optic 220 in the second angular range. Additionally, the solid light guide 230 is shaped to guide the light received from the solid primary optic 220 in the second angular range and to provide the guided light in substantially the same second angular range to the solid secondary optic 240.

The solid secondary optic 240 also is elongated in the longitudinal dimension. Further, the solid secondary optic 240 is coupled to the solid light guide 230 to receive the light provided by the solid light guide 230 in the second angular range. Moreover, the solid secondary optic 240 extracts the received light into first and second output angular ranges 142, 142', as described in detail above in connection with FIG. 2A. In the example implementation illustrated in FIG. 12A, the solid secondary optic 240 has a symmetric profile in a cross-sectional plane x-y perpendicular to the longitudinal dimension of the luminaire 1200, such that the first and second output angular ranges 142, 142' have the same divergence. In addition, a redirecting surface of the solid secondary optic 240 of the luminaire 1200 was described above in connection with FIG. 2C. A shape of the redirecting surface 243 of the luminaire 1200, e.g., a relative position of the three apexes thereof, 2411, 241, 2444, and a relative orientation of facets of the redirecting surface defined by the apexes, can separate each of the first and second output angular ranges 142, 142' into portions of extracted light that can be used to form indirect and direct components of an intensity distribution associated with the luminaire 1200.

Optical surfaces and/or interfaces of the solid secondary optic 240 can include one or more parabolic, hyperbolic, spherical, aspherical, facetted, segmented, polygonal, or otherwise shaped portions, as described above in connection with FIGS. 2A-2G, for example.

In the example implementation illustrated in FIG. 12A, light provided by the luminaire 1200 in a first portion 1242 of the first output angular range 142 and in a first portion 1242' of the second output angular range 142' can form the indirect component of the intensity distribution associated with the luminaire 1200. As described above in this specification, the indirect component of the intensity distribution can be used to illuminate an object (e.g., a ceiling to which the luminaire 1200 is attached) different from an illumination target, and as such, to indirectly illuminate the illumination target.

Additionally, light provided by the luminaire 1200 in the second portion 1241 of the first output angular range 142 can be redirected by the first tertiary optic 610 in a first target angular range 152, and light provided by the luminaire 1200 in a second portion 1241' of the second output angular range 142' can be redirected by the second tertiary optic 610' in a second target angular range 152'. In this manner, the first and second target angular ranges 152, 152' can form a direct component of the intensity distribution associated with the luminaire 1200 to directly illuminate the illumination target. Shapes of the first and second tertiary optics may be tailored to achieve the desired illumination pattern. The profile of the tertiary optic may be linear, segmented linear, free form shaped, parabolic, elliptical, hyperbolical or any other shape in order to provide the desired function. In a preferred embodiment the optical power of the tertiary optic exists only in the plane perpendicular to the linear direction of the luminaire enabling manufacturing by extrusion of such optical part or a standard sheet metal bending process. In a different embodiment the tertiary optic has optical power both in direction of the linear array and perpendicular to it.

Figure 12B:
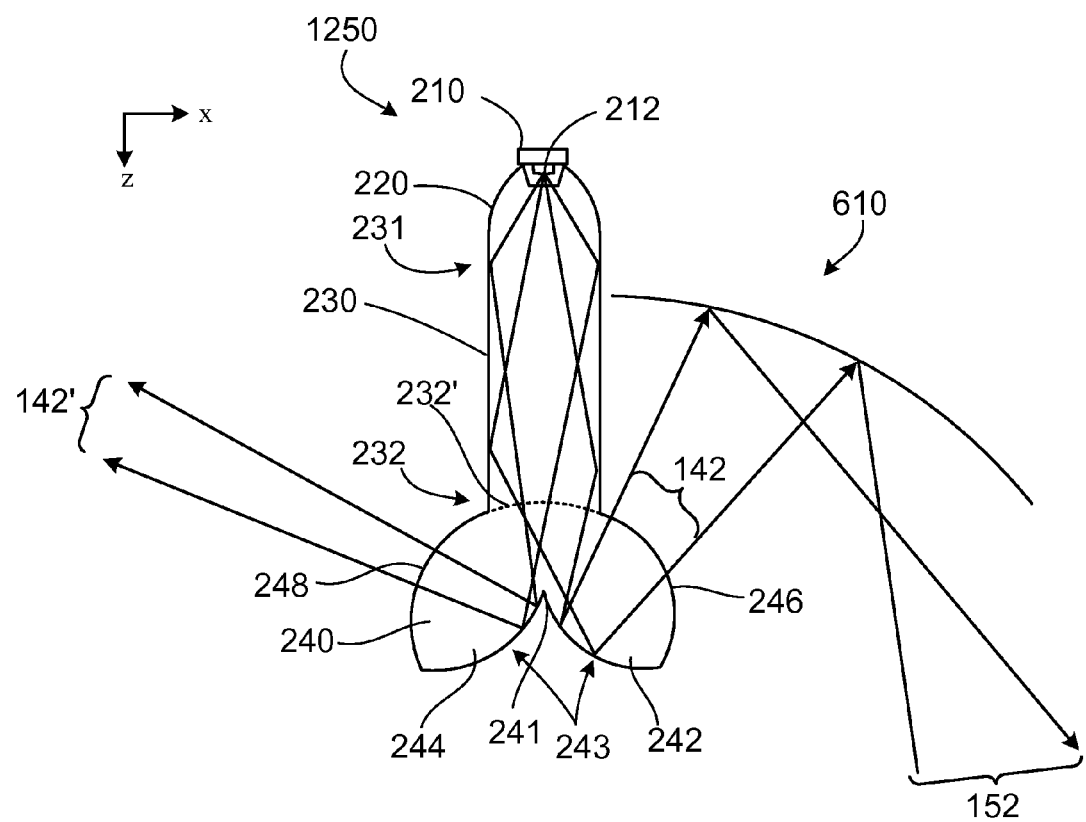
FIG. 12B is a view of another embodiment of a luminaire used to provide direct and indirect components of a light intensity distribution.

While the foregoing embodiments of luminaires have a symmetry plane extending in the luminaire's longitudinal direction, asymmetric form factors are also possible. For example, in some embodiments, only one tertiary optic can be used to redirect the light extracted from by a secondary optic. FIG. 12B shows an example of such an asymmetric luminaire 1250, that can be configured to provide both direct and indirect illumination on an illumination target. In the example illustrated in FIG. 12B, the luminaire 1250 is elongated along the y-axis and includes a substrate 210, a plurality of LEEs 212, one or more primary optics 220 (configured as an optical collector), a light guide 230, a secondary optic 240 (configured as an optical extractor), and a tertiary optic including at least on reflector 610. Because the primary optics 220, the light guide 230 and the secondary optic 240 are fabricated from transparent materials have a full cross-section (in this example), these optical components are referred to as solid optics.

The substrate 210 has first and second opposing surfaces, such that each of the first and second surfaces are elongated and have a longitudinal dimension (along the y-axis, perpendicular to the page) and a transverse dimension (along the x-axis) shorter than the longitudinal dimension. The LEEs 212 are arranged on the first surface of the substrate 210 and are distributed along the longitudinal dimension, such that the LEEs 212 emit, during operation, light in a first angular range with respect to a normal to the first surface of the substrate 210 (along the z-axis). The one or more solid primary optics 220 can be arranged in an elongated configuration along the longitudinal dimension of the first surface and are coupled with the LEEs. In some implementations, the one or more primary optics 220 may include indexing and reference features that can be used to accurately and repeatedly position the primary optics 220 to the LEEs 212. The one or more solid primary optics 220 are shaped to redirect light received from the LEEs 212 in the first angular range, and to provide the redirected light in a second angular range. A divergence of the second angular range is smaller than a divergence of the first angular range at least in a plane x-z perpendicular to the longitudinal dimension of the luminaire 1250. Examples of such solid primary optics 220 (couplers) are described in detail below in connection with FIGS. 34-36.

The solid light guide 230 includes input and output ends 231, 232. The input and output ends of the solid light guide 231, 232 are elongated in the longitudinal dimension and have substantially the same shape. The input end of the solid light guide 231 can be coupled to the one or more solid primary optics 220 to receive the light provided by the solid primary optic 220 in the second angular range. Additionally, the solid light guide 230 is shaped to guide the light received from the solid primary optic 220 in the second angular range and to provide the guided light in substantially the same second angular range with respect to the first surface of the substrate 210 at the output end of the solid light guide 232.

The solid secondary optic 240 includes an input end 232', a redirecting surface 243 opposing the input end 232' and first and second output surfaces 246, 248. Each of the input end 232', and redirecting 243, first output 246 and second output 248 surfaces of the solid secondary optic 240 are elongated along the longitudinal dimension. The input end of the solid secondary optic 231' is coupled to the output end of the solid light guide 232 to receive the light provided by the solid light guide 230 in the second angular range. The redirecting surface 243 has first and second portions 242, 244 that reflect the light received at the input end of the solid secondary optic 232' in the second angular range, and provide the reflected light in third and fourth angular ranges with respect to the normal to the first surface of the substrate 210 towards the first and second output surfaces 246, 248, respectively. Here, at least prevalent directions of propagation of light in the third and fourth angular ranges are different from each other and from a prevalent direction of propagation of light in the second angular range at least perpendicular to the longitudinal dimension of the first surface of the substrate 210. In the example implementation illustrated in FIG. 12B, the first and second portions of the redirecting surface 242, 244 have arcuate shapes in the x-z cross-sectional plane, (see FIG. 2C). Thus, divergences of the third and fourth angular ranges are different from a divergence of the second angular range. Additionally, if a curvature of the first portion of the redirecting surface 242 is different from a curvature of the second portion of the redirecting surface 244, then the divergences of the third and fourth angular ranges also are different from each other. In general, the first and second portions of the redirecting surface 242, 244 can include one or more parabolic, hyperbolic, spherical, aspherical, facetted, segmented, polygonal, or otherwise shaped portions, as described above in connection with FIGS. 2A-2G, for example.

Referring again to FIG. 12B, the first output surface 246 is shaped to refract the light provided by the first portion of the redirecting surface 242 in the third angular range as first refracted light, and to output the first refracted light in a fifth angular range 142 with respect to the normal to the first surface of the substrate 210 outside the first output surface of the solid secondary optic 246. A shape of the first output surface 246 can be tailored such that the fifth angular range 142 is different than or substantially the same as the third angular range. Additionally, the second output surface 248 is shaped to refract the light provided by the second portion of the redirecting surface 244 in the fourth angular range as second refracted light, and to output the second refracted light in a sixth angular range 142' with respect to the normal of the first surface of the substrate 210 outside the second output surface of the solid secondary optic 248. A shape of the second output surface 248 can be tailored such that the sixth angular range 142' is different than or substantially the same as the fourth angular range.

The reflector 610 is elongated along the longitudinal dimension and is arranged to, at least in part, face the first output surface of the solid secondary optic 246. The reflector 610 is shaped to reflect at least some of the light output by the first output surface of the solid secondary optic 246 in the fifth angular range 142 as first reflected light in a seventh angular range 152 with respect to the normal to the first surface of the substrate 210. Here, at least a prevalent direction of propagation of light of the seventh angular range 152 is different from a prevalent direction of propagation of light of the fifth angular range 142 at least in a plane x-z perpendicular to the longitudinal dimension.

In some implementations, the reflector 610 is spaced apart from the first output surface of the solid secondary optic 246. For example, the reflector 610 can be thermally coupled to the substrate 210 to extract at least some of the heat generated by the LEEs during operation. In other implementations, an edge of the reflector 610 can be coupled to an edge of the first output surface of the solid secondary optic 246, along an edge where the solid secondary optic 240 is attached to the light guide 230. Moreover, at least a portion of the reflector 610 can be an involute of (e.g., has a shape that matches the shape of) at least a portion of the first output surface of the solid secondary optic 246.

In the example implementation shown in FIG. 12B, a first portion of the intensity distribution output by the luminaire 1250 during operation includes at least some of the first reflected light having the seventh angular range 152. Additionally, a second portion of the intensity distribution output by the luminaire 1250 during operation includes at least some of the light output by the second output surface of the solid secondary optic 248 within the sixth angular range 142'.

Diffusing power can be added on the first and second output surfaces 246, 248, the reflector 610 of the tertiary optic, or added in form of a separate diffuser in order to increase illuminance uniformity at the target surface.

Figure 13A:
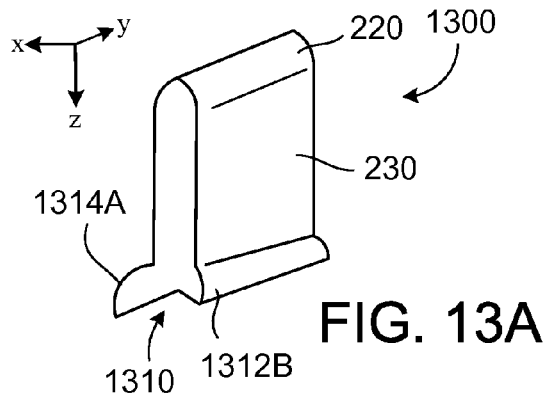
FIGS. 13A-13F show different aspects of an asymmetric luminaire.
Figure 13B:
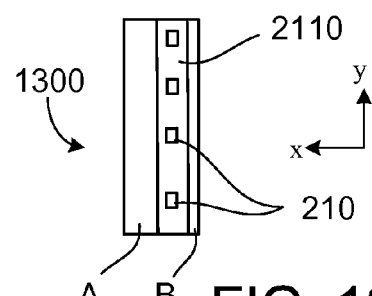

While the luminaire 1250 is an example of an asymmetric luminaire including (i) an optical extractor 240 with a symmetric profile in a cross-sectional plane x-z, and (ii) a single reflector of the tertiary optic, other asymmetric form factors are possible. For example, in some embodiments, the optical extractor can have an asymmetric profile in cross-section, resulting in an asymmetric intensity profile in cross-section. FIG. 13A shows an exemplary embodiment of such an asymmetric luminaire 1300. Here, the asymmetric luminaire 1300 is elongated along the y-axis and includes optical collector 220, light guide 230, and an asymmetric optical extractor 1310. FIG. 13B shows a top view (in plane x-y) of the asymmetric luminaire 1300. The light source of the asymmetric luminaire 1300 includes a plurality of LEEs 210 distributed along a substrate 2110, elongated along the y-axis.

Figure 13C:
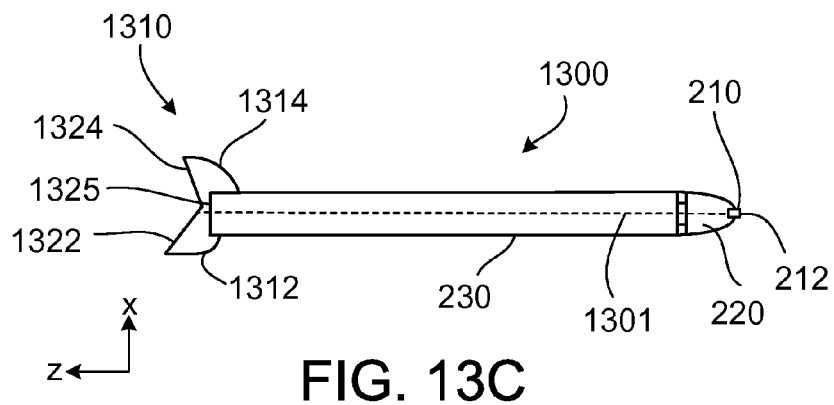
Figure 13D:
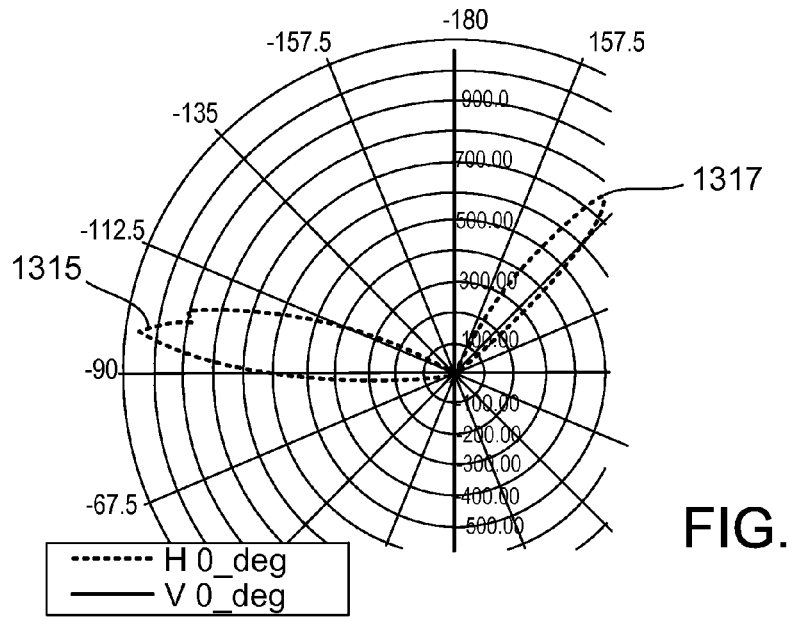

FIG. 13C shows aspects of the optical extractor 1310 of the asymmetric luminaire 1300. The optical extractor 1310 was simulated and includes tailored reflective surfaces 1322, 1324, and tailored light-exit surfaces 1312 and 1314. For clarity reasons, a side of the asymmetric luminaire 1300 corresponding to output surface 1312 is referred to as side "B" of the asymmetric luminaire 1300, and the opposing side corresponding to output surface 1314 is referred to as side "A" of the asymmetric luminaire 1300. Surfaces 1322 and 1324 are coated with a reflective material to provide a reflective optical interface for light exiting the light guide 230. Surfaces 1322 and 1324 meet at vertex 1325. FIG. 13D shows a polar plot of a simulated intensity profile of the luminaire asymmetric 1300. An intensity distribution of light output through light-exit surfaces 1312 and 1314 of the asymmetric luminaire 1300 includes lobes 1315 and 1317.

In general, optical extractor 1310 may have varying degrees of asymmetry with respect to a plane of symmetry of light guide 230 which extends in the longitudinal direction of luminaire 1300 (denoted by dotted line 1301 in FIG. 13C). For example, vertex 1325 may intersect or be displaced (laterally offset) from the symmetry plane. Surfaces 1322 and 1324 can have different dimensions in cross-section and/or can be at different orientations with respect to the symmetry plane. In some embodiments, the materials forming the optical interfaces at surfaces 1322 and 1324 can be different. For example, in some embodiments, one of these surfaces can be coated with a material that specularly reflects light, while the other surface is coated with a material that diffusely reflects light. Alternatively, or additionally, one or both of the surfaces 1322, 1324 can be coated with a material that partially transmits light, providing direct illumination from optical extractor 1310 to a work surface.

Curved light-exit surfaces 1312 and 1314 can also be different. For example, these surfaces can have different centers of curvature, different shapes (e.g., different radii of curvature), different arc lengths, and/or different surface properties (for example, one surface can be coated with a diffusing material, while the other is transparent).

Accordingly, as a result of the asymmetry in optical extractor 1310, asymmetric luminaire 1300 has an asymmetric intensity profile in the cross-sectional plane. For example, luminaire 1300 can be designed to direct more light to one side of the light guide than the other. Alternatively, or additionally, luminaire 1300 can be designed to direct light into different angular ranges on different sides of light guide 230.

Figure 13E:
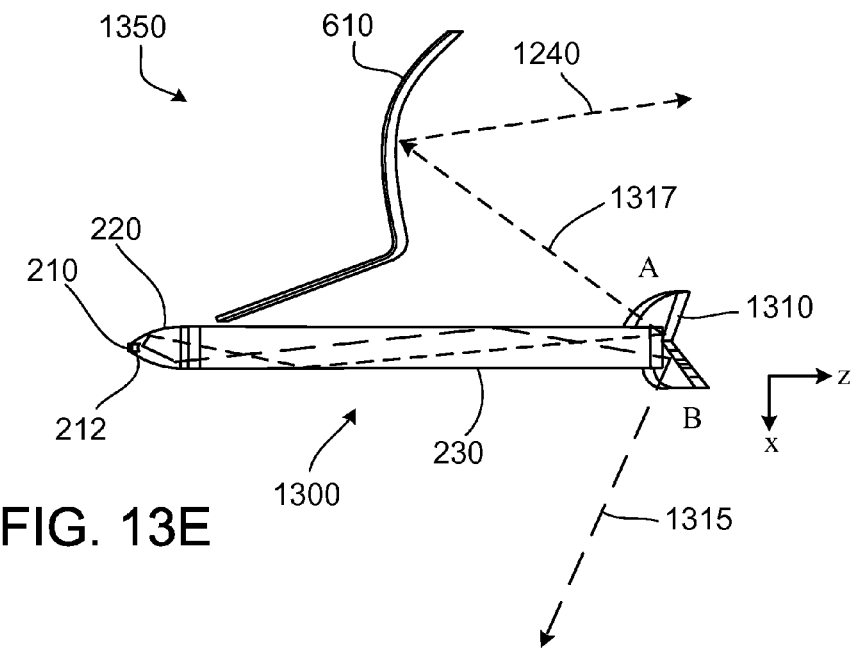
Figure 13F:
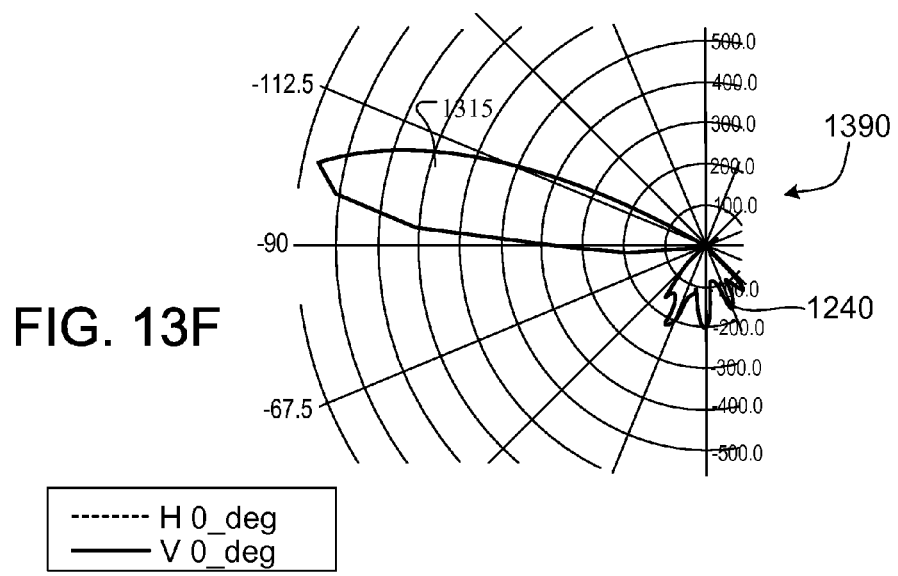

FIG. 13E shows an exemplary embodiment of a luminaire 1350 including the asymmetric luminaire 1300 and a tertiary optic including a tertiary reflector 610. The optical extractor 1310 outputs light on side A of the asymmetric luminaire 1300 in a first output angular range 1317, and additional light on side B of the asymmetric luminaire 1300 in a second output angular range 1315. The second output angular range 1315 can be used to provide indirect illumination on a work surface, e.g., by illuminating the ceiling above the work surface. The reflector 610 of the tertiary optic can shape the light output by the optical extractor 1310 in the first angular range 1317, and redirect the shaped light in an angular range 1240 to provide direct illumination of the work surface. FIG. 13F shows a polar plot of the illumination distribution 1390 associated with the luminaire 1350, including an intensity lobe 1315 corresponding to the indirect component of the illumination distribution 1390, and an intensity pattern 1240 corresponding to the direct component of the same.

The surface profile of the reflector 610 can be tailored to obtain a desired pattern 1240 corresponding to the direct component of the illumination distribution 1390 associated with the luminaire 1350. The reflector 610 of the tertiary optic can be fabricated from a reflectively coated sheet metal. The reflector 610 of the tertiary optic can have optical power in only one plane z-x, which may allow for a conventional metal bending processes to shape the surface of the reflector 610.

In some embodiments, multiple luminaire modules (e.g., luminaire module 200, asymmetric luminaires 1300, or luminaires 1350) can be arranged into a luminaire system that provides a desired intensity profile. For example, referring to FIGS. 14A-14C, an indirect direct troffer luminaire 1400 includes four luminaire modules 1410, 1411, 1412, and 1413, arranged in a square formation. Each of the luminaire modules has an asymmetric cross-sectional profile of the type shown in FIG. 13E. An intensity distribution provided by each of the four luminaire modules 1410, 1411, 1412, and 1413 corresponds to the intensity distribution 1390 associated with the luminaire 1350. The luminaire modules 1410, 1411, 1412, and 1413 are oriented so that the larger lobe of the optical extractor (i.e., surface 1312 of the optical extractor 1310 corresponding to side B of the luminaire 1350) faces away from the square, and the reflector 610 points inward of the square. Only the reflector 610 of the tertiary optic of luminaire module 1411 is labeled in FIG. 14B.

Figure 14A:
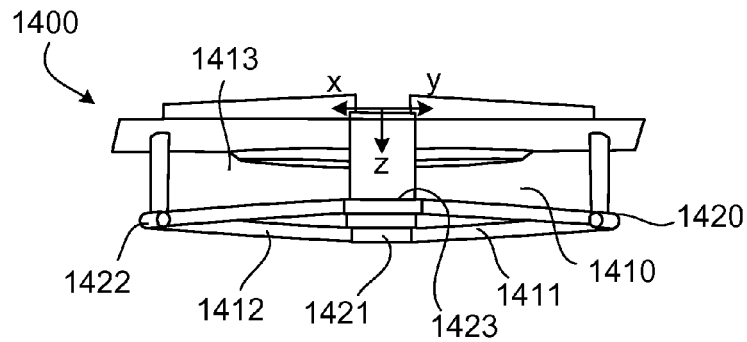
Figure 14B:
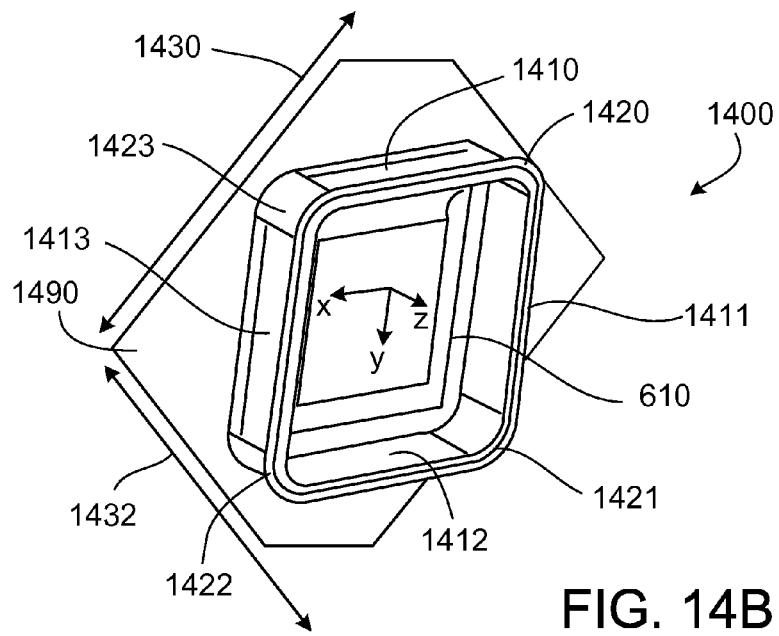
Figure 14C:
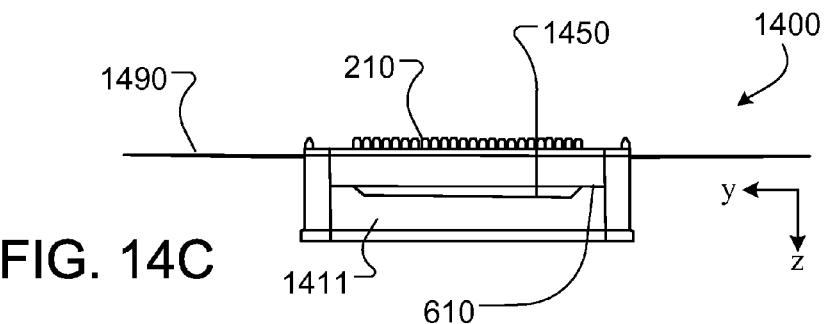

In the example implementation shown in FIGS. 14A-14C, each pair of adjacent luminaire modules is connected by one of connector elements 1420, 1421, 1422, and 1423. In this implementation, each connector element has a cross-sectional profile that matches (other embodiments may be different) the luminaire modules, and bends through 90° in the x-y plane, forming the corners of the square. In general, connector elements 1420, 1421, 1422, and 1423 can be formed from a variety of materials, such as a plastic or a metal. The connector elements can be transparent or opaque. The connector elements can also be attached to the luminaire modules in a variety of ways. For example, the connector elements can be bonded to the luminaire modules using an adhesive, fused to the luminaire modules, or attached via another device, such as a clamp. In some implementations, the outer circumference of the indirect direct troffer luminaire 1400 may be diffuse reflective and fabricated similarly to the inner coversheet 1450 out of powder coated steel. In some implementations, an optical diffuser may be added to the reflector 610 of each of the luminaire modules 1410, 1411, 1412, and 1413, or as an independent component that may cover the interior region of the square circumscribed by the flux manifolds (modules 1420, 1421, 1422, and 1423).

The square shaped by the flux manifolds (modules 1420, 1421, 1422, and 1423) inscribes the housing of the indirect direct troffer luminaire 1400 that can fit into a standard T-bar ceiling grid. For example, indirect direct troffer luminaire 1400 can have a maximum dimension in the x-y plane that allows it to be accommodated in a panel 1490 having 2'×2' footprint (i.e., in the x-y plane), corresponding to the size of conventional troffers that support fluorescent lights. FIG. 14B, for example, shows an example of a luminaire mounted within a square panel 1490 with dimensions shown by arrows 1430 and 1432. In some embodiments, indirect direct troffer luminaire 1400 is designed to be installed in or on a ceiling with ceiling panels 1490. FIG. 14C shows that such a troffer system, which may be about 5" deep (in the z-axis), can reach about 1" into the ceiling 1490. In this manner, the indirect direct troffer luminaire 1400 protrudes about 4" into the room. In other implementations, the indirect direct troffer luminaire 1400 can be directly ceiling mounted. The direct component of the intensity distribution associated with the indirect direct troffer luminaire 1400 is formed entirely in the inside of the square. The reflector 610 of the tertiary optic may be manufactured of non-diffuse reflective material such as Alanod Miro Ag 4420, and a center coversheet 1450 may be fabricated from diffuse reflective material such as powder coated steel or aluminum. The reflector 610 and coversheet 1450 can create a cavity of depth of about 2", sufficient to place drive electronics and power conversion electronics, which control the LEEs of luminaire module 1411 and of the other three modules, into the cavity.

The indirect direct troffer luminaire 1400 may be mounted with the luminaire's longitudinal axes oriented at 45° with respect to the edges of the square panel 1490, however other mounting orientations are also possible. For example, the luminaire's longitudinal axes may be mounted parallel to the edges of the square panel 1490. An arrangement at 45 degrees or other oblique angles of the indirect direct troffer luminaire 1400 may be used to provide more uniform illumination of rectilinear target areas. Likewise, when multiple indirect direct troffer luminaires 1400 are required to illuminate a large space they may be arranged in a rectilinear array with their sides arranged at 45 degrees relative to the axes of the array. Rotating the square shape at 45 deg to the orientation of the ceiling grid, as illustrated in FIG. 14B, is advantageous in achieving optimum uniformity on the ceiling and work surface as the largest spacing between the square luminaire systems is in the diagonal direction.

Figure 14D:
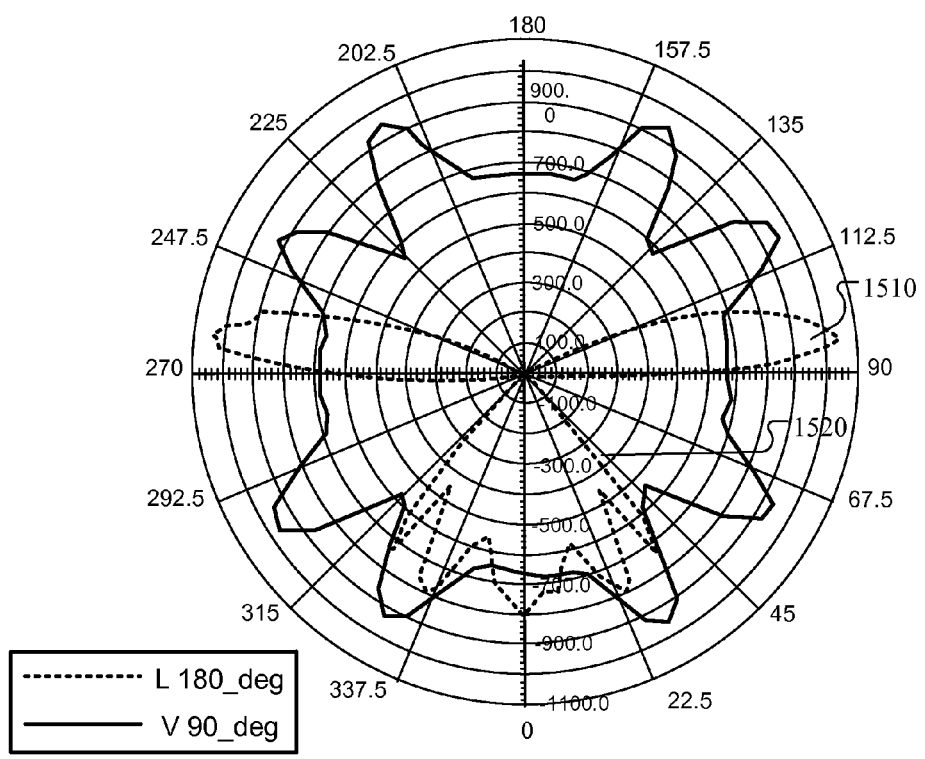

As the solid flux manifolds (modules 1420, 1421, 1422, and 1423) on opposite sides of the indirect direct troffer luminaire 1400 are positioned antiparallel, a symmetric intensity distribution can be obtained. The indirect direct troffer luminaire 1400 can produce max to min uniformity ratios of better than 2:1 on the work surface and better than 10:1 on the ceiling. Referring to FIG. 14D, indirect direct troffer luminaire 1400 can provide symmetric direct and indirect illumination in both of two orthogonal planes. Trace 1510 shows an exemplary simulated intensity profile in the x-z plane of an embodiment of indirect direct troffer luminaire 1400, while trace 1520 shows the simulated intensity profile in the y-z plane. Here, 0° corresponds to the z-direction. In both planes, the luminaire provides direct illumination of similar flux corresponding to the lobes between −45° and 45°. Furthermore, in both planes, the luminaire provides indirect illumination of similar flux. The indirect illumination corresponds to lobes between 90° and 112.5° and between −90° and −112.5°. Luminaire 1400 emits negligible amounts of light into polar angles between 45° and 90°, between −45° and −90°, and between 112.5° and −112.5°.

Multiple direct-indirect illumination luminaires 1400 can be installed in a space to provide desired illumination for a target surface. In general, the number, density, and orientation of the luminaires in the space can vary as desired to provide an overall intensity profile suitable of the target surface. In some embodiments, arrays of similarly oriented indirect direct troffer luminaires 1400 can be arranged in a ceiling. For example, referring to FIGS. 14E-G, twenty five 2'×2' indirect direct troffer luminaires 1400 are arranged in a 5×5 array in a 40'×50' space (8'×10' spacing) with 9' ceiling height to illuminate a target surface 2.5° off the floor. FIG. 14E shows a contour plot of the intensity profile on the target surface. FIG. 14F shows an intensity profile through the long dimension of the target surface at X=0 mm. The illuminance varies between about 300 lux and about 450 lux across this section. FIG. 14G shows an intensity profile through the short dimension of the target surfaces at Y=0 mm. The illumination drops below 375 lux within about 1,000 mm from the edges of the target surface in this section, but stays within a range from about 375 lux to about 475 lux across the majority of the section.

Figure 15A:
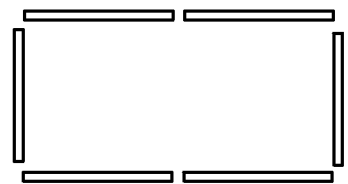
FIGS. 15A-15D show different arrangements of luminaires.
Figure 15B:
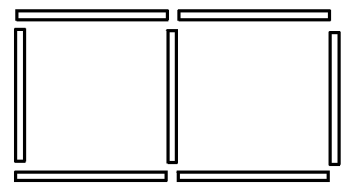
Figure 15C:
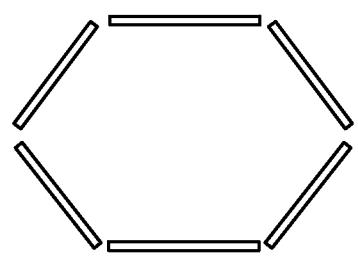
Figure 15D:
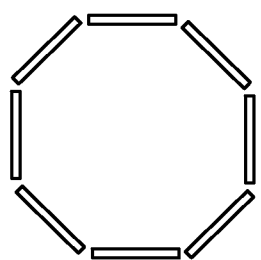

While indirect direct troffer luminaire 1400 includes four luminaire modules arranged as a square, other arrangements are possible. For example, luminaires of types 200, 1300, or 1350 can be arranged into different polygonal shapes, e.g., triangles, rectangles (see FIG. 15A), combinations of rectangles or other quadrilaterals (see FIG. 15B), hexagons (see FIG. 15C), octagons (see FIG. 15D), etc. As another example, the luminaire modules can be arranged on a circular or elliptical contour, corresponding to the contour of a polygon with a very large number of sides (N→∞). Generally, the shape of the luminaire module can be selected to fit a desired installation. For example, rectangular luminaires can be used to fit with rectangular ceiling panels.

Non-polygonal arrangements are also possible. Generally, luminaires can be formed by arranging multiple luminaire modules in any segmented shape. For example, asymmetric luminaire modules 1300 or 1350 can be arranged along a path (e.g., a line), such that near-neighbor asymmetric luminaire modules have common asymmetries (A, B)-(A,B), as illustrated in FIG. 16A, or such that the near-neighbor asymmetric luminaire modules have alternating asymmetries (A,B)-(B, A), as illustrated in FIG. 16B. As another example, the asymmetric luminaire modules can be arranged along parallel paths, such that asymmetric luminaire modules that face each other have common symmetries (A,B):(A,B), as illustrated in FIG. 16C, or such that the asymmetric luminaire modules that face each other have alternating symmetries (A,B):(B,A), as illustrated in FIG. 16D. As another example, the asymmetric luminaire modules can be arranged in intersecting paths (e.g., lines that intersect at 90° or at other angles), such that near-neighbor asymmetric luminaire modules of each of the intersecting paths have common asymmetries (A, B)-(A,B), as illustrated in FIG. 16E, or such that the near-neighbor asymmetric luminaire modules of each of the intersecting paths have alternating asymmetries (A, B)-(B,A), as illustrated in FIG. 16F).

Figure 17A:
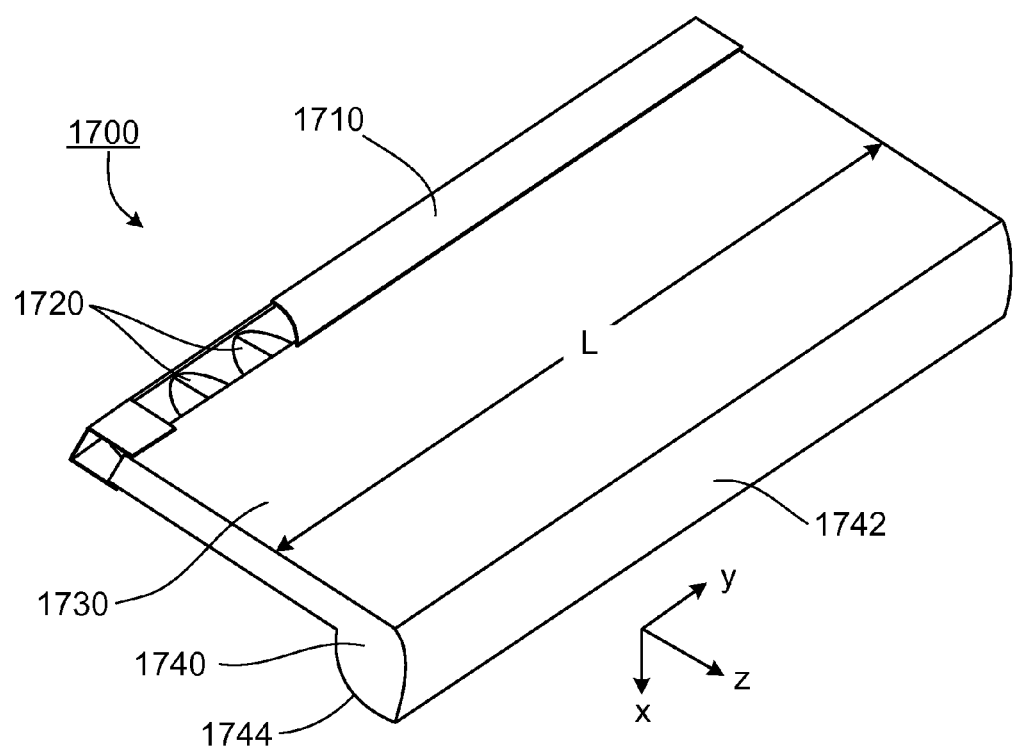
FIGS. 17A-17C are views of an embodiment of a task luminaire.
Figure 17B:
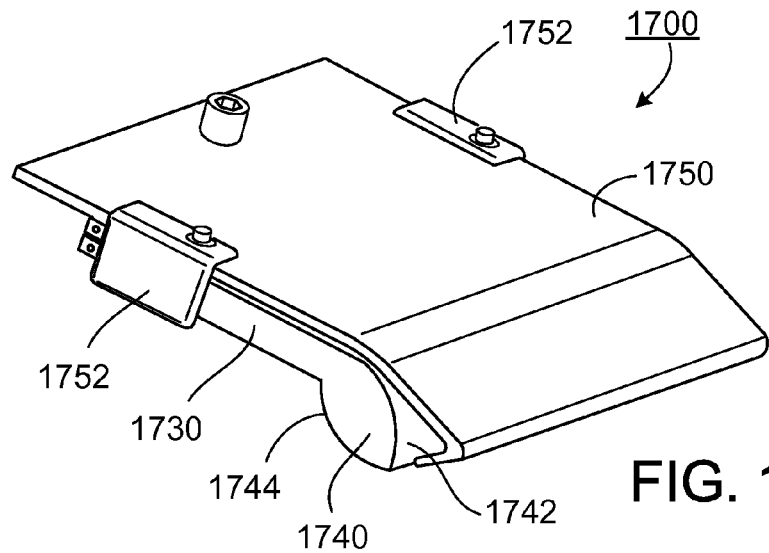
Figure 17C:
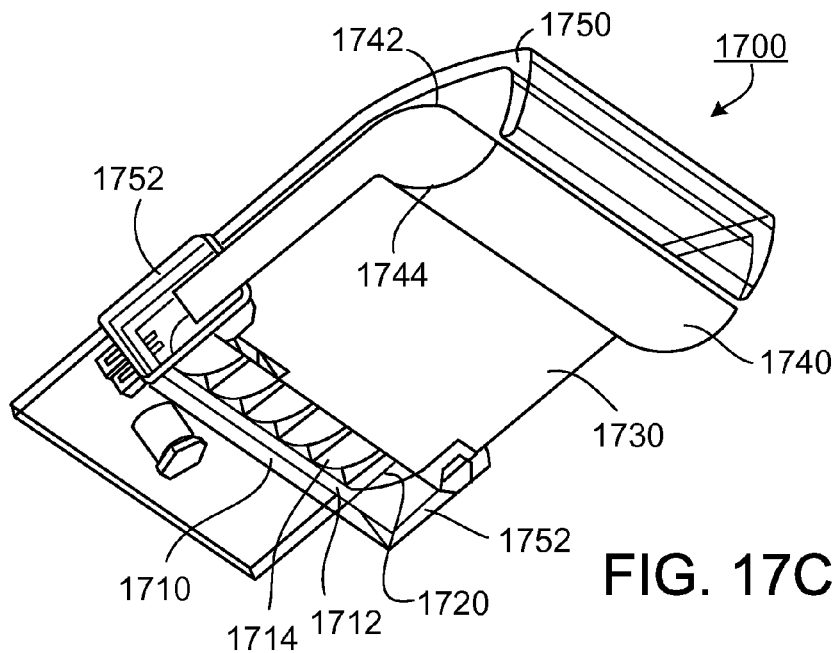

The foregoing embodiments described above with reference to FIGS. 13-16 involve luminaire modules that direct light to both sides of the light guide, either in a symmetric or asymmetric manner. Other configurations are also possible. For example, in some embodiments, luminaire modules can be configured to direct light to only one side of the light guide. For example, referring to FIGS. 17A-17C, a luminaire 1700 is designed to direct light in the positive x-direction, but not in the negative x-direction. Luminaire 1700 includes a carrier 1710 that houses six LEEs 1714 mounted on a strip 1712, and a corresponding optical collector 1720 mounted adjacent each LEE. Optical collectors 1720 are shaped to collimate light from LEEs 1714 in two orthogonal planes. Luminaire 1700 also includes a light guide 1730 and an optical extractor 1740. Optical extractor 1740 includes a reflective optical interface 1742 and a light-exit surface 1744. In cross-section, both reflective optical interface 1742 and light-exit surface 1744 are convex (as viewed in the direction of propagation of light) in shape. However, light-exit surface 1744 has a constant radius of curvature while the radius of curvature of interface 1742 varies. During operation, optical collectors 1720 collimate light from LEEs 1714 and direct the light to light guide 1730. The light propagates down light guide 1730 to optical extractor 1740, and reflects from optical interface 1742 about out of the luminaire through light-exit surface 1744. FIGS. 17B and 17C also show a mounting fixture 1750 and attachment brackets 1752 which attach luminaire 1700 to fixture 1750.

Figure 18:
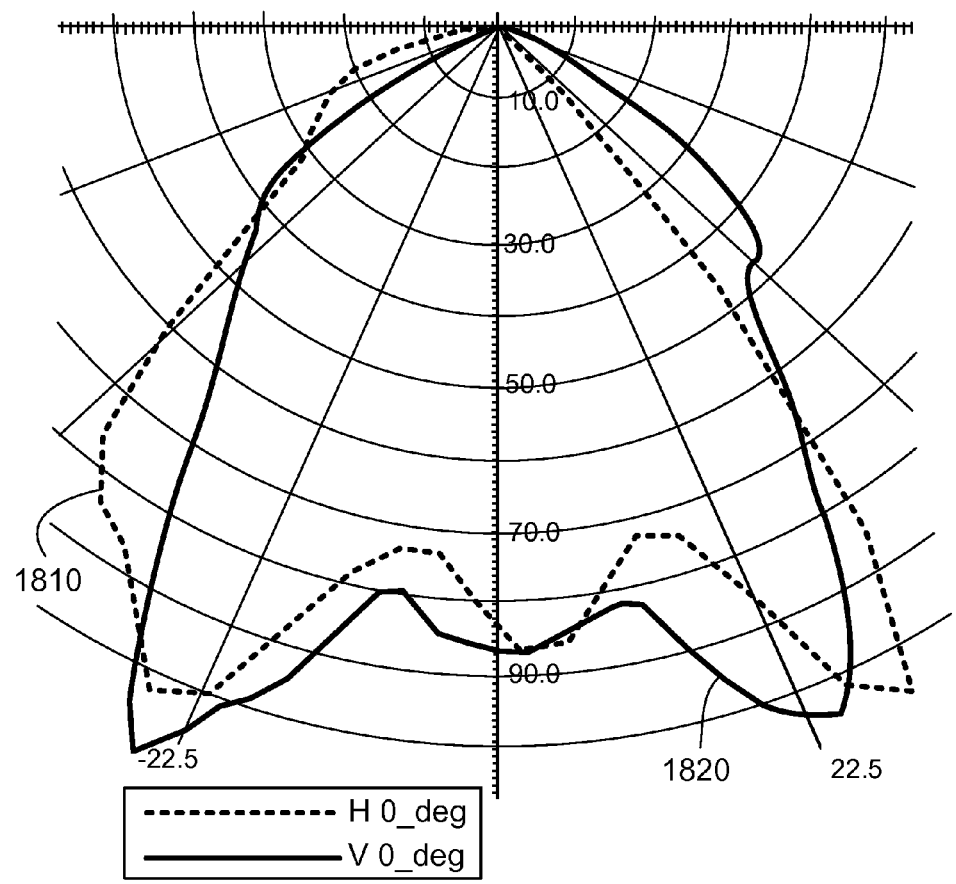
FIG. 18 is an intensity profile of an embodiment of a task luminaire.

Luminaire modules that direct light to only one side of the light guide (e.g., luminaire module 1700) are suitable for applications such as task lighting, cabinet lighting, wall wash or other lighting, where they are used to illuminate a work surfaces such as a table, a desk, countertops, walls or other target surfaces. They can be configured to uniformly illuminate an area of the work surface, while also illuminating a backsplash to the work surface. FIG. 18 shows a simulated intensity distribution for an exemplary embodiment of luminaire module 1700. In this plot, 0° corresponds to the positive x-direction. Trace 1810 corresponds to intensity profile in the x-z plane and trace 1820 corresponds to the intensity profile in the x-y plane. In both planes, substantially all of the light is directed into angles between −45° and 45°, with peak flux at approximately −22.5° and 22.5°. In the x-z plane, the intensity profile is asymmetric, the luminaire providing significant flux at larger negative angles (i.e., out to about −45°), while the flux drops off significantly more at corresponding positive angles. Accordingly, such a luminaire module can efficiently illuminate a backsplash without directing corresponding amounts of light off the front of the work surface.

FIGS. 19A-19C show plots of the simulated intensity distribution from an installation composed of two luminaire modules on a 1200 mm×600 mm work surface. The X-axis shows the long dimension of the work surface and the Y-axis shows the short dimension. FIG. 19A shows a contour plot of the illuminance across the work surface, FIG. 19B shows a plot of illuminance (in lux) vs. Y position (in mm) at X=0 mm, and FIG. 19C shows a plot of illuminance (in lux) vs. X position (in mm). Illuminance varies between about 300 lux and 600 lux in the Y-direction and between about 400 lux and about 500 lux for the central 1,000 mm of the work surface in the X-direction, falling off nearer to the edges.

FIGS. 20A-20C show plots of the simulated intensity distribution from the same installation as depicted in FIGS. 19A-19C on a 2,000 mm×400 mm back surface. The X-axis shows the long dimension of the back surface and the Y-axis shows the short dimension. FIG. 20A shows a contour plot of the illuminance across the work surface, FIG. 20B shows a plot of illuminance (in lux) vs. Y position (in mm) at X=0 mm, and FIG. 20C shows a plot of illuminance (in lux) vs. X position (in mm). Illuminance varies between about 150 lux and 250 lux in the Y-direction up to the top 100 mm of the back surface, where it falls off, and between about 150 lux and about 250 lux for the central 1,000 mm of the back surface in the X-direction, falling off nearer to the edges.

Figure 21A:
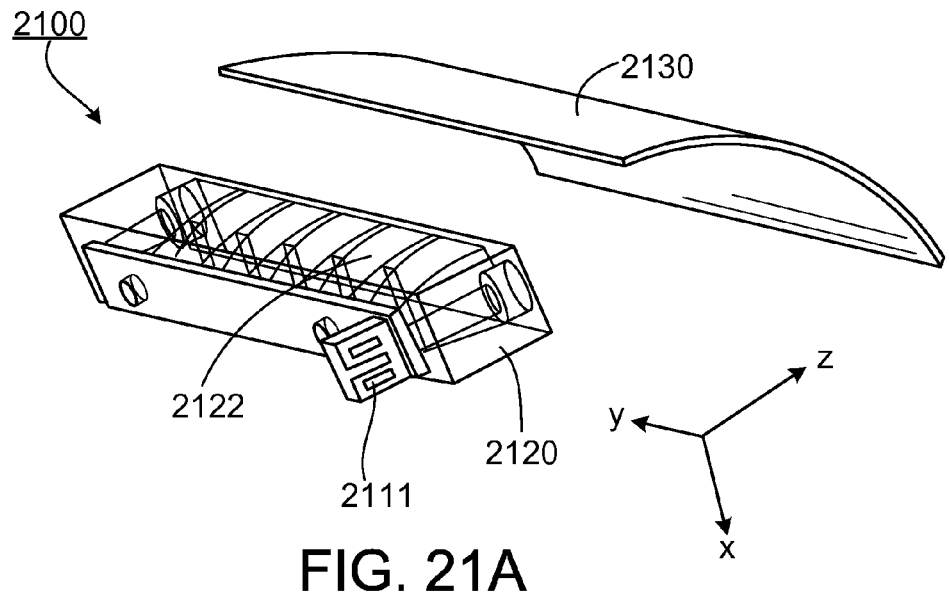
FIGS. 21A and 21B are views of another embodiment of a task luminaire.
Figure 21B:
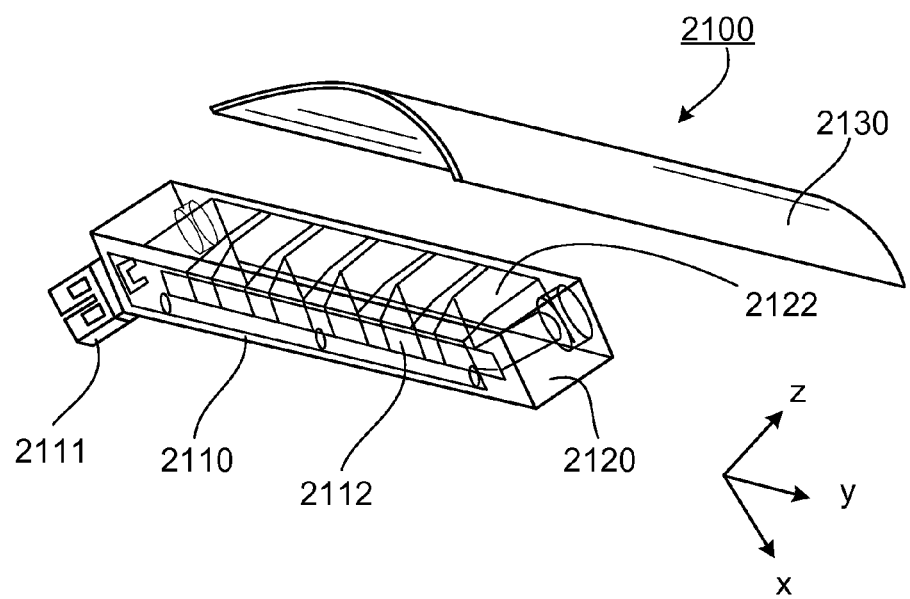

In some embodiments, certain components of the luminaires described previously can be omitted from the design. For example, certain embodiments need not include a light guide to guide light from the optical collector to the optical extractor. Where the collimation of the collectors is sufficient, they may be sufficient to direct the light to the optical extractor without the need to confine the light to a light guide. Moreover, such embodiments need not include a transparent optical element for the optical extractor, and instead can be composed of one or more reflective surfaces. For example, FIGS. 21A and 21B show an embodiment of a luminaire 2100 similar to luminaire 1700 that includes a curved mirror 2130 spaced apart from collectors 2120, rather than a light guide and solid optical extractor. Luminaire 2100 also includes a strip 2110 supporting six LEEs 2112 and electrical connector 2111. Each collector is positioned adjacent a corresponding LEE and collimates light emitted from the LEE directing the light towards mirror 2130. The collectors are designed to collimate light in two orthogonal planes. Mirror 2130 has a concave surface shaped to redirect the light from the collectors to illuminate a work surface.

Figure 22:
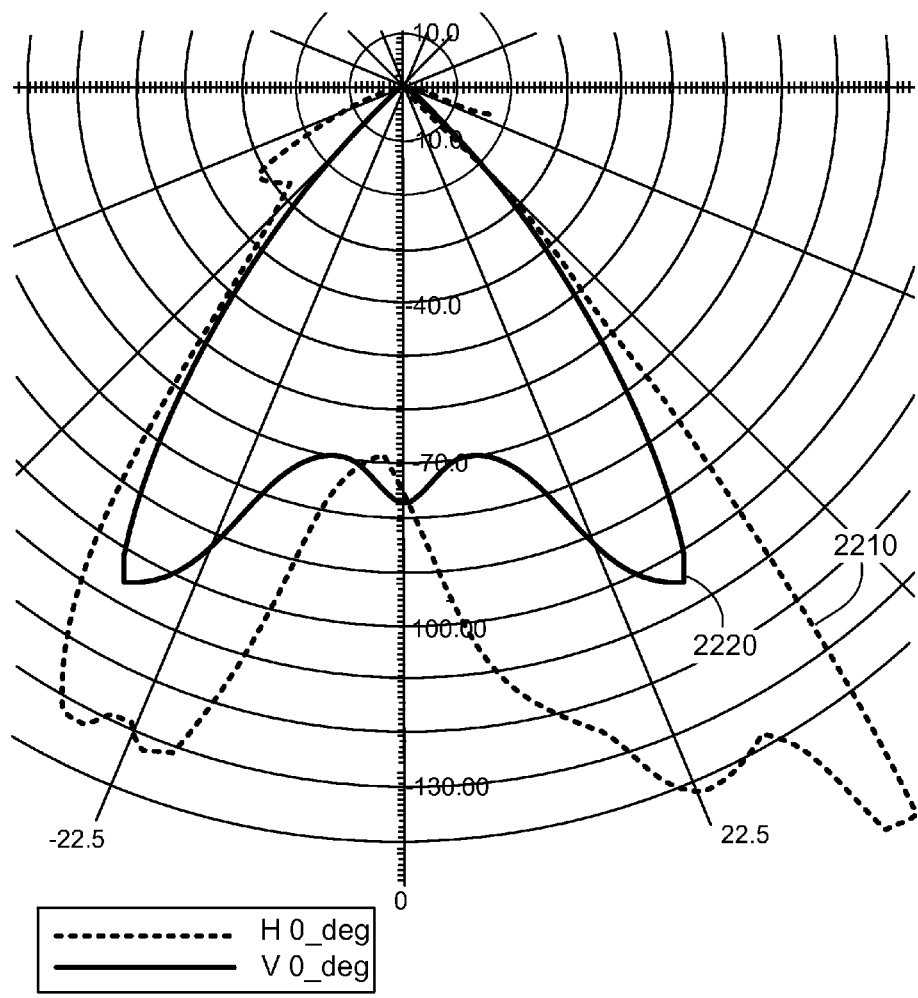
FIG. 22 is an intensity profile associated with the other embodiment of the task luminaire.

FIG. 22 shows a simulated intensity distribution for an exemplary embodiment of luminaire 2100. In this plot, 0° corresponds to the positive x-direction. Trace 2210 corresponds to the intensity profile in the x-z plane and trace 2220 corresponds to the intensity profile in the x-y plane. In both planes, substantially all of the illumination is directed into angles between −45° and 45°, with peak flux at approximately −22.5° and 22.5° in the x-y plane and at about 35° in the x-z plane. In the x-z plane, the intensity profile is asymmetric, the luminaire providing higher flux at positive angles.

FIGS. 23A-23C show plots of the simulated intensity distribution from an installation composed of two luminaires on a 2,000 mm×600 mm work surface. The X-axis shows the long dimension of the work surface and the Y-axis shows the short dimension. FIG. 23A shows a contour plot of the illuminance across the work surface, FIG. 23B shows a plot of illuminance (in lux) vs. Y position (in mm) at X=0 mm, and FIG. 23C shows a plot of illuminance (in lux) vs. X position (in mm). Illuminance varies between about 300 lux and 600 lux in the Y-direction and between about 300 lux and about 600 lux for the central 1,200 mm of the work surface in the X-direction, falling off nearer to the edges.

FIGS. 24A-24C show plots of the simulated intensity distribution from the same installation as depicted in FIGS. 23A-23C on a 2,000 mm×400 mm back surface. The X-axis shows the long dimension of the back surface and the Y-axis shows the short dimension. FIG. 24A shows a contour plot of the illuminance across the work surface, FIG. 24B shows a plot of illuminance (in lux) vs. Y position (in mm) at X=0 mm, and FIG. 24C shows a plot of illuminance (in lux) vs. X position (in mm). Illuminance varies between about 150 lux and 300 lux in the Y-direction up to the top 100 mm of the back surface, where it falls off, and between about 50 lux and about 150 lux for the central 1,200 mm of the back surface in the X-direction, falling off nearer to the edges.

Figure 25:
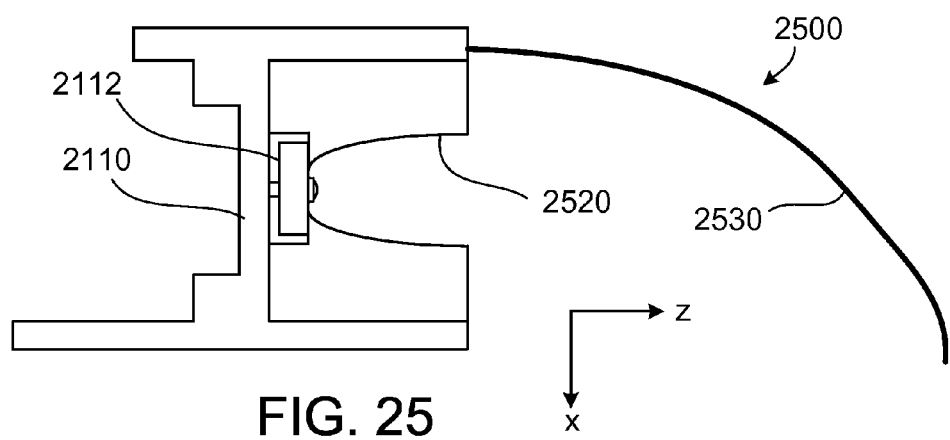
FIG. 25 is a view of a hollow embodiment of a task luminaire.

FIG. 25 shows another example of a task light luminaire 2500. Luminaire 2500 includes substrate 2110, LEEs 2112, optical collector 2520 and reflector 2530. In contrast to the optical collectors in luminaire 2100, which provide collimation in two directions, optical collector 2520 provides collimation only in the x-z plane.

FIGS. 27A-27C show plots of the simulated intensity distribution from an installation composed of two luminaires on a 2,000 mm×600 mm work surface. The X-axis shows the long dimension of the work surface and the Y-axis shows the short dimension. FIG. 27A shows a contour plot of the illuminance across the work surface, FIG. 27B shows a plot of illuminance (in lux) vs. Y position (in mm) at X=0 mm, and FIG. 27C shows a plot of illuminance (in lux) vs. X position (in mm). Illuminance varies between about 400 lux and 600 lux in the Y-direction (except close to one edge, where it falls off) and between about 300 lux and about 500 lux for the central 1,000 mm of the work surface in the X-direction, falling off nearer to the edges.

FIGS. 27D-27F show plots of the simulated intensity distribution from the same installation as depicted in FIGS. 27A-27C on a 2,000 mm×400 mm back surface. The X-axis shows the long dimension of the back surface and the Y-axis shows the short dimension. FIG. 27D shows a contour plot of the illuminance across the work surface, FIG. 27E shows a plot of illuminance (in lux) vs. Y position (in mm) at X=0 mm, and FIG. 27F shows a plot of illuminance (in lux) vs. X position (in mm). Illuminance varies between about 200 lux and 350 lux in the Y-direction up to the top 100 mm of the back surface, where it falls off, and between about 100 lux and about 250 lux for the central 1,000 mm of the back surface in the X-direction, falling off nearer to the edges.

Figure 26:
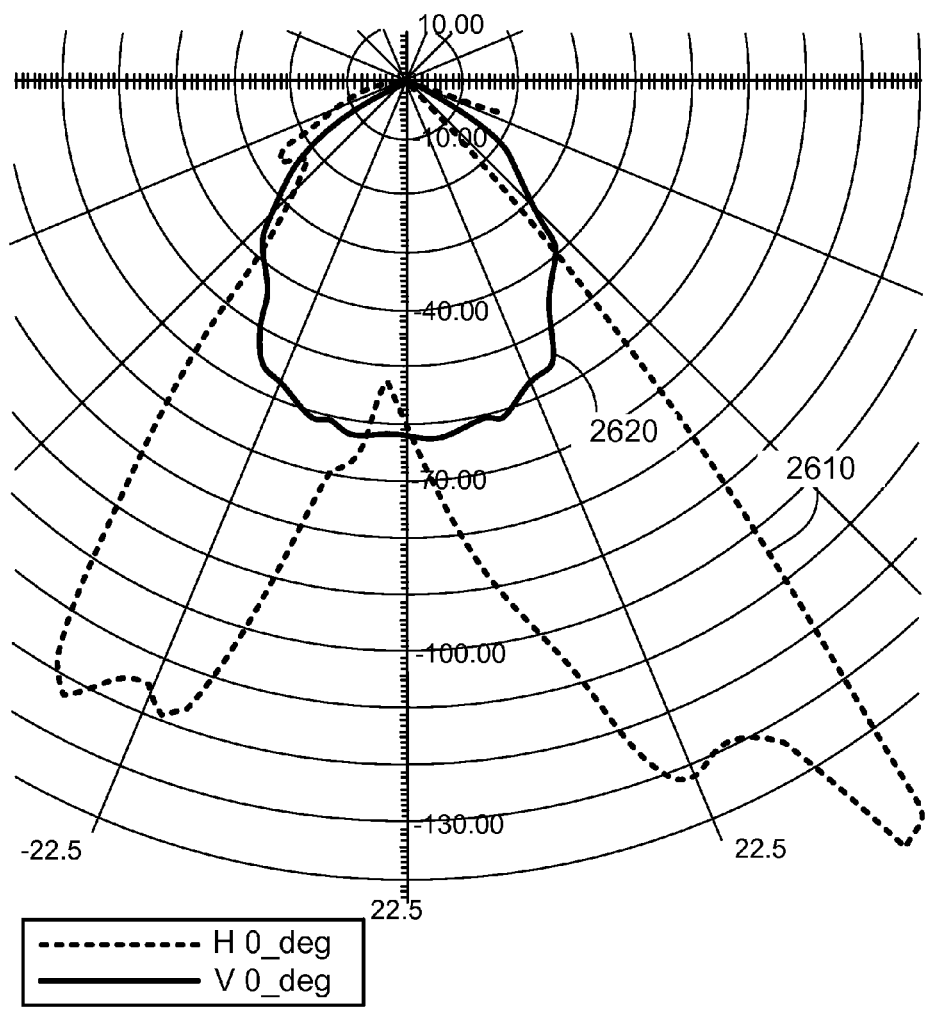
FIG. 26 is an intensity profile of the hollow embodiment of the task luminaire.

FIG. 26 shows a simulated intensity distribution for an exemplary embodiment of luminaire 2500. In this plot, 0° corresponds to the positive x-direction. Trace 2610 corresponds to the intensity profile in the x-z plane and trace 2620 corresponds to the intensity profile in the x-y plane. In both planes, substantially all of the illumination is directed into angles between −45° and 45°, although in the x-y plane the intensity distribution is approximately lambertian, composed of a single lobe with peak flux at 0°. In the x-z plane, the distribution has two distinct lobes, with peak flux at approximately −22.5° and about 35°. In the x-z plane, the intensity profile is asymmetric, the luminaire providing higher flux at positive angles.

Figure 28:
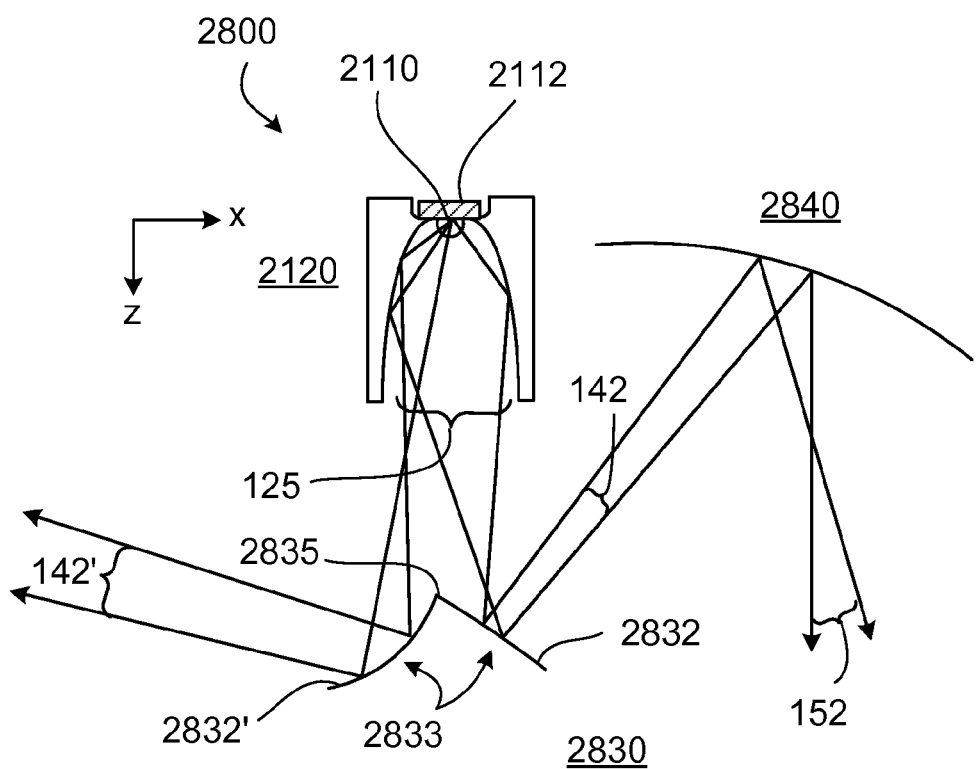
FIG. 28 is a view of a hollow embodiment of a luminaire used to provide direct and indirect components of a light intensity distribution.

FIG. 28 shows another example of a luminaire 2800 that features hollow components that are elongated along the y-axis. The luminaire 2800 is configured to provide asymmetric illumination in cross-section x-z and includes a substrate 2110, a plurality of LEEs 2112, one or more primary optics 2120, a secondary optic 2830 and a tertiary optic 2840.

The substrate 2110 has first and second opposing surfaces, such that each of the first and second surfaces are elongated and have a longitudinal dimension (along the y-axis) and a transverse dimension (along the x-axis) shorter than the longitudinal dimension. The LEEs 2112 are arranged on the first surface of the substrate 2110 and are distributed along the longitudinal dimension, such that the LEEs emit, during operation, light in a first angular range with respect to a normal to the first surface of the substrate 2110. For example, a divergence of the first angular can be between 150-180 sr.

The one or more primary optics 2120 are arranged in an elongated configuration along the longitudinal dimension of the first surface and are coupled with the LEEs 2112. The one or more primary optics 2120 are shaped to redirect light received from the LEEs 2112 in the first angular range, and to provide the redirected light in a second angular range 125. A divergence of the second angular range 125 is smaller than the divergence of the first angular range at least in a plane x-z perpendicular to the longitudinal dimension of the first surface of the substrate 2110. In some implementations, the one or more primary optics 2120 can be configured as one or more solid primary optics. Examples of hollow and solid primary optics 2120 (couplers) are described in detail below in connection with FIGS. 34-36.

The secondary optic 2830 includes a redirecting surface 2833 elongated along the longitudinal dimension. The redirecting surface of the secondary optic 2833 is spaced apart from and facing the one or more of the primary optics 2120. First and second portions of the redirecting surface 2832, 2832' reflect light received from the one or more primary optics 2120 in the second angular range 125, and provide the reflected light in third and fourth angular ranges 142, 142' with respect to the normal to the first surface of the substrate 2110, respectively. At least prevalent directions of the third and fourth angular ranges 142, 142' are different from each other and from a prevalent direction of propagation of light of the second angular range 125 at least perpendicular to the longitudinal dimension of the first surface of the substrate 2110.

A tertiary optic includes a reflector 2840 elongated along the longitudinal dimension. The reflector 2840 is spaced apart from and facing the first portion of the redirecting surface of the secondary optic 2832. In addition, the reflector 2840 is shaped to reflect at least some of the light provided by the first portion of the redirecting surface of the secondary optic 2832 in the third angular range 142 with respect to the normal of the first surface of the substrate 2110 as first reflected light in a fifth angular range 152 with respect to the normal to the first surface of the substrate 2110. The fifth angular range 152 is different than the third angular range 142. In some implementations, the reflector 2840 can be thermally coupled with the substrate 2910 to extract heat produced by the LEEs 2112 during operation.

A first portion of an intensity distribution output by the luminaire 2800 during operation includes at least some of the first reflected light 152. A second portion of the intensity distribution output by the luminaire 2800 during operation includes at least some of the light provided by the second portion of the redirecting surface of the secondary optic 2832' within the fourth angular range 142'.

Optical surfaces and/or interfaces of the secondary optic 2830 and/or the reflector 2840 of the tertiary optics can include one or more parabolic, hyperbolic, spherical, aspherical, facetted, segmented, polygonal, or otherwise shaped portions, as described above in connection with FIGS. 2A-2G, for example.

Figure 29A:
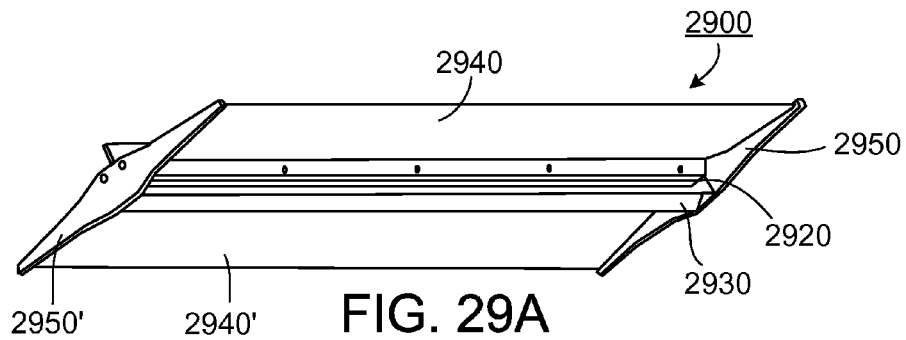
FIGS. 29A-29C are views of another hollow embodiment of a luminaire used to provide direct and indirect components of a light intensity distribution.
Figure 29B:
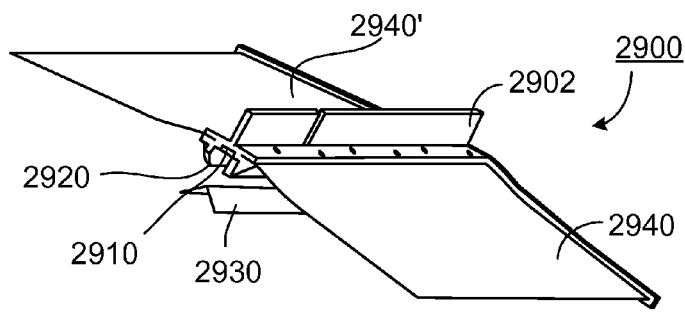
Figure 29C:
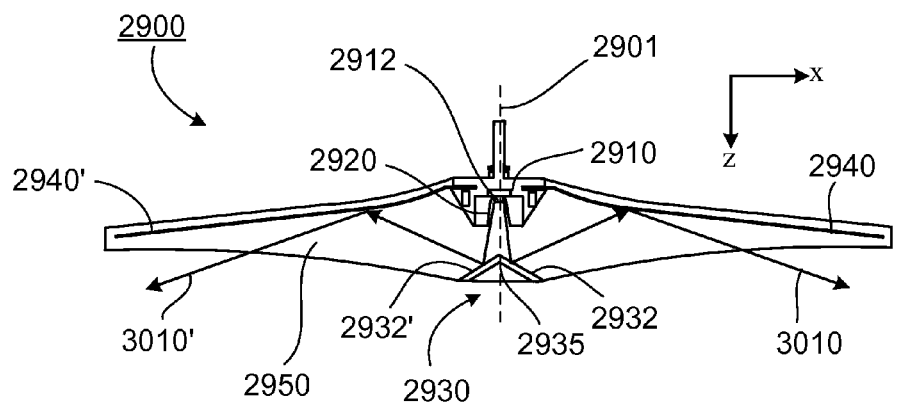

While the foregoing embodiments of luminaires featuring hollow portions are designed to provide asymmetric illumination in cross-section, other configurations are also possible. For example, referring to FIGS. 29A-29C, a hollow luminaire 2900 is designed to provide a symmetric intensity profile in cross-section. Luminaire 2900 is elongated along the y-axis and includes a housing 2902 that includes a substrate 2910 with a plurality of LEEs 2912 and a collector 2920.

The LEEs emit light, during operation, in a first angular range with respect to a normal to the substrate 2910 (along the z-axis). Collector 2920 includes one or more hollow primary optics that include curved surfaces extending along strip 2910. The collector 2920 is shaped to redirect light received from the LEEs 2912 in the first angular range, and to provide the redirected light in a second angular range, such that a divergence of the second angular range is smaller than a divergence of the first angular range at least in a plane x-z perpendicular to the longitudinal dimension of the luminaire 2900.

A secondary optic including a reflector 2930 is positioned in the path of light emitted from the LEEs 2912 and redirected by collector 2920 in the second angular range. The reflector 2930 of the primary optic includes two planar reflective surfaces 2932, 2932' arranged in a v-shape. In cross-section, luminaire 2900 has a symmetry plane z-y 2901, which intersects the reflector 2930 at the vertex 2935 of the v-shape formed by the reflective surfaces 2932, 2932'. The redirecting surfaces 2932, 2932' reflect light received from the collector 2920 in the second angular range, and provide the reflected light in third and fourth angular ranges with respect to the z-axis, respectively. At least prevalent directions of the third and fourth angular ranges are different from each other and from a prevalent direction of propagation of light of the second angular range, at least perpendicular to the longitudinal dimension of the luminaire 2900.

Luminaire 2900 also includes tertiary optics including reflectors 2940, 2940' positioned to receive light reflected from redirecting surfaces 2932, 2932', respectively, and redirect the light to the target surface. In cross-section, the reflectors 2940, 2940' can be convex in shape. The first reflector 2940 of the tertiary optics redirects light received from the first redirecting surface 2932 in the third angular range as first reflected light in a fifth angular range 3010 with respect to the z-axis, such that the fifth angular range 3010 is different than the third angular range. In this manner, a direct component of an intensity distribution output by the illumination device during operation includes at least some of the first reflected light 3010. The second reflector 2940' of the tertiary optics redirects light received from the second redirecting surface

2932' in the fourth angular range as second reflected light in a sixth angular range 3010' with respect to the z-axis, such that the sixth angular range 3010' is different than the fourth angular range. In this manner, the direct component of the intensity distribution output by the illumination device during operation includes at least some of the second reflected light 3010'.

Figure 30:
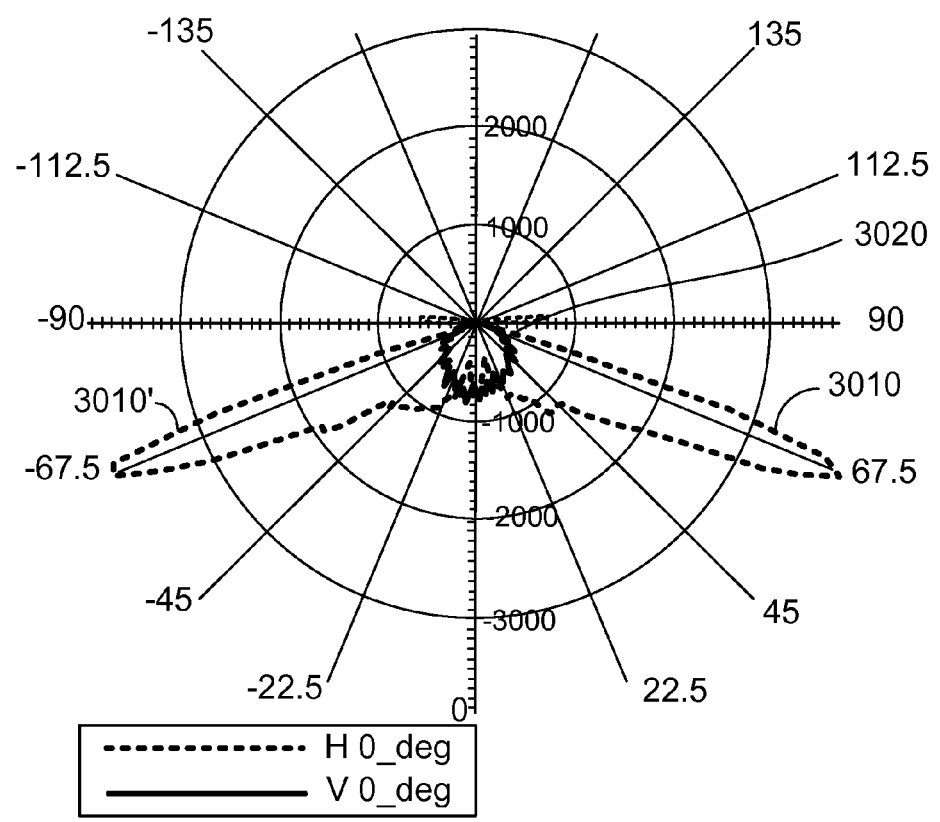
FIG. 30 is an intensity profile of the other hollow embodiment of a luminaire.

In general, the intensity distribution provided by luminaire 2900 depends, inter alia, on the geometry of collector 2920, the geometry of reflector 2930 of the secondary optic (e.g., shape and relative orientation of the redirecting surfaces 2932, 2932') and tertiary reflectors 2940, 2940' and a distance D between the collector 2920 and the secondary optic 2930. These parameters can be tailored to provide an intensity distribution suitable for the luminaire's intended purpose. For example, the angular width of lobes in the intensity distribution in cross-section depends on the degree of collimation provided by collectors 2920 and the amount by which reflectors 2932, 2932' and 2940, 2940' introduce divergence or convergence to the light. The directions of lobes in the intensity distribution also depend on the relative orientation of the reflective surfaces. FIG. 30 shows a simulated intensity distribution for an exemplary embodiment of luminaire 2900. In this plot, 0° corresponds to the positive z-direction. Traces 3010, 3010' corresponds to the intensity profile in the x-z plane, and trace 3020 corresponds to the intensity profile in the x-y plane. In the x-y plane the intensity distribution is approximately lambertian, composed of a single lobe with peak flux at 0°. In the x-z plane, the distribution has two distinct narrow lobes 3010, 3010', with peak flux at approximately −67.5° and about 67.5°, corresponding to the fifth and sixth angular ranges, respectively. In the x-z plane, relatively little light is directed into the polar angle range from −45° to 45°, and almost no light is directed into angles greater −70° or +70°.

In some implementations, the reflector 2930 of the secondary optic can be attached to the other components of the luminaire via mounting elements 2950, 2950' coupled at each end of the luminaire. Mounting elements 2950, 2950' can secure and position the reflector 2930 of the secondary optic and the reflectors 2940, 2940' of the tertiary optics at a predefined distance, D, from the LEEs 2912 and the collectors 2920. The optical components of luminaire 2900 can be produced from a variety of materials. For example, the components can be produced from a metal, such as aluminum, or from a plastic coated with a reflective material.

FIGS. 31A-31C show plots of the simulated intensity distribution from an installation composed of six luminaires 2900 arranged in a 2×3 grid in spacing of 30' in x and 20' in y direction in a 18,000 mm×18,000 mm target surface. The luminaires are suspended 300 mm from the ceiling, which is 3,000 mm high. Such a configuration may be useful for application in a garage lighting application, where driving traffic occurs in y direction with 2 driving lanes and 4 parking rows). The X-axis shows one dimension of the target surface and the Y-axis shows the other. FIG. 31A shows a contour plot of the illuminance across the work surface, FIG. 31B shows a plot of illuminance (in lux) vs. Y position (in mm) at X=0 mm, and FIG. 31C shows a plot of illuminance (in lux) vs. X position (in mm). Illuminance varies between about 25 lux and about 75 lux in the Y-direction and between about 70 lux and about 150 lux in the X-direction.

FIGS. 32A-32C show plots of the simulated intensity distribution from the same installation as depicted in FIGS. 31A-31C on a wall along the Y direction of FIG. 31A. In FIG. 32A, the X-axis shows the horizontal dimension of the section and the Y-axis shows the vertical dimension. Dark regions in the intensity distribution are caused by structural elements of the building. FIG. 32A shows a contour plot of the illuminance across the section, FIG. 32B shows a plot of illuminance (in lux) vs. Y position (in mm) at X=0 mm, and FIG. 32C shows a plot of illuminance (in lux) vs. X position (in mm). Illuminance varies between about 50 lux and 250 lux in the vertical direction from the target surface up to the about midway through the section, where it falls off, and between about 100 lux and about 175 lux for the central 17,000 mm of the section in the horizontal direction, falling off nearer to the edges.

FIGS. 33A-33C show plots of the simulated intensity distribution from the same installation as depicted in FIGS. 31A-31C on a wall along the X direction of FIG. 31A. In FIG. 33A, the X-axis shows the horizontal dimension of the section and the Y-axis shows the vertical dimension. A certain amount of light provided on the walls can aid in facial recognition, which may provide better comfort and security to parking garage users. FIG. 33A shows a contour plot of the illuminance across the section, FIG. 33B shows a plot of illuminance (in lux) vs. Y position (in mm) at X=0 mm, and FIG. 33C shows a plot of illuminance (in lux) vs. X position (in mm). Illuminance varies between about 50 lux and 250 lux in the vertical direction from the target surface up to the about midway through the section, where it falls off, and between about 25 lux and about 125 lux for the central 17,000 mm of the section in the horizontal direction, falling off nearer to the edges.

Structure of LEE Strips

Figure 34A:
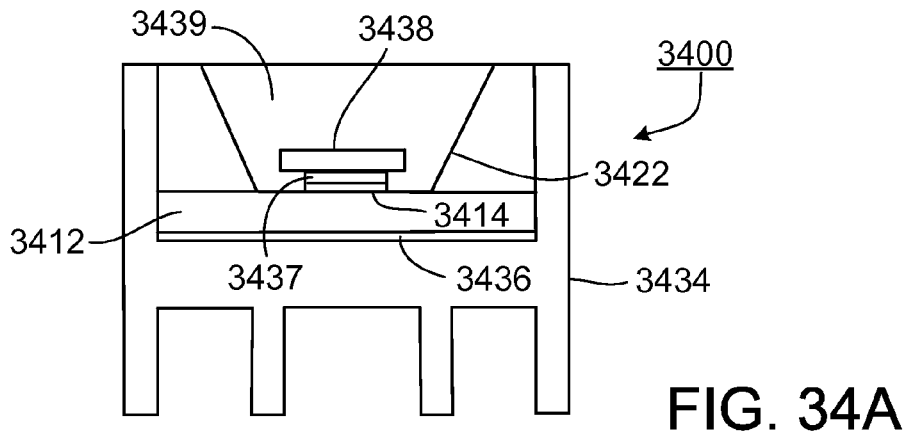
FIGS. 34A-34C are views of embodiments of LEE strips for a luminaire.
Figure 34B:
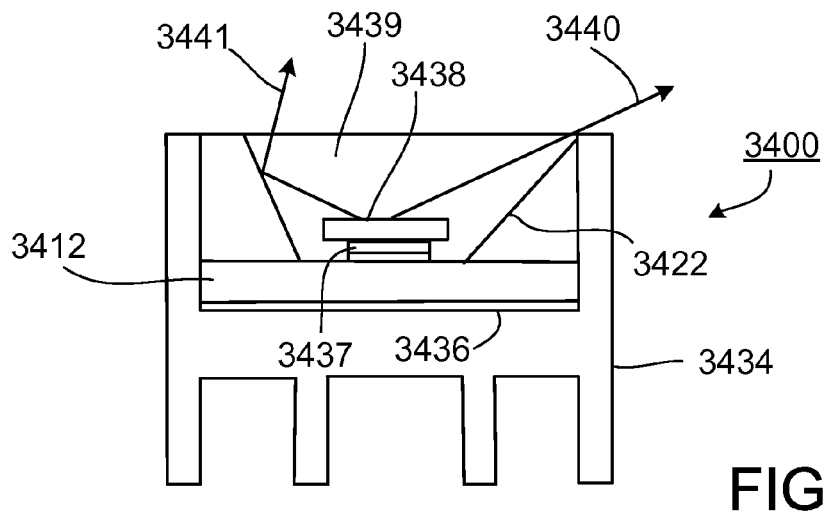
Figure 34C:
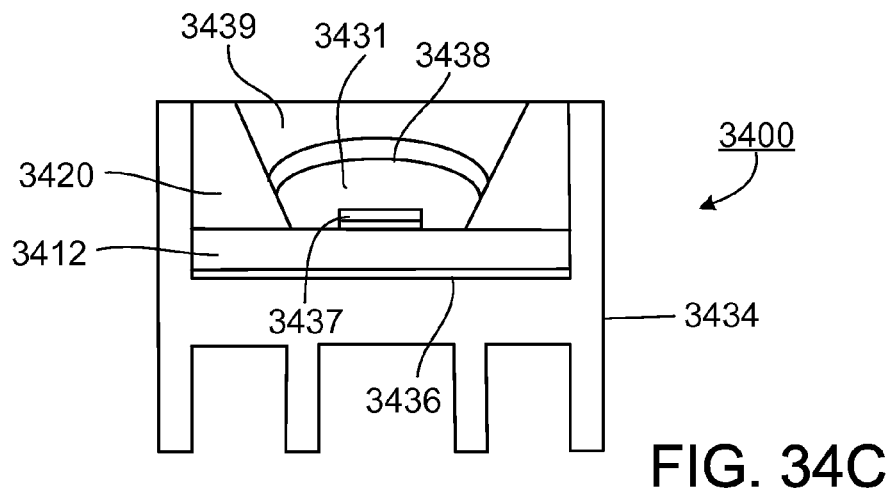

Each of the embodiments described above includes a strip of LEEs. FIGS. 34A, 34B and 34C illustrate in cross section examples of LEE strips 3400 that include an extruded aluminum carrier 3434, having extended cooling surfaces, which forms a support structure for the LEE strip 3400. A thermal adhesive layer 3436 is applied to the carrier 3434, and the substrate 3412 (having the LEE chips 3437 mounted thereon) is adhered to the layer 3436. The phosphor layer 3438 may be disposed in form of plates, sheets, from a slurry or otherwise, which may be flat or curved, are affixed over the top surfaces of the LEE chips 3437 by an adhesive, such as silicone. A strip of the optical coupler sheet 3420 is then affixed over the LEE chips 3437. Assuming the optical couplers 3422 are hollow, the openings 3431, 3439 in the optical couplers are then filled with a high index silicone 3439 or other encapsulant. The phosphor layer 3438 can be formed from a variety of phosphor sheets and can have varying characteristics along its length to achieve a desired uniform chromaticity and color-rendering index (CRI) along the strip 3432. As such the local characteristics of a phosphor layer 3438 proximate each LEE chip 3437 can be matched to the characteristics of each LEE chip 3437.

As discussed previously, a light conversion material can be incorporated into a luminaire. In some embodiments, a light conversion material, in the form of a phosphor layer, is incorporated into the LEE strip. For example, in FIG. 34B, a flat (not illustrated) or curved phosphor layer 3438 is separated from the LEE chip 3437 by a space 3431. The spaced apart disposition can reduce the thermal load on the phosphor layer 3438. The space 3431 may be partially (not illustrated) or fully filled with an encapsulant, for example, silicone may be disposed in the space 3431 proximate the LEE chip 3437 leaving a gap (not illustrated) between the silicone and the phosphor layer 3438. The gap can be filled with air or other low refractive-index medium to control back reflection of light from the phosphor layer. The phosphor layer 3438 may be formed by depositing a preformed layer or by curing one or more predisposed precursor substances from which the phosphor layer 3438 is then cured. As such phosphor may be uniformly or non-uniformly deposited along the length of the LEE strip 3432. Furthermore, the phosphor layer 3438 and the previously noted encapsulant may be integrally formed. The phosphor may include Ce:YAG, TAG, nitride-based phosphors or other substances as noted herein to achieve predetermined CCTs from 2800K-5000K, for example.

In some embodiments, the optical couplers 3422 are dielectric compound parabolic concentrators. Each optical coupler 3422 is disposed and configured to collect substantially all of the light from one or more of the LEEs in the LEE strip 3432 and narrows the solid angle of the propagation directions of light as it passes there through. As such light exiting the exit aperture of an optical coupler diverges into a smaller solid angle than light received at an entrance aperture of the optical coupler. The opening angle of the exit beams produced by the optical couplers 3422 may be as narrow as +/−30 degrees or less, for example. Sufficient collimation is desired to reduce non-absorptive losses of light in the light guide. It is noted that these and other considerations can further depend on the wavelengths of the light provided at the entrance aperture of the optical coupler as noted herein. Depending on the embodiment, an optical coupler may be about 2 mm wide and 3 mm tall if used with a 500 µm LED die, approximately 6 mm wide and 8 mm tall if used with small LED packages, or have other dimensions, for example.

FIG. 34B illustrates an optical coupler with an asymmetrical configuration that can redirect more light into one portion of space than in another with respect to corresponding optical axes and thereby provide light from the optical coupler having an asymmetrical intensity pattern. Depending on the configuration of other components of the luminaire, for example the length and cross sections of the light guide, an asymmetrical intensity pattern from an optical coupler may be partially or fully preserved, and may aid in providing a luminaire with predetermined photometric properties that may suit predetermined illumination applications. Asymmetric optical couplers may provide for tailoring of photometric output profiles for certain applications. It is noted that such asymmetry may be achieved via suitable asymmetric configuration of other components of the luminaire including the light pipe and/or the optical extractor, for example.

Figure 34D:
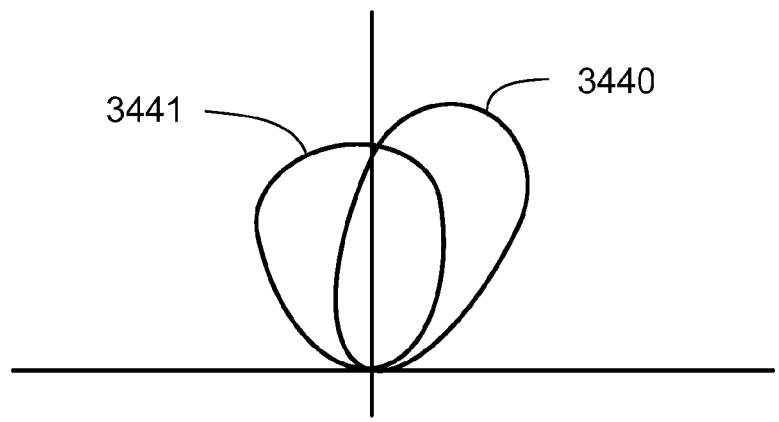
FIG. 34D is a light emission-pattern of LEE strips.

FIG. 34D shows an example asymmetric intensity profile 3440 at the exit of an optical coupler. An asymmetric beam distribution may be partially conserved by downstream (along the optical path) components of the optical system. Depending on the embodiment, light guides typically tend to equilibrate asymmetric beam distributions over certain optical path lengths but may at least partially conserve an asymmetric beam distribution if properly configured. This may be accomplished if the light guide is of sufficiently short length, for example. An asymmetric optical coupler may thus be utilized to generate an asymmetric intensity pattern, which may be employed in luminaires for asymmetric lighting applications, for example, for wall washing, track lighting or other applications. Furthermore, provided all other components of two luminaires are the same, asymmetrical optical couplers may cause light emission from the optical extractor that is broader than that from symmetrical optical couplers. As such asymmetric optical couplers may provide for tailoring of photometric output profiles for certain applications.

The submount for the LEEs may be off-perpendicular angle from the optical axis so that the normal axis of emission from the LEE is tilted from the nominal perpendicular direction in either of, or in combination, the altitudinal or azimuthal directions. The angle may be used to control the far-field emission from the optical couplers that translates into the intensity profile of the light emitted from an optical extractor.

The width of the completed LEE strip (or LEE line source), including the carrier 3434, may be up to one centimeter or more. In this example, the exit aperture of the optical coupler 3422 substantially matches the width of the edge of the light guide, also referred to as the entrance aperture of the light guide. Such a configuration may be effective when the optical coupler and the light guide are integrally formed, or their alignment can be accurately determined during manufacture or assembly, for example. In some embodiments, the exit aperture of the optical coupler 3422 is narrower than the entrance aperture of the light guide. Such a configuration may be effective when the optical coupler and the light guide are modularly formed and their alignment needs can be controlled via suitably accurate interconnect systems (not illustrated) to mitigate effects of misalignment.

Figure 35:
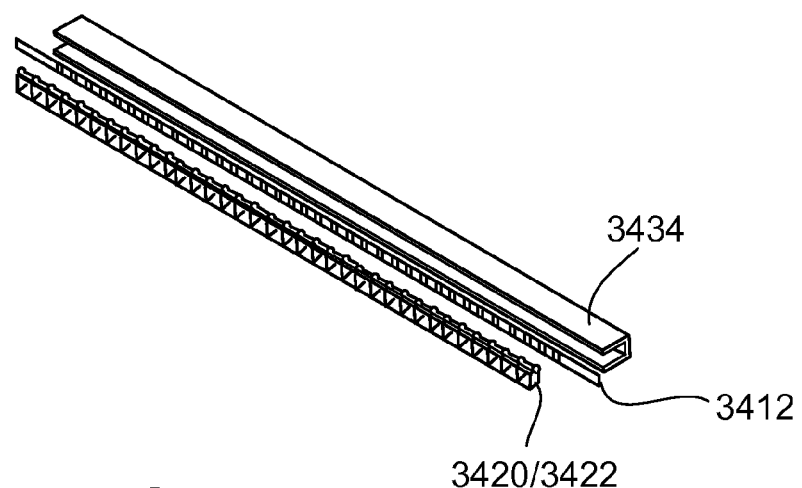
FIG. 35 is a view of another embodiment of a LEE strip.

FIG. 35 shows an exploded view of the aluminum heat sink 3434, the substrate 3412 having a plurality of LEEs thereon, and a plurality of optical couplers 3422 which may be integrally formed as an optical coupler sheet or row 3420.

Figure 36A:
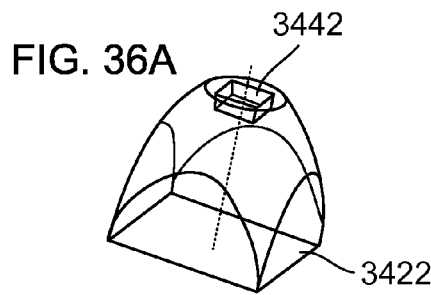
FIGS. 36A-36H show aspects of optical couplers of a luminaire.
Figure 36B:
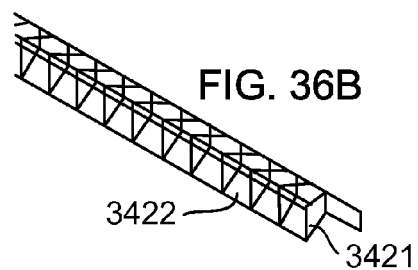
Figure 36C:
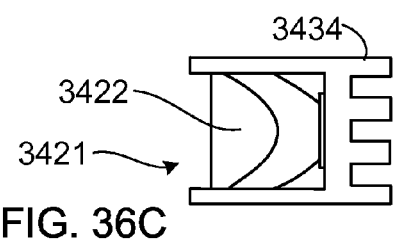
Figure 36D:
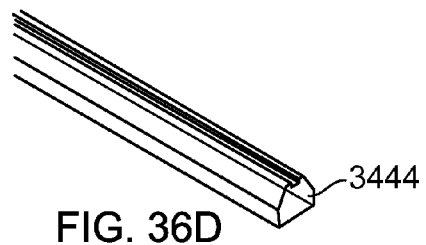

FIGS. 36A, 36B and 36D illustrate perspective views of example optical couplers. FIG. 36C illustrates a sectional view of an LEE strip 3434 including optical couplers 3422 of FIGS. 36A and 36B. In general, optical couplers may have other configurations, for example, an optical coupler may be configured as a truncated cone or pyramid. Example truncated pyramid optical couplers may have a square or other cross section perpendicular to an optical axis. An optical coupler may have a circular, quadratic or other cross section at a receiving end and transition into a rectangular, circular or other cross section at an opposite end. Depending on the embodiment, such or other variations in profile may occur more than once along the length of an optical coupler. As illustrated in FIG. 36A, the example optical couplers 3422 have a receiving opening 3442 within which the LEE chip 3437 or LEE package can be disposed. The receiving opening 3442 may be designed to maximize extraction efficiency out of the LEE chip 3437 or LEE package. The void between the LEE chip 3437 and the collimating optic may be filled with optical encapsulation material such as silicone to maximize light extraction efficiency.

FIG. 36B shows an example string 3421 of optical couplers 3422, also referred to as an elongate configuration of optical couplers 3422, for use in an LEE strip 3432. The string may be configured to provide collimation power in the direction of the LEE strip 3432 and perpendicular to it. Each of the optical couplers 3422 may have equal or different collimation and/or other optical properties in such directions. An optical coupler may have continuous or discrete rotational symmetry perpendicular to its optical axis, or it may have no rotational symmetry with respect to the optical axis. For example, different collimation properties in different directions can be result of at least portions of the optical coupler having a rectilinear non-quadratic cross section perpendicular to the optical axis. The optical couplers 3422 may have interlocking mechanisms (not illustrated) configured to attach adjacent optical couplers 3422 into the string 3421. Such mechanisms may be resiliently releasable, allow interconnection into one or more rows of parallel strings (not illustrated) or otherwise configured, for example. Optical couplers 3422 and/or a string thereof may be formed through injection molding as separate optical couplers or in groups of connected optical couplers (up to the length of the luminaire). Depending on the embodiment, adjacent optical couplers in a string of optical couplers 3422 may be optically coupled with, or decoupled from one another to maintain transmission of light at the abutting interfaces between them below, at or above a predetermined level. Such configuration may depend on whether the optical couplers have a cavity or solid bulk configuration and whether they rely on total internal reflection and/or mirrored surfaces. It is noted that an optical coupler as illustrated in FIG. 36A may also be used individually in a rotationally symmetrical luminaire, for example, examples of which are discussed below.

As discussed previously, the optical couplers in an LEE string may be optically isolated or coupled to provide predetermined collimation of light within one or more planes parallel to the optical axes of the optical couplers. In some embodiments, adjacent optical couplers are optically coupled via suitable configuration of abutting interfaces, disposition of suitable material between adjacent optical couplers, integral formation or otherwise optically coupled. Optical decoupling may be achieved via disposition with formation of suitably sized gaps between individual optical couplers, or disposition of suitable reflective material such as films, layers, coatings or interjecting substances between or on abutting interfaces of adjacent optical couplers. Optical couplers may be integrally formed into lines or other groups (not illustrated) of adjacent optical couplers. Depending on the embodiment, a luminaire may include equal or different numbers of optical couplers within different groups of optical couplers.

FIG. 36D shows a linear optical coupler 3444 configured to collimate substantially only in the direction perpendicular to the length of the LEE strip 3432. The optical coupler 3444 may be formed through extrusion to predetermined lengths.

Figure 36E:
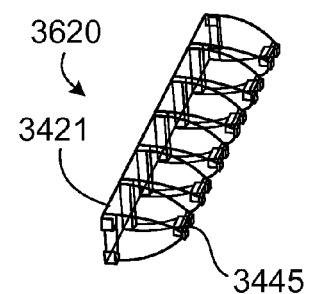

FIG. 36E shows an exemplary embodiment of an optical coupler 3620 that includes multiple primary optics 3421. The optical coupler 3620 can be used to achieve high collimation angles in a direction perpendicular to the elongation of the system of FWHM 20 deg or better in the solid material, while it may be advantageous to keep a design wider beam angle of over 20 deg in the opposing direction. In some implementations, a configuration of the primary optic 3620 can be tailored to provide batwing distribution in the direction of elongation of the system. In order to increase collimation in the direction perpendicular to the elongation of the system (e.g., to reduce divergence of the second angular range), a cylindrical lens 3445 can be included as part of the primary optics 3421 to add optical power at the entrance surface of primary optics 3421.

Figure 36F:
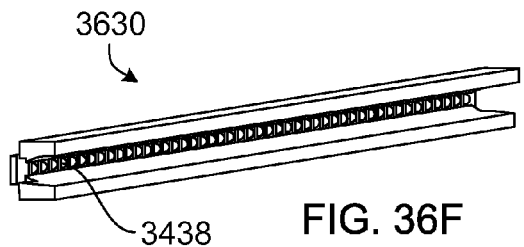

FIG. 36F shows a hollow embodiment of a primary optic 3630 (corresponding e.g. to primary optics 1520 2120, 2920) configured to collect the light emitted by the LEEs 3438 and provide collimation and beam shaping to illuminate a secondary reflector. In this embodiment, the primary optic 3630 has optical power perpendicular to the direction of a linear LED array 3438 only and provides beam shaping only in this direction.

Figure 36G:
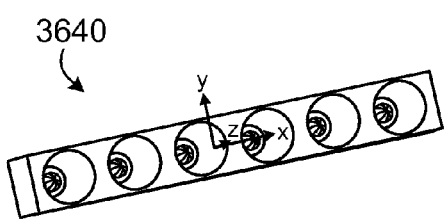
Figure 36H:
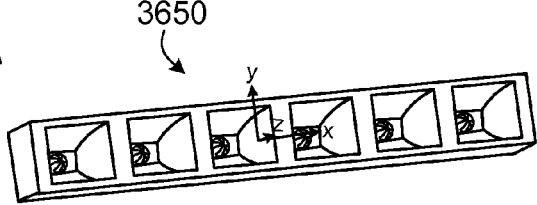

FIGS. 36G and 36H show other hollow embodiments of primary optics 3640 and 3650 (each of which can be used corresponding e.g. to primary optics 1520 2120, 2920) configured to have identical or different optical powers in the direction of the linear LEE array and perpendicular to it. In some implementations, the primary optic 3650 may have a rectangular cross section with dissimilar profile in the direction perpendicular and along the elongation of the hollow flux manifold. In one embodiment collimation of better than FWHM of 25 deg perpendicular to the elongation of the flux manifold may be desired while collimation in elongation of the hollow flux manifold on the order of FWHM 40 deg may be desired.

The hollow primary optics may optically communicate with each LEE individually (as in FIGS. 36G and 36H), or may optically communicate with all LEDs (as in FIG. 36F) or a group of LEEs.

The profile of the hollow primary optic 3630 perpendicular to the beam direction may be linear (as in FIG. 36F), a linear array of rotational symmetric profiles (as in FIG. 36G), a linear array of rectangular profiles (as in FIG. 36H) or an array of other suitable profile.

The hollow primary optic may be reflectively coated with the coating applied to the side facing the source or to the side facing away from the source. The surface shape in direction of the emission may be linear, segmented linear, parabolic, hyperbolic, or any freeform shape suitable to the application.

A perpendicular profile of a solid or hollow primary optic may be a two dimensional array of rectangular, triangular, rotational symmetric or other shape including individual rotational symmetric, rectangular, triangular or other profiles. The primary optic may be formed individually, in groups of six elements, for example, or may be formed integrally for the entire hollow flux manifold.

Rotationally Symmetric Luminaires

The foregoing embodiments of luminaires are all extended along a longitudinal luminaire direction. However, other embodiments are also possible. For example, many of the design principles described above can be applied to luminaires that are rotationally symmetric about the z-axis. FIGS. 37-40 each illustrate example luminaires that display this symmetry. Each example luminaire includes an optical coupler 3477, a light guide 3478 and an optical extractor 3480, which are integrally formed into a solid body that can reflect light via TIR. The integral formation is achieved by injection molding. Each example luminaire also includes a LEE module 3476 and a secondary reflector. The light guide 3478 may also be referred to as a light pipe.

Figure 37:
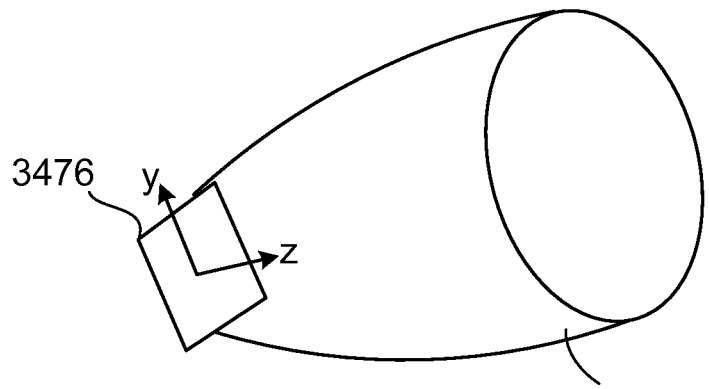
FIG. 37 is a view of an embodiment of an LEE and optical coupler.

FIG. 37 illustrates a perspective view of the LEE module 3476 optically coupled to the optical coupler 3477 to receive light from one or more LEEs included in the LEE module 3476. The LEE module 3476 includes one or more LEEs (e.g., LED chips) mounted on a substrate (submount). The LEEs are configured to emit light in a first angular range with respect to a normal to the substrate, e.g., the z-axis.

Figure 38A:
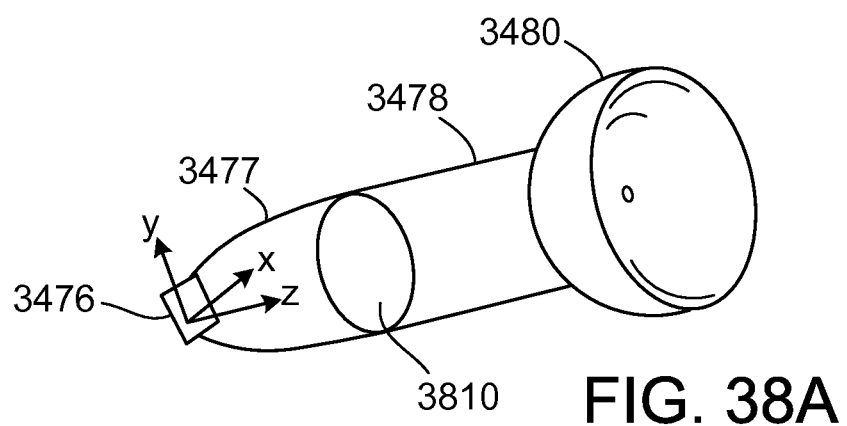
FIGS. 38A-38B are views of an embodiment of a luminaire with rotational symmetry.
Figure 38B:
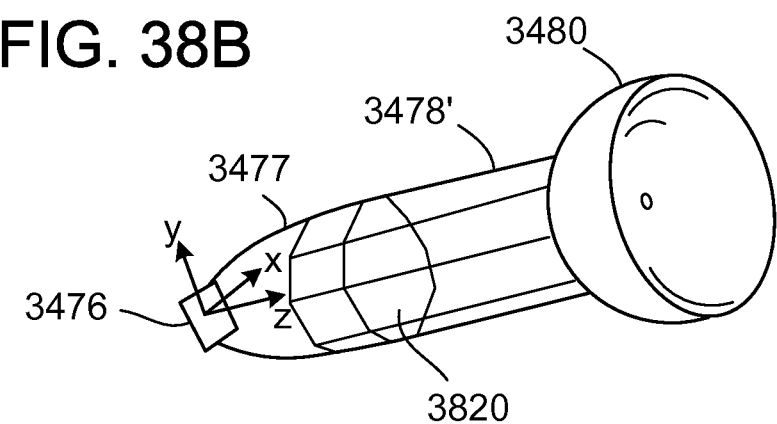

The optical coupler 3477 is configured to redirect light received from the one or more LEEs in the first angular range, and provide the redirected light in a second angular range at an output end of the optical coupler 3477, such that a divergence of the second angular range is smaller than a divergence of the first angular range. For instance, the optical coupler 3477 can be configured to collimate light to narrower than +/−40 degrees to satisfy TIR requirements along a longitudinal extension (along the z-axis) of the cylindrical light guide 3478, as shown in FIG. 38A, or of the prismatic light guide 3478' with N facets, as shown in FIG. 38B. The optical coupler 3477 has a receiving pocket (other examples can have two or more) that allows positioning of the LEE module 3476. The receiving pocket can be designed to provide predetermined light transfer from the LEE(s) into the optical coupler 3477 for one or more LEEs. The space between the optical coupler 3477 and the LEE(s) may be filled with silicone or other suitable substance to improve optical coupling. The optical coupler 3477 may have a cylindrical circumference. In other examples, it may have a polygonal shape, an elliptical shape, or other shape. The polygon has N sides, where N can be 3 for triangular shape, 4 for square shape, 5 for pentagonal shape, 6 for hexagonal shape; N can also be 7 or larger for other polygonal shapes. The exit aperture of the optical coupler 3477 is designed to provide good transfer of light from the optical coupler 3477 into the light guides 3478, 3478'. The outside of the optical coupler 3477 may be coated, which may affect whether light within the optical coupler is reflected by TIR or specular reflection.

In some embodiments, one or more of the LEEs may be configured to emit one or more of blue, violet or ultraviolet light which may be converted, at least in part, with one or more phosphors to generate white light, for example. Phosphors may be disposed in different locations of the luminaire, for example, in the LEE module 3476, proximate or distant of the LEE chips. For example, the size of the submount can be about 1 cm by 1 cm. The optical coupler 3477 has a substantially circular cross section perpendicular to its optical axis with a receiving end allowing the insertion of at least a portion of the LEE module 3476 into the optical coupler 3477 in order to achieve good light extraction from the LEE module 3476.

The light guide 3478 or 3478' is optically coupled at an input end of the light guide with the output end of the optical coupler 3477 and is shaped to guide light received from the optical coupler 3477 in the second angular range to an output end of the light guide, and to provide the guided light in substantially the same second angular range at the output end of the light guide. In the example illustrated in FIG. 38A, a cross-section 3810 perpendicular to an optical axis of the light guide 3478 (e.g., the z-axis) forms a circle. In the example illustrated in FIG. 38B, a cross-section 3820 perpendicular to an optical axis of the light guide 3478' (e.g., the z-axis) forms a polygon with N sides, where N>3. In some implementations, the polygon of cross-section 3820 is a regular polygon. In some implementations, the number, N, of facets of the prismatic light guide 3478 is selected to be larger than a threshold number of facets, $N > N_0$. The threshold $N_0$ depends on (i) a transverse dimension of the prismatic guide 3478' (in a cross sectional plane perpendicular to the z-axis), and an index of refraction of the light guide 3478'. The threshold number of facets represents a number of facets $N_0$ for which an angle between adjacent facets of the prismatic light guide 3478' is such that light propagating in a cross section perpendicular to the optical axis z cannot undergo TIR.

In some implementations, the number, N, of facets of the prismatic light guide 3478' is selected such that the prismatic light guide 3478 has no parallel facets. In some implementations, the number of facets, N, of the prismatic light guide 3478 is to be an odd number. In the latter implementations, development of transverse modes in the prismatic light guide 3478' can be avoided. In general, the prismatic light guide 3478' can blur otherwise occurring hot spots from bright LEEs.

The optical extractor 3480 is optically coupled with the output end of the light guide 3478 or 3478' at an input end of the optical extractor 3480 to receive light from the light guide 3478 or 3478'. The optical extractor 3480 has a redirecting surface spaced from the input end of the optical extractor 3480 and an output surface. The redirecting surface has an apex facing the input end of the optical extractor 3480 and is shaped to reflect light received at the input end of the optical extractor 3480 in the second angular range and provide the reflected light in a third angular range towards the output surface. The output surface is shaped to refract the light provided by the redirecting surface in the third angular range as refracted light and to output the refracted light in a fourth angular range outside the output surface of the optical extractor 3480. The optical extractor 3480 is substantially rotationally symmetric about the optical axis (e.g., the z-axis) of the light pipe 3478 or 3478' through the apex.

As such, the optical extractor 3480 provides a substantially rotationally symmetric intensity distribution. It is noted, that this may be different in other examples. Light can be output from the optical extractor 3480 into 360 degrees outward away from the optical extractor 3480 and a portion of that light back toward a notional plane perpendicular to the optical axis through the LEE module 3476. The intensity distribution of the light output from the optical extractor 3480 generally resembles a portion of the light emission of a point-like light source.

The light that is output by the optical extractor 3480 is further redirected and shaped in the example luminaires by a respective secondary reflector to provide predetermined intensity distributions. Optical surfaces and/or interfaces of the optical extractor 3480 and/or the secondary reflector can include one or more parabolic, hyperbolic, spherical, aspherical, facetted, segmented, polygonal, or otherwise shaped portions, as described above in connection with FIGS. 2A-2G, for example.

In this example, the optical extractor 3480 is shaped in a continuous rotationally symmetrical manner and can create substantially symmetrical radiation patterns. In other examples, the optical extractor 3480 can have a finite number of discrete regular repeating patterns or facets, which can be used, for example, to create an appearance associated with facetted glass or other transparent material or to blur otherwise occurring hot spots from bright light sources. The reflective interface of the optical extractor 3480 may additionally be coated with a suitably thick layer of silver or other metal such that no light can escape there through. Such a coating may change the nature of the reflection of light inside the optical extractor 3480 from TIR to specular reflection.

Figure 39:
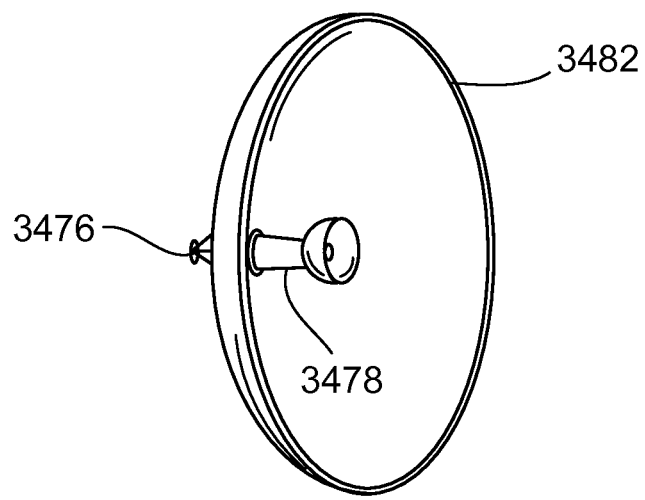
FIG. 39 is a view of another embodiment of a luminaire with rotational symmetry.

FIG. 39 is a perspective view of the light guide 3478 and a reflector 3482 for redirecting and shaping the light output by the optical extractor 3480 toward the surface to be illuminated. The reflector optic has rotational symmetry about the optical axis (e.g., the z-axis) and is shaped to reflect at least some of the light output by the output surface of the optical extractor 3480 in the fourth angular range as reflected light, and to provide the reflected light in a fifth angular range, such that the fifth angular range is different than the fourth angular range. The reflector 3482 may have any shape for creating the desired intensity distribution from light it receives from the optical extractor 3480, e.g., parabolic. In some implementations, the reflector 3482 may have an irregular surface, have peened indentations, facets, grooves, or other optically active structures that could provide additional control over beam shaping, color mixing and/or homogenization, for example as may be desired for functional or decorative purposes.

The reflector 3482 can include a reflective metal, such as aluminum or silver, or a material coated with a reflective film, for example Alanod's Miro™ or 3M's Vikuiti™. The luminaire of FIG. 34 may find application as a replacement luminaire for MR16, GU10, PAR20, PAR30, PAR 38, AR111, or similar luminaires, or may be configured and assembled in a light fixture creating a pendant light, a down light, a track light or a desk luminaire. The reflector 3482 may be configured to allow some light to escape via holes (not illustrated) provided in the reflector 3482, for example to illuminate a ceiling.

In one embodiment, the reflector 3482 reflects substantially all light emitted from the optical extractor 3480. The shape of the reflector 3482 may be designed to uniformly illuminate a target surface. The reflector 3482 may also be adjustable relative to the optical extractor 3480. For example, the luminaire may be configured to permit such adjustment in the field or during manufacturing to modify the beam characteristics of the luminaire. The reflector 3482 may also exhibit non-rotational symmetry with the ability to be field rotatable to steer the beam distribution in the illumination region.

Figure 40:
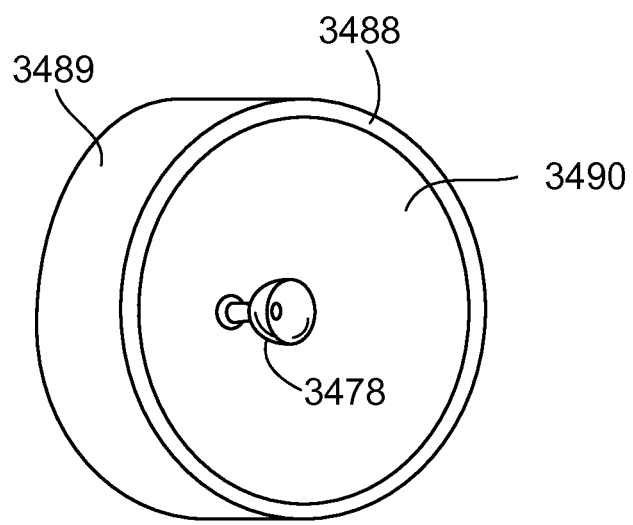
FIG. 40 is a view of yet another embodiment of a luminaire with rotational symmetry.

FIG. 40 illustrates a perspective view of an example luminaire similar to the one of FIG. 39. The luminaire includes a light guide (3478 or 3478') and a reflector 3488 for reflecting the light toward a target surface. This example luminaire utilizes a reflector 3488 with a facetted reflective surface 3490. The facetted reflective surface 3490 includes a plurality of substantially planar segments. Furthermore, the reflector 3488 can include a cylindrical side sleeve 3489.

In some embodiments, one or more light-exit surfaces are optically coupled with one or more reflective interfaces in a spherical Weierstrass configuration. For example, the optical extractor 3480 is formed of a material with refractive index n and includes at least one light-exit surface that is configured as a portion of a sphere of radius R that is disposed so that at least a first portion of an optically coupled reflective interface lies within a portion of space defined by a notional sphere of radius R/n that is concentric with the sphere of radius R that defines the light-exit surface and reflects light from the light guide thereto. In such a case, light coming from the light guide (3478 or 3478') that is reflected by a first portion of the reflective interface into a solid angle defined by a light-exit surface relative to a corresponding reflective interface can exit through the light-exit surface without undergoing total internal reflection.

Additional examples of luminaires configured to provide a rotationally symmetric intensity profile are described below in this specification in connection with FIGS. 45A-49C.

Upright Luminaires

Figure 41:
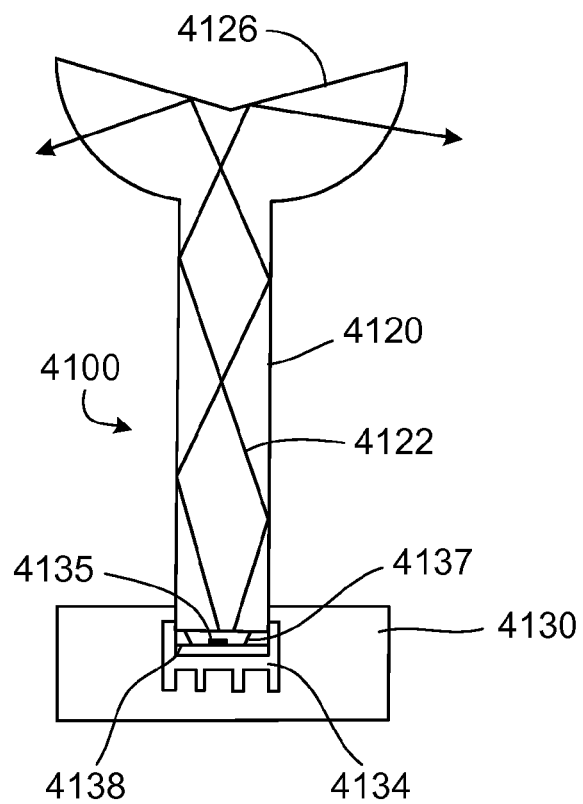
FIGS. 41-42 are views of an embodiment of a luminaire system.

Luminaires can be used in an upright configuration. In other words, luminaires can be used in application where the LEE is positioned underneath, as opposed to above, the optical extractor. For example, FIG. 41 shows a cross-section of an exemplary luminaire 4100 configured for use as a desk lamp or pedestal lamp. The luminaire 4100 includes a light guide 4120, an optical extractor 4126, a carrier 4134, one or more optical couplers 4137, and one or more LEE modules 4135 on one or more submounts 4138. The luminaire 4100 further includes a base 4130. Example light rays 4122 from the LEE modules 4135 are shown propagating in the light guide 4120. The submounts 4138 and the carrier 4134 are thermally coupled and may be configured as a heat sink in combination with the base 4130. The LEEs 4132 of the LEE module 4135 (see FIG. 42) may be interconnected in series and/or parallel as determined for operative connection with suitable circuitry for driving the LEEs 4132.

The optical extractor 4126 reflects the light downward and outward by a specular reflective coating as indicated by arrows. The luminaire 4100 may optionally include a secondary reflector (not illustrated) disposed and suitably configured to at least partially surround the optical extractor 4126. In this example, such a secondary reflector may be disposed to surround the optical extractor 4126 from above so that light that is emitted upward from the optical extractor 4126 can be redirected downward towards a target surface. The base 4130 can include a switch, dimmer, heat sink or other components. The base 4130 may be configured to provide predetermined thermal coupling to the environment and may be used as a heat sink, for example.

Figure 42:
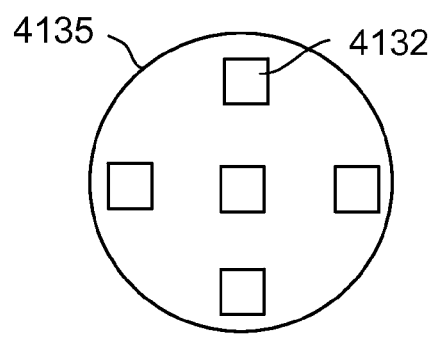

Luminaire 4100 can have an elongate or rotationally symmetrical configuration with respect to a plane perpendicular to the optical axis/axes of the light guide, which is an elongation perpendicular to the plane of the illustration of FIG. 41 or a rotational symmetry about an optical axis in the plane of illustration. Accordingly, for example, the carrier 4134, the optical coupler 4137 and/or the submount 4138 may be elongate and include a plurality of LEE modules 4135 along their length, or be substantially quadratic, circular or otherwise point-like and include one or a cluster of LEE modules 4135. As such, the example luminaire 4100 can include a plurality (not illustrated) of LEE modules 4135 arranged in an elongate or clustered configuration, for example. FIG. 42 shows a top view of an example LEE module 4135 including an example configuration of LEEs 4132. The one or more LEE modules 4135 are operatively disposed on the one or more submounts 4138.

Manufacturing

In general, the luminaires described herein may be manufactured using a variety of techniques. Manufacturing of luminaires, including the disposition of LEE dies or packages, may be facilitated by employing circuit board assembly techniques and placement machinery processes in combination with one or more processes as described herein. LEE dies or packages may be disposed relative to the optical couplers with predetermined accuracy, for example during manufacture, assembly, installation in the field or other event. Differential coefficients of thermal expansion between different materials may be considered during such deposition, for example, if components are manufactured or assembled at different temperatures.

Figure 43:
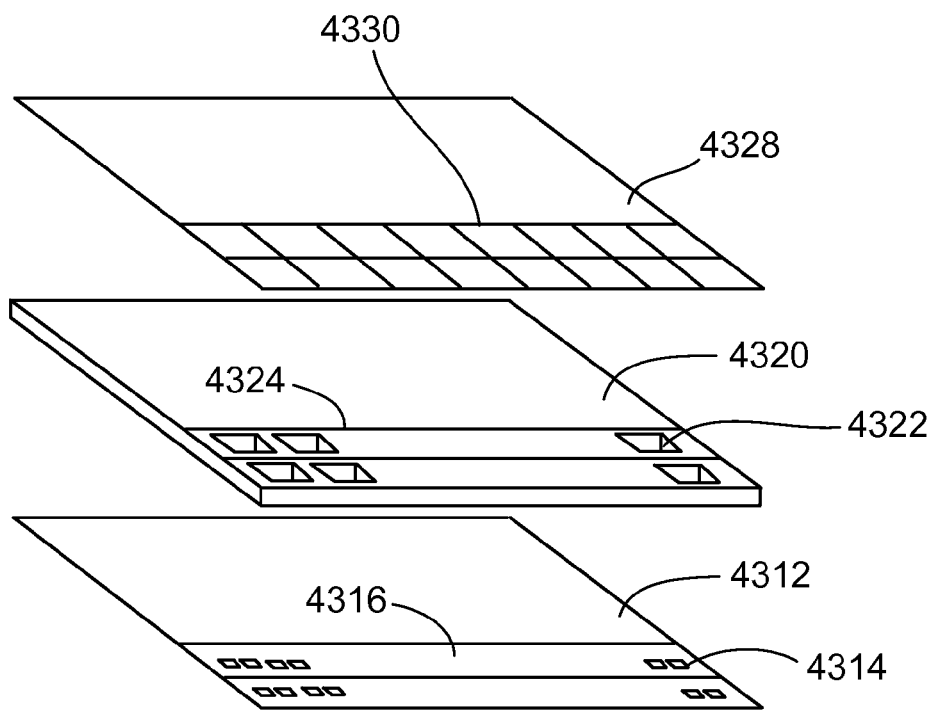
FIG. 43 is a view of example components for forming LEE strips for a luminaire.

For example, FIG. 43 shows of how LEE strips may be formed. Three layers 4312, 4320 and 4328 are combined into sheets with suitably interconnected LEEs that can then be separated, also referred to as singulation, into LEE strips. A substrate 4312 including a printed circuit board (PCB) panel, or other suitable support layer may be configured to provide predetermined electrical, mechanical and thermal properties and interconnect functionalities. The substrate includes pairs of metal pads 4314 for each LEE chip and a suitable conductive interconnect systems for interconnecting the LEEs of a strip in a combination of series and parallel circuitry to be driven by a power supply. The power supply for each LEE strip or combination of LEE strips may be mounted on the substrate 4312 or may be a separate module connected to the strip or strips by a suitable connector. Depending on the embodiment, the substrate 4312 may include a metal core, epoxy or other PCB that can provide predetermined vertical and horizontal heat dissipation characteristics. Segmentation lines 4316 are shown where the substrate 4312 will be singulated to form the strips.

Optical couplers can be disposed in an optical coupler sheet 4320, which can be a molded sheet, such as plastic, forming an array of optical couplers 4322. The sheet 4320 may be coated with a reflective film. Segmentation lines 4324 are shown. Each LEE is positioned in an optical coupler 4322 to ensure light is effectively injected into a light guide. The optical couplers 4322 may include one or more optical elements including non-imaging dielectric TIR concentrators, such as CPC (compound parabolic concentrators), CECs (compound elliptical concentrators), CHC (compound hyperbolic concentrators), tapered, or untapered, light pipes, segmented concentrators, other geometry concentrators, one or more lenses or other optical elements, for example. Depending on the embodiment, the optical couplers 4322 may be nominally equal or have different configurations. For example, optical couplers may have different profiles in the direction of the luminaire and/or perpendicular to the luminaire. For example, the optical couplers 4322 may be rotationally symmetric, or have elliptical triangular, square, hexagonal, or multi-segment cross-sections perpendicular to the beam direction.

The optical couplers 4322 may be integrally formed or configured from solid transparent material and solely rely on TIR or may be partially or fully reflectively coated on one or more surfaces. Optical couplers also may be hollow, or reflectively coated and/or non-imaging. Hollow reflectors can have the benefit of a shortened length over a dielectric collimating optic for the same collimation angle.

If corresponding LEEs are employed in the luminaire, a phosphor sheet 4328 may be used to convert blue or ultraviolet pump light and produce white light in combination with the unconverted pump light, if any. The characteristics of the phosphor sheet 4328 may be varied depending on the peak wavelength of the LEEs, the desired correlated color temperature (CCT) or spectral power distribution of the light, and other factors. Segmentation lines 4330 are shown. The phosphor sheet 4328 is segmented into strips or plates that are disposed in proximity to the top surfaces of the LEE chips. The phosphor sheet 3428 also may include three-dimensional structures (e.g., hemispherical plates) and positioned in proximity to the LEE chips within the optical couplers 4322 to reduce high temperature effects on the phosphor.

The electrodes of bare LEE chips, or the electrodes of submounts on which the bare LEE chips are mounted, are operatively disposed to the PCB pads 4314. Operative disposition may be performed by ultrasonic bonding, gluing, gluing with conductive adhesive, soldering, wire bonding, ball bumping and/or other operative interconnection. The LEEs may be flip chips, vertical chips (using a wire bond for the top LEE electrode), horizontal non-flip with wirebonding to anode and cathode, or other type of chip.

The substrate 4312, optical coupler sheet 4320, and phosphor sheet 4328 may be separated by sawing, routing, perforating, snapping, etching or otherwise, for example. The separation may be facilitated via predetermined breaking lines, also referred to as singulation lines, for example. The resulting strips/plates may be combined with a suitable carrier to form an LEE strip as shown in FIGS. 34A-34C, for example.

In some embodiments, optical couplers may be manufactured, for example injection molded, in groups of two or more elements and be provided with integral registration elements or receptacles for matingly receiving external registration elements to assure accurate placement of optical couplers relative to suitably disposed LEEs. Registration elements may be configured as indexing pins for insertion into respective holes inside a PCB board or LEE package, for example. Index matching material such as silicone with suitable optical properties may be disposed to provide a predetermined optical coupling between LEEs and the optical couplers. LEE packages may be operatively connected at different stages of the noted process to the optical couplers. Depending on the embodiment, LEE packages may be electrically and/or mechanically disposed on a PCB before or after operative interconnection with the optical couplers.

Optical couplers may be configured to provide one or more receiving apertures, which may be configured to provide tapered inner walls, protrusions, ribs or other elements that provide a predetermined restorative force to the LEEs during the mating procedure so that LEEs and optical couplers can be aligned with predetermined accuracy.

LEEs may be placed within recesses provided by optical couplers by automated equipment and centered by tapered walls or ribs to centered positions with a surrounding layer of gel to index match and optionally be cured to set their positions. An optional processing step may then planarize the assembly and remove excess material in preparation for testing and subsequent electrical and mechanical bonding to a substrate.

In certain embodiments, LEEs may be molded within the optical couplers to form assemblies which then can be optionally tested as a unit and sorted according to certain properties and then can be aligned to a registration point on the substrate prior to electrical and thermal bonding. A tab or pin on the optical coupler body may be employed that is aligned to the substrate matching detail which also aligns the electrical contact points of the LEEs in the x, y and z axes for electrical and thermal bonding.

LEEs may be affixed, molded or otherwise operatively coupled with the optical couplers. Furthermore, LEEs may be held in place by mating structures in one or more directions by a registration detail in the input side of the light guide. This may be performed prior to the curing of an optical interface material, which may be used to reduce Fresnel losses at the generated interface. Such steps may help constrain alignment of the electrical contact points at the bottom of the LEE die or packages to align to a substrate for electrical and thermal bonding.

In some embodiments, the LEEs are mounted on a substrate via an adhesive thermal matching gel with a viscous solder paste between their contacts and the substrate such that they can be adjusted minute distances as they are centered within their respective mating recesses within the optical couplers.

Figure 44:
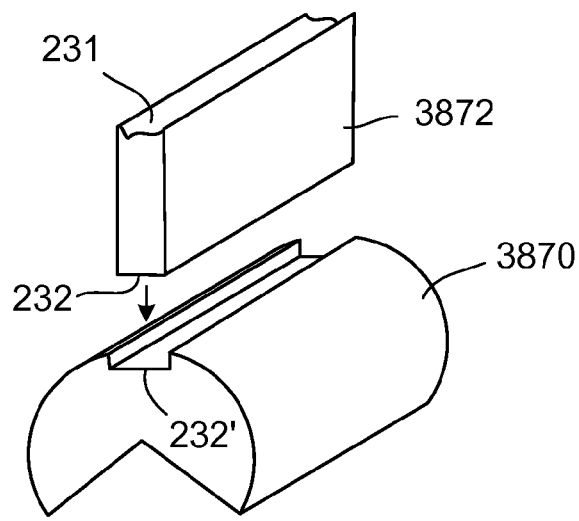
FIG. 44 is a view of an embodiment of a light guide and optical extractor for a luminaire.
Figure 45A:
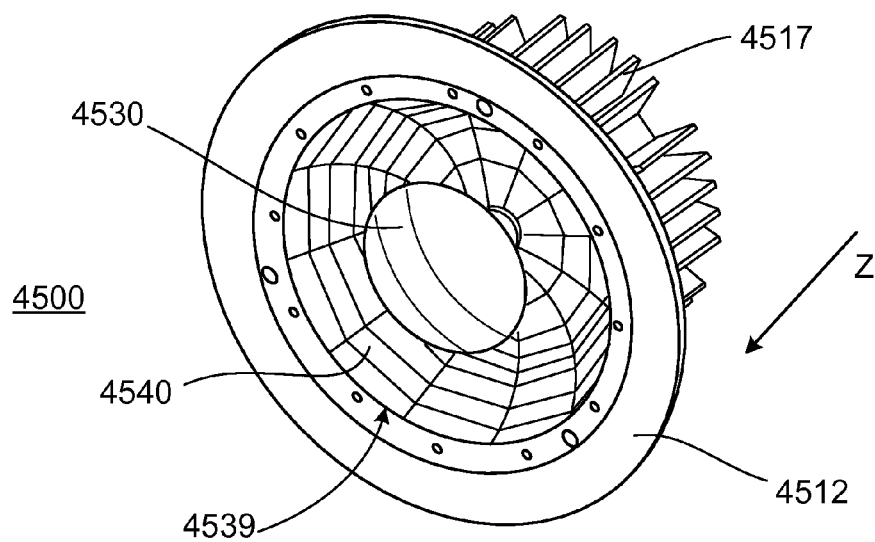
FIGS. 45A-45B are views of a hollow embodiment of a luminaire with rotational symmetry.
Figure 45B:
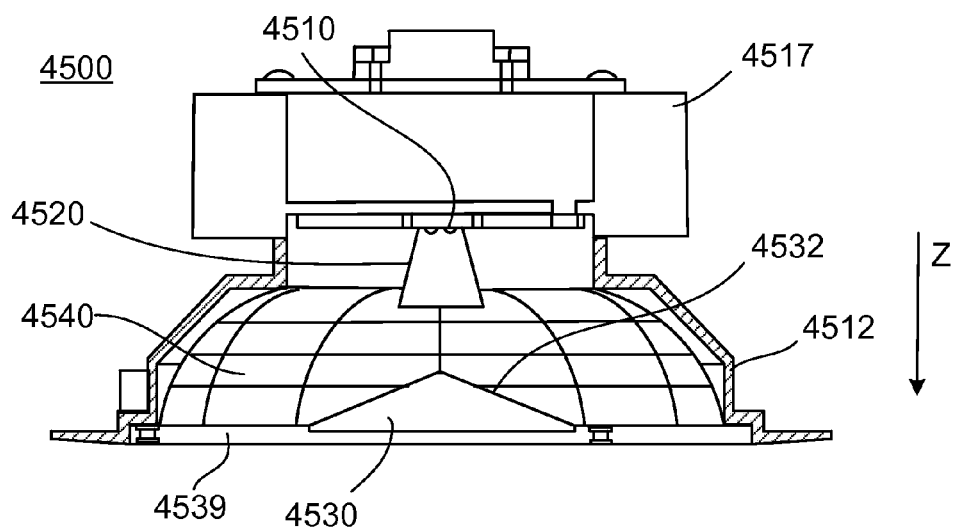

Components of luminaires can be made modularly and designed to be assembled in interchangeable ways. For example, FIG. 44 shows how an optical extractor 3870 may be modularly configured separately from a light guide 3872. The light guide 3872 includes an input end 231 (in this example the top edge of the rectangular light guide 3872) and an output end 232 (in this example the bottom edge of the rectangular light guide 3872). The optical extractor 3870 includes an input end 232'. The input end 232' of the optical extractor 3870 may be affixed to the output end (bottom edge) 232 of the rectangular light guide 3872 employing a suitably optically transparent coupling material having a matched index of refraction such as silicone. The optical extractor 3870 may be held in place by the coupling material, mechanical interference, a friction fit or otherwise, for example. This configuration may be employed to permit choosing from a selection of differently configured optical extractors that provide different intensity distributions better suited for a particular lighting application. The optical extractor 3870 may also be provided with a variety of distribution optics so that they can be joined to a common light guide 3872 in a completely modular fashion to suit the mounting height and lighting requirements of the space.

Multiple components of a luminaire can be integrally formed. In other words, two or more optical components of a luminaire can be formed from as single piece of optical material. Integrally formed components can limit Fresnel losses that occur at optical interfaces where refractive indices of adjacent optical materials are mismatched. Integral formation can facilitate registration and alignment of respective components of a luminaire.

ADDITIONAL EMBODIMENTS

Optical components of luminaire may be configured to sustain exposure to predetermined amounts of short wavelength light, for example blue, violet or ultraviolet light. Depending on the embodiment, such light may propagate through substantial portions of a luminaire. Exposure of respective components may depend on the particular locations of phosphors. Respective components may be formed of suitably resistant materials. Likewise, components that assume high temperatures during operation of the luminaire be configured to provide predetermined heat resistance and resilience against mechanical stresses caused by thermal gradients and/or differential thermal expansion between different components. Wavelength-conversion materials and LEEs can assume high operating temperatures.

Wavelength-conversion materials may be disposed in different amounts, concentrations and/or net conversion capabilities at different locations. Depending on the embodiment, the luminaire may be configured to emit light of uniform or non-uniform chromaticity or CCT (correlated color temperature) and/or emit light that is uniform or non-uniform within predetermined solid-angles. Luminaires with respective intensity distributions may be configured for decorative and/or general illumination. As such, wavelength-conversion materials may be arranged also to provide predetermined appearances and intensity distributions, for example. Depending on the embodiment, the luminaire may be configured so that light from different LEEs may be optically coupled with different wavelength-conversion materials. The LEEs may be operatively configured to allow independent control of different LEEs and as such allow control of how much light may be converted by different wavelength-conversion materials. Depending on the embodiment, the light generated by the different wavelength-conversion materials in response to illumination by the different LEEs may be completely, partially or substantially not mixed, for example. Depending on the degree of mixing, the luminaire may be configured to provide controllable intensity distributions or control over the chromaticity and/or CCT of the emitted light.

In general, the LEEs are arranged on one or more substrates. Each substrate may have a non-elongate, elongate or other shape. One or more substrates may be disposed on a carrier, for example a strip, disk, tile or otherwise shaped carrier configured to provide mechanical, electrical, thermal and/or optical coupling to respective elements including the ambient, the light guide, optional secondary reflector or other component of the luminaire. The carrier may be configured to provide predetermined mechanical strength, interconnectivity, heat sinking, electrical connection or other functions. Depending on the embodiment, the carrier may be configured to dissipate heat away from LEEs directly or indirectly into the ambient. The secondary reflector may be designed to be in thermal contact with the carrier and provide a large surface area enabling thermal dissipation of the waste heat generated in the LEEs.

Generally, luminaires are configured for suspension from and/or recess in a ceiling, wall or other surface of an object, room, or other space. In such a case, the light guide may be disposed substantially vertically, horizontally or other direction with light inside the light guide substantially propagating downwards, sideways or other respective direction. Corresponding luminaires may be rotationally symmetrical about an optical axis or elongate. Elongate luminaire may be configured in predetermined lengths of about two, four or six feet long, for example. Corresponding luminaire may be configured as replacements to fluorescent tubes, recessed or suspended troffers, or provided in other configurations, for example. According to some embodiments, the luminaire is configured as a rotationally symmetric luminaire such as a lamp or light bulb, or other non-elongate luminaire. According to some embodiments, the luminaire is configured as a toroidal tube, which may be considered both elongate and rotationally symmetrical.

To provide an example luminaire with approximately 5000 lm light output to replace a 2×4 foot fluorescent fixture, about 50 1 W LEE chips, which may be packaged, chip-on-board, or otherwise configured high-illuminance LEE chips need to be operatively disposed substantially equidistantly along a four foot LEE strip. In this case the average distance between the LEE chips, also referred to as pitch, amounts to about 24 mm. Accordingly, a luminaire configured to replace a typical fluorescent 2 foot by 2 foot troffer needs to generate about 3000 lumens, with a commensurate type or number of LEE chips. For example, LED dies of about 12-14 mil can be used for task or troffer luminaires, and LED dies of about 40-60 mil can be used for garage and suspended luminaires. As another example, the number of LEE chips required depends on the luminous flux requirement of the system, the system's optical efficiency, and the performance of the employed LEE. If more light output from the luminaire is required, the LEE chips may be disposed more densely in two or more parallel rows of LEE strips or otherwise grouped.

Depending on the embodiment, such groupings of LEEs may determine altered geometries and dimensions of the optical coupler, light guide, optical extractor and/or other components of a luminaire. It is important to mix the light from the LEE chips to obtain good illuminance and color uniformity along the length of the light fixture.

According to another example, a luminaire of approximately 1200 mm length is configured with approximately 100 medium flux LEEs (such as Nichia NS2L-157 devices) to provide approximately 5000 lumens (lm) of luminous flux. Those devices can be placed on a single PCB strip at a spacing of about 12 mm. Such or other luminaires described herein may be configured for suspension from a ceiling.

According to another example, a luminaire is configured as a replacement for a 2 foot or 4 foot long fluorescent tube. The luminaire can have a suitable length for placement in the housing of a two feet by two feet or two feet by four feet troffer. In order to provide the flux of a 4 feet long fluorescent lamp of about 3000 lm, approximately 30 LEEs, for example 1 mm by 1 mm LEEs of 100 lm each, may be used spaced apart at approximately 40 mm per luminaire.

A luminaire according to an embodiment may be configured to replace a 2-foot by 2-foot troffer. In such a luminaire the LEEs may be disposed in two rows each having a length of about 600 mm. Each row can then be coupled with an elongate system as described herein. To be able to provide for example 1500 lm output from each row, a certain number of LEEs per row is required with each row having LEEs spaced at a predetermined distance, for example. Nominally, for example, 30 LEEs with a light output of 50 lm each spaced at 20 mm per row may provide 1500 lm light input into the optical system of each row. Considering inefficiencies due to optical, electrical, ageing and other effects, for example, about 30% to about 100% more light input per row may be required to account for such inefficiencies and achieve and maintain a light output of about 1500 lm per row. Consequently, a corresponding example luminaire may be configured with 60 LEEs, each providing 50 lm, spaced at 10 mm per row.

It is noted that the specific number of LEEs used in such a luminaire may depend on ageing properties of the LEEs and the degree to which an LEE drive system can compensate for such properties. Ageing properties of LEEs can include decrease and/or increase of LEE efficacy, light output, efficacy, and probability of failure and/or other properties that can vary with time of operation of an LEE. Such luminaires need to be used in combination with compatible LEE electrical drive systems in order to be able to maintain the overall flux provided by the luminaire within desired tolerances.

The example luminaire may be configured as a desk, pedestal or other luminaire, for example. The example luminaire also may be configured as a replacement for a fluorescent tube, or more specifically a modular combination of a fluorescent tube and a pair of respective T5, T8 or other fluorescent tube receiver sockets. In such an example luminaire the base can form a replacement for a pair of tube receiver sockets as usually used to releasably connect a fluorescent tube via inserting contacts of the fluorescent tube and turning the fluorescent tube until it locks the contacts via a suitable electromechanical mechanism to establish an operative connection between the fluorescent tube and the fixture. Such fixtures can be configured as troffers, cove or other types of luminaires. In contrast to the modular combination of a fluorescent tube with a pair of tube receiver sockets, the example luminaire can be integrally formed. Luminaires according to this example may be configured for operative coupling with a suitable fixture in a modular or integral fashion.

Further to the foregoing described embodiments, FIGS. 45A-49C show a hollow luminaire 4500 that is designed to provide a rotationally symmetric intensity profile. Luminaire 4500 includes a housing 4512 with a cooler 4517, a cluster 4510 of LEEs and a collector 4520. Luminaire 4500 may be referred to as a down light. Collector 4520 is a hollow element that includes tapered surfaces extending around cluster 4510. A first reflector 4530 is positioned in the path of light emitted from the LEEs and collimated by collector 4520. First reflector 4530 includes a conical, reflective surface 4532 having a v-shaped cross section. Luminaire 4500 has a rotational symmetry axis, which insects the apex of the conical, reflective surface 4532 of the first reflector 4530. Luminaire 4500 further includes a rotationally symmetric secondary reflector 4540 positioned to receive light reflected from first reflector 4530 and redirect the light to the target surface through a window 4539. The window 4539 may be transparent, translucent or otherwise configured. The secondary reflector 4540 has a convex profile. First reflector is attached to window 4539. Mounting elements secure and position window 4539 and thereby first reflector 4530 relative to secondary reflector 4540 at a specified distance from the LEEs and the collector 4520.

Figure 46A:
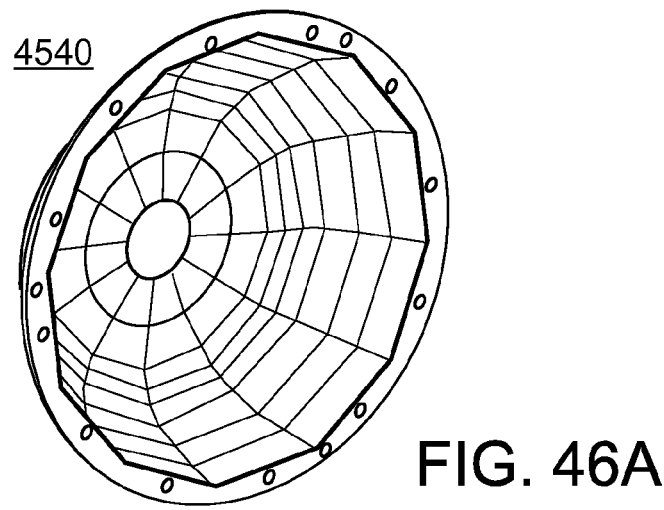
FIGS. 46A-46B and 47 show components of the hollow embodiment of a luminaire with rotational symmetry.
Figure 46B:
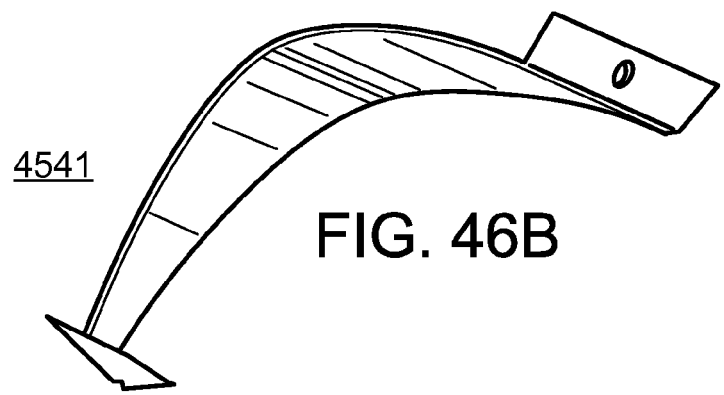
Figure 47:
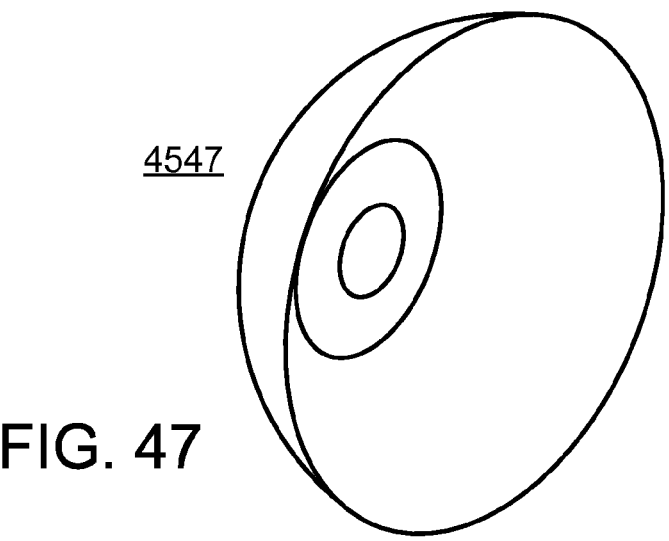
Figure 48:
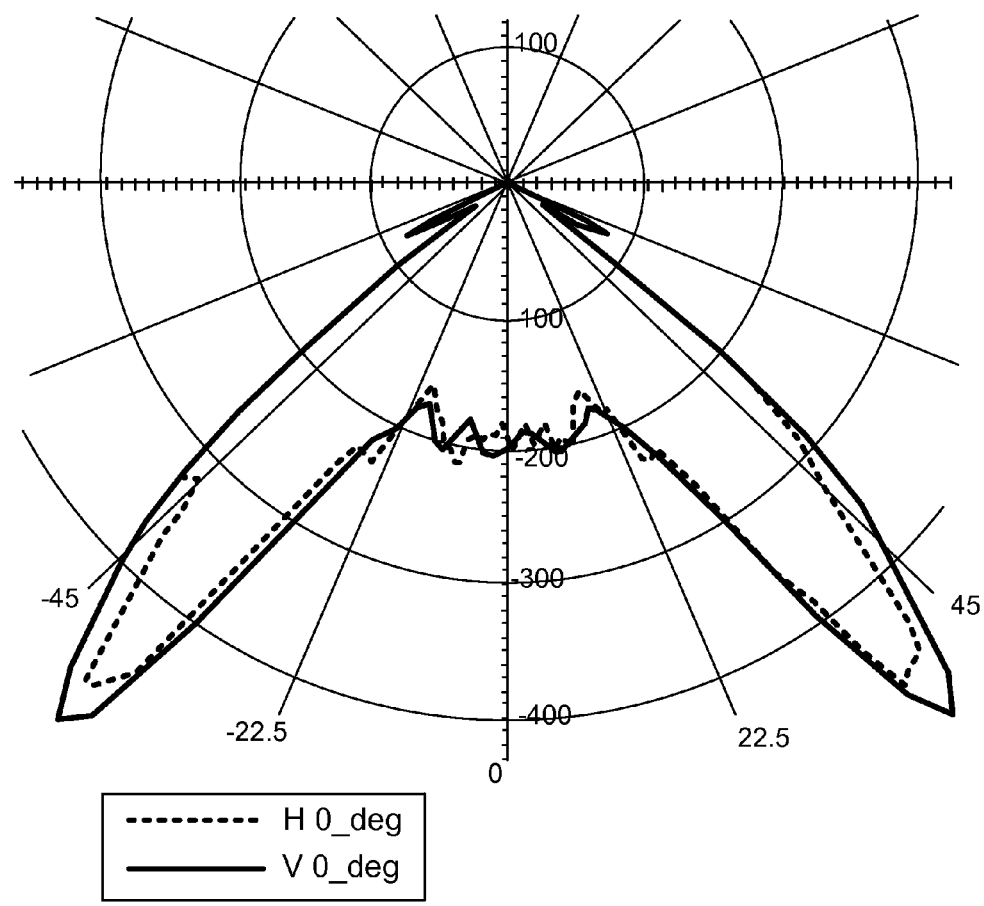
FIG. 48 is an intensity profile of the luminaire of the hollow embodiment of a luminaire with rotational symmetry.

FIG. 46A illustrates a perspective view of the secondary reflector 4540. FIG. 46B illustrates a perspective view of a secondary reflector element 4541 of the secondary reflector 4540. The secondary reflector 4540 includes twelve secondary reflector elements 4541. The secondary reflector 4540 may be formed as a whole or from a number of elements by drawing, welding, soldering or other process of suitable metallic, plastic or other materials. FIG. 47 illustrates a perspective view of one of many alternative forms 4547 of a secondary reflector for the luminaire 4500. In contrast to the secondary reflector 4540, which has discrete rotational symmetry, the secondary reflector of FIG. 47 has continuous rotational symmetry about its optical axis.

The optical components of luminaire 4500 can be produced from a variety of materials. For example, the components can be produced from a metal, such as aluminum, or from a plastic coated with a reflective material.

In general, the intensity distribution provided by luminaire 4500 depends, inter alia, on the geometry of collector 4500, the geometry of first reflector 4530 and secondary reflector 4540, and distances between components of the luminaire 4500, and these parameters can be varied as desired to provide an intensity distribution suitable for the luminaire's intended purpose. For example, the angular width of lobes in the intensity distribution in cross-section depends on the degree of collimation provided by collector 4530 and the amount by which reflectors 4530 and 4540 introduce divergence or convergence to the light. The intensity distribution illustrated in FIG. 48 at least in part depends on the configuration of and relative orientation of the reflective surfaces. In this plot, 0° corresponds to the positive z-direction.

Figure 49C:
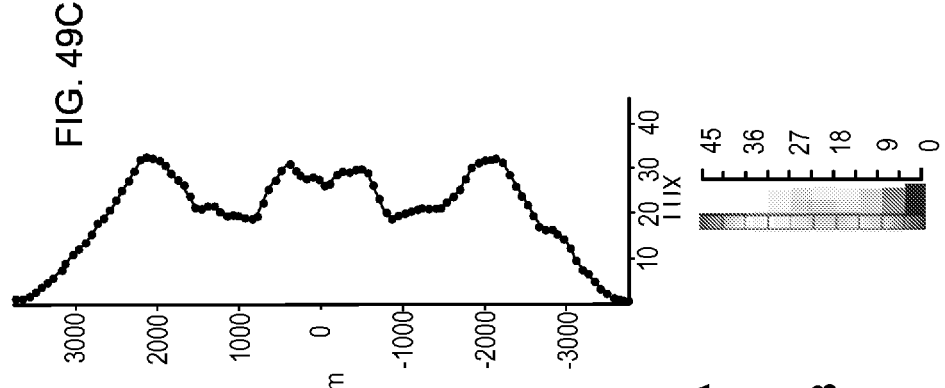
FIGS. 49A-49C show aspects of an intensity distribution associated with the hollow embodiment of a luminaire with rotational symmetry.
Figure 49A:
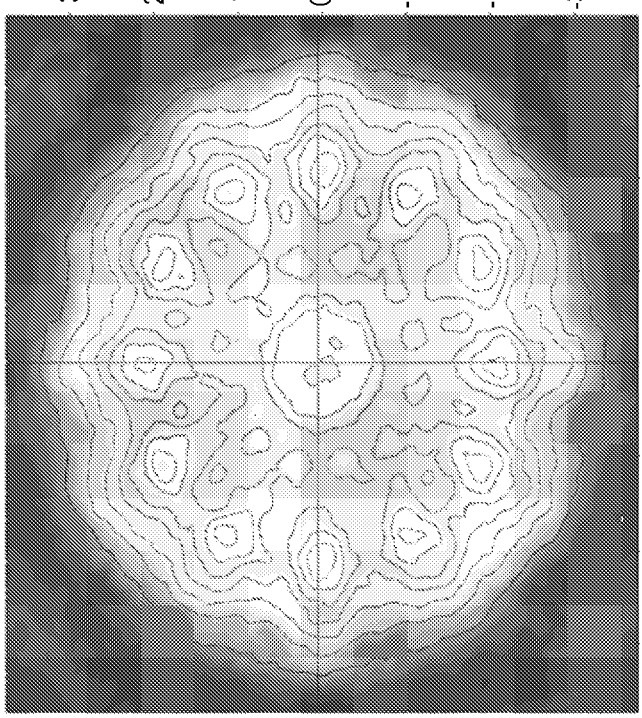
Figure 49B:
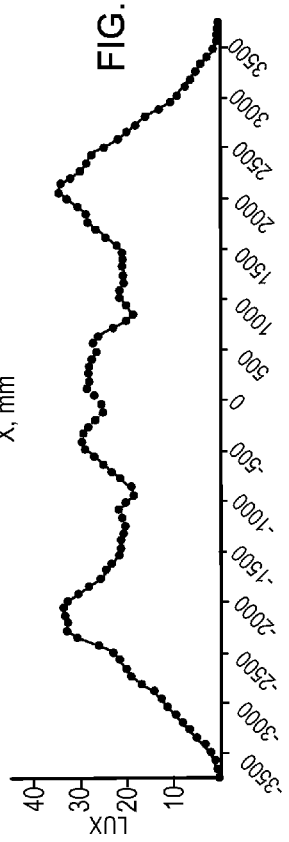

FIGS. 49A-49C illustrate plots of the simulated intensity distribution that is generated by the luminaire 4500. Depending on the specific configuration, such a luminaire may be useful for various applications including commercial or residential lighting. FIG. 49A shows a contour plot of the illuminance across the work surface, FIG. 49B shows a plot of illuminance (in lux) vs. Y position (in mm) at X=0, and FIG. 49C shows a plot of illuminance (in lux) vs. X position.

Luminaire systems can include an extended source, e.g., a light bulb or a tube, a reflector and housing—such as fluorescent troffer or pendant. The source can provide a raw flux source, while the reflector and housing can provide a system for supporting, conditioning, and redirecting light flux from the source to the work surface. These fixtures are powered directly from line voltage—such as in the case of a desk lamp—or a power transforming ballast as in the case of a fluorescent ceiling troffer.

Devices described in this specification may be configured to use light flux originating from a primary source of known dimensional, geometric, brightness and uniformity characteristics, and a secondary reflector/refractor/combination optic to output a specified radiation pattern. The secondary optic can redistribute the source flux's "phase-space" to a new phase-space of prescribed dimensional extent and angular divergence (e.g., directional cosines) while maintaining a substantially uniform intensity from the secondary optic. These devices can provide uniform illumination of the work surface, efficient energy conversion from the light source of the devices to the work surface, and uniform and/or glare-free intensity from the fixture itself when viewed from the work surface. Additionally, these devices can provide glare-free intensity characteristics while maintaining efficiency and directionality in flux redirection.

Other embodiments are in the following claims.

What is claimed is:

1. An illumination device comprising:

a substrate having first and second opposing surfaces, such that each of the first and second surfaces are elongated and have a longitudinal dimension and a transverse dimension shorter than the longitudinal dimension;

a plurality of light-emitting elements (LEEs) arranged on the first surface of the substrate and distributed along the longitudinal dimension, such that the LEEs emit, during operation, light in a first angular range with respect to a normal to the first surface of the substrate;

one or more solid primary optics arranged in an elongated configuration along the longitudinal dimension of the first surface and coupled with the LEEs, the one or more solid primary optics being shaped to redirect light received from the LEEs in the first angular range, and to provide the redirected light in a second angular range, a divergence of the second angular range being smaller than a divergence of the first angular range at least in a plane perpendicular to the longitudinal dimension of the first surface of the substrate;

a solid light guide comprising input and output ends, the input and output ends of the solid light guide being elongated in the longitudinal dimension and having substantially the same shape, wherein the input end of the solid light guide is coupled to the one or more solid primary optics to receive the light provided by the solid primary optic in the second angular range, and the solid light guide is shaped to guide the light received from the solid primary optic in the second angular range and to provide the guided light in substantially the same second angular range with respect to the first surface of the substrate at the output end of the solid light guide; and a solid secondary optic comprising an input end, a redirecting surface opposing the input end and first and second output surfaces, such that each of the input end, and redirecting, first output and second output surfaces of the solid secondary optic are elongated along the longitudinal dimension, wherein the input end of the solid secondary optic is coupled to the output end of the solid light guide to receive the light provided by the solid light guide in the second angular range, the redirecting surface has first and second portions that reflect the light received at the input end of the solid secondary optic in the second angular range, and provide the reflected light in third and fourth angular ranges with respect to the normal to the first surface of the substrate towards the first and second output surfaces, respectively, wherein at least prevalent directions of propagation of light in the third and fourth angular ranges are different from each other and from a prevalent direction of propagation of light in the second angular range at least perpendicular to the longitudinal dimension of the first surface of the substrate, the first output surface is shaped to refract the light provided by the first portion of the redirecting surface in the third angular range as first refracted light, and to output the first refracted light in a fifth angular range with respect to the normal to the first surface of the substrate outside the first output surface of the solid secondary optic, and the second output surface is shaped to refract the light provided by the second portion of the redirecting surface in the fourth angular range as second refracted light, and to output the second refracted light in a sixth angular range with respect to the normal of the first surface of the substrate outside the second output surface of the solid secondary optic.

2. The illumination device of claim 1, wherein the divergence of the second angular range is smaller than the divergence of the first angular range also along the longitudinal dimension of the first surface of the substrate.

3. The illumination device of claim 1, further comprising a tertiary optic comprising:

a first reflector elongated along the longitudinal dimension, the first reflector at least in part facing the first output surface of the solid secondary optic, wherein the first reflector is shaped to reflect at least some of the light output by the first output surface of the solid secondary optic in the fifth angular range as first reflected light in a seventh angular range with respect to the normal to the first surface of the substrate, wherein at least a prevalent direction of propagation of light of the seventh angular range is different from a prevalent direction of propagation of light of the fifth angular range at least in a plane perpendicular to the longitudinal dimension, such that a first portion of an intensity distribution output by the illumination device during operation includes at least some of the first reflected light.

4. The illumination device of claim 3, wherein the first reflector is coupled to an edge of the first output surface of the solid secondary optic, and at least a portion of the first reflector is an involute of at least a portion of the first output surface of the solid secondary optic.

5. The illumination device of claim 3, wherein the tertiary optic further comprises:

a second reflector elongated along the longitudinal dimension, the second reflector facing the second output surface of the solid secondary optic, wherein the second reflector is shaped to reflect at least some of the light output by the second output surface of the solid secondary optic in the sixth angular range as second reflected light in an eighth angular range with respect to the normal to the first surface of the substrate, wherein at least a prevalent direction of propagation of light of the eighth angular range is different from a prevalent direction of propagation of light of the sixth angular range at least in a plane perpendicular to the longitudinal dimension, such that the first portion of the intensity distribution output by the illumination device during operation includes at least some of the second reflected light.

6. The illumination device of claim 5, wherein at least one of the first and second reflectors is spaced apart from the second output surface of the solid secondary optic.

7. The illumination device of claim 5, wherein the first and second reflectors at least in part transmit at least some of the light output by the first and second output surfaces of the solid secondary optic in the fifth and sixth angular ranges, respectively, wherein a second portion of the intensity distribution output by the illumination device during operation includes the transmitted light.

8. The illumination device of claim 7, wherein the first and second reflectors have perforations, the perforations being positioned to transmit at least some of the light output by the first and second output surfaces of the solid secondary optic in the fifth and sixth angular ranges, respectively, wherein the second portion of the intensity distribution output by the illumination device during operation includes the transmitted light.

9. The illumination device of claim 5, wherein at least one of the first and second reflectors is thermally coupled with the substrate.

10. The illumination device of claim 1, wherein a first parameter combination comprises (i) a shape of the one or more primary optics, (ii) a shape of the first portion of the redirecting surface and an orientation thereof relative to the input end of the solid secondary optic, (iii) a shape of the first output surface and an orientation thereof relative to the first portion of the redirecting surface, and (iv) a configuration of the light guide, the first parameter combination determining the fifth angular range, wherein the first parameter combination is tailored such that the fifth angular range matches a predefined fifth angular range;

a second parameter combination comprises (v) the shape of the one or more primary optics, (vi) a shape of the second portion of the redirecting surface and an orientation thereof relative to the input end of the solid secondary optic, (vii) a shape of the second output surface and an orientation thereof relative to the first portion of the redirecting surface, and (viii) the configuration of the light guide, the second parameter combination determining the sixth angular range, wherein the second parameter combination is tailored such that the sixth angular range matches a predefined sixth angular range, and a relative offset of the first and second portions of the redirecting surface with respect to the input end of the solid secondary optic determines a relative distribution of light between the fifth angular range and the sixth angular range, wherein the relative offset is selected such that the relative distribution matches a predefined relative distribution.

11. The illumination device of claim 10, wherein the configuration of the light guide includes an aspect ratio of a width of an input end of the light guide versus a length of the light guide.

12. The illumination device of claim 10, wherein the first parameter combination further comprises an intensity distribution of the first angular range, the second parameter combination further comprises the intensity distribution of the first angular range.

13. The illumination device of claim 10, further comprising a tertiary optic comprising:
a reflector elongated along the longitudinal dimension, the reflector at least in part facing the first output surface of the solid secondary optic, wherein the reflector reflects at least some of the light output by the first output surface of the solid secondary optic in the predefined fifth angular range as first reflected light in a seventh angular range with respect to the normal to the first surface of the substrate, wherein at least a prevalent direction of propagation of light of the seventh angular range is different from a prevalent direction of propagation of light of the predefined fifth angular range at least in a plane perpendicular to the longitudinal dimension,
such that a first portion of the intensity distribution output by the illumination device during operation includes the first reflected light, and a second portion of the intensity distribution output by the illumination device during operation includes at least some of the light output by the second output surface of the solid secondary optic within the predefined sixth angular range, wherein the intensity distribution is asymmetric with respect to the first portion and the second portion.

14. The illumination device of claim 13, wherein the reflector has a first end having a curved portion and a second end having a substantially planar portion, the first end being arranged proximate the light guide.

15. A system comprising N illumination devices according to claim 13, where N is an even number larger or equal to 4, the N illumination devices being connected to each other to form a polygon, such that the substrates of the connected illumination devices lie in a common plane, and any of pairwise parallel illumination devices from among the connected illumination devices outputs the first portion of the intensity distribution towards each other, and the second portion of the intensity distribution away from each other.

16. A system comprising N illumination devices according to claim 13, where N is a number larger or equal to 3, the N illumination devices arranged such that the substrates of the illumination devices are substantially coplanar, and each one of the illumination devices outputs the first portion of the intensity distribution towards one or more opposite ones of the illumination devices, and emits the second portion of the intensity distribution away from each other.

17. The system according to claim 16, wherein N is an odd number.

18. The illumination device of claim 1, wherein the redirecting surface comprises a reflective material, where the reflective material includes one or more of Ag or Al.

19. The illumination device of claim 1, wherein at least one of the input end, the redirecting surface, and the first and second output surfaces of the solid secondary optic has a uniform cross-sectional shape along the longitudinal dimension of the first surface of the substrate in planes perpendicular thereto.

20. The illumination device of claim 1, wherein for a cross-sectional plane perpendicular to the longitudinal dimension of the first surface of the substrate, the redirecting surface has an apex that separates the first and second portions of the redirecting surface.

21. The illumination device of claim 20, wherein the apex of the redirecting surface is a rounded apex with a non-zero radius of curvature.

22. The illumination device of claim 20, wherein the first and second portions of the redirecting surface have first and second arcuate shapes in the cross-sectional plane perpendicular to the longitudinal dimension of the first surface of the substrate.

23. The illumination device of claim 1, wherein for a cross-sectional plane perpendicular to the longitudinal dimension of the first surface of the substrate, the redirecting surface is shaped as an arc of a circle, and the first and second portions of the redirecting surface represent first and second portions of the arc of the circle.

24. The illumination device of claim 1, wherein
the first and second portions of the redirecting surface are separated, at least in part, by a slot, and
for a cross-sectional plane perpendicular to the longitudinal dimension of the first surface of the substrate that intersects the slot, first and second curves corresponding to the first and second portions of the redirecting surface are separated by a discontinuity.

25. The illumination device of claim 1, wherein
either of the first and second portions of the redirecting surface comprise one or more slots, and
for a cross-sectional plane perpendicular to the longitudinal dimension of the first surface of the substrate that intersects the one or more slots, first and second curves corresponding to the first and second portions of the redirecting surface comprise one or more discontinuities associated with the one or more slots.

26. The illumination device of claim 1, wherein for a cross-sectional plane perpendicular to the longitudinal dimension of the first surface of the substrate, either of the first and second portions of the redirecting surface has one or more apexes.

27. The illumination device of claim 1, wherein for a cross-sectional plane perpendicular to the longitudinal dimension of the first surface of the substrate, the first portion of the redirecting surface is shaped as a plurality of potentially disjoint, piecewise differentiable first curves, and the second portion of the redirecting surface is shaped as a plurality of potentially disjoint, piecewise differentiable second curves.

28. The illumination device of claim 1, wherein the plurality of LEEs and the one or more solid primary optics are integrally formed.

29. The illumination device of claim 1, wherein the one or more solid primary optics, the solid light guide and the solid secondary optic are integrally formed of one or more transparent materials, and the one or more transparent materials have substantially matching refractive indices.

30. The illumination device of claim 1, wherein an angular range comprises (i) a divergence of the angular range and (ii) a prevalent direction of propagation of light in the angular range, wherein the prevalent direction of propagation corresponds to a direction along which a portion of an intensity distribution has a maximum, and the divergence corresponds to a solid angle outside of which the intensity distribution drops below a predefined fraction of the maximum of the intensity distribution.

* * * * *